US007814007B2

(12) United States Patent
Ireland et al.

(10) Patent No.: US 7,814,007 B2
(45) Date of Patent: Oct. 12, 2010

(54) ON-LINE HIGHER EDUCATION FINANCING SYSTEM

(75) Inventors: Leigh-Anne T Ireland, New York, NY (US); Marilyn Strand, New York, NY (US); Michele Goldberg, New York, NY (US); Etienne Winzer, Tampa, FL (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 11/622,769

(22) Filed: Jan. 12, 2007

(65) Prior Publication Data

US 2007/0124240 A1 May 31, 2007

Related U.S. Application Data

(60) Continuation of application No. 11/207,992, filed on Aug. 22, 2005, which is a division of application No. 09/563,299, filed on May 2, 2000, now Pat. No. 7,062,462.

(51) Int. Cl.
*G06Q 40/00* (2006.01)
(52) U.S. Cl. ...................................................... 705/38
(58) Field of Classification Search .............. 705/35–45
See application file for complete search history.

(56) References Cited

U.S. PATENT DOCUMENTS

| 5,599,527 | A | | 2/1997 | Hsu et al. |
| 5,699,527 | A | | 12/1997 | Davidson |
| 5,866,889 | A | * | 2/1999 | Weiss et al. ................. 235/379 |
| 5,870,721 | A | | 2/1999 | Norris |
| 5,930,776 | A | | 7/1999 | Dykstra et al. |
| 5,940,812 | A | | 8/1999 | Tengel et al. |
| 5,966,699 | A | | 10/1999 | Zandi |
| 5,995,947 | A | | 11/1999 | Fraser et al. |
| 6,006,207 | A | | 12/1999 | Mumick et al. |
| 6,026,382 | A | | 2/2000 | Katlehoff |
| 6,029,149 | A | | 2/2000 | Dykstra et al. |
| 6,064,984 | A | | 5/2000 | Ferguson et al. |

(Continued)

FOREIGN PATENT DOCUMENTS

WO    WO 99/59084    11/1999

OTHER PUBLICATIONS

Sapient and Sallie Mae Team to Create an Internet Based Stul Student Loan Delivery System, Apr. 1998.*

(Continued)

*Primary Examiner*—Richard C Weisberger
(74) *Attorney, Agent, or Firm*—Goodwin Procter LLP

(57) ABSTRACT

A method of providing a user with education financing information, includes the acts of: maintaining an electronic site on a computer network to which the user may connect; sending data to the user over the network for presenting at least one electronic screen which contains financial award information concerning a potential student of an educational institution, the financial award information including a monetary award which may be used for the student to attend the educational institution; and sending data to the user over the network when requested for presenting at least one electronic screen which contains cost projection information, the cost projection information being a function of the award and including an amount of money required for the student to attend the educational institution.

17 Claims, 64 Drawing Sheets

U.S. PATENT DOCUMENTS 6,345,278 B1     2/2002     Hitchcock et al.
6,460,042 B1    10/2002     Hitchcock et al.

OTHER PUBLICATIONS

Citibank's CitiAssist Student Loan Now Available Through eStudentLoan.com site, Jul. 6, 1999.

Citibank Simplifies College Financial Aid Search with New OnLine Service for Students and Parents: www.studentloan.com—Jun. 23, 1999.

Utilizing the Web for Student Loans—Jul. 18, 1997.

Key Bank USA Debuts a Powerful and Free Tool to Help Take the Guesswork Out of Education Borrowing—Nov. 12, 1996.

"College Loans Instantly Pre-Approved Over Internet and by Phone 24 Hours a Day, 7 Days a Week"—Jun. 5, 2000.

"Step-by-Step Through the FAFSA"—Jan. 2000.

PNC add online offering to its Student loan lineup. (Brief Article)—May 5, 2000.

"PNC Bank Makes $4 Million Equity Investment in Parent Company of CollegeLink.com, the Leading Internet College Application Service", Oct. 14, 1999.

Sallie Mae Offers Students a Free, Web-Based Scholarship Search to Find College Funding Oct. 6, 1999.

Educational Finance Group www.efg.net/link scholarship.

www.slfc.com.

www.nhelp.net/enconcert.com.

www.yourstudentloanfunding.com.

"E-Aid Office 2000: Financial Aid Software Selection, Implementation, and Operation", NASFAA Monograph, No. 12, p. 1-29, Jun. 2000.

* cited by examiner

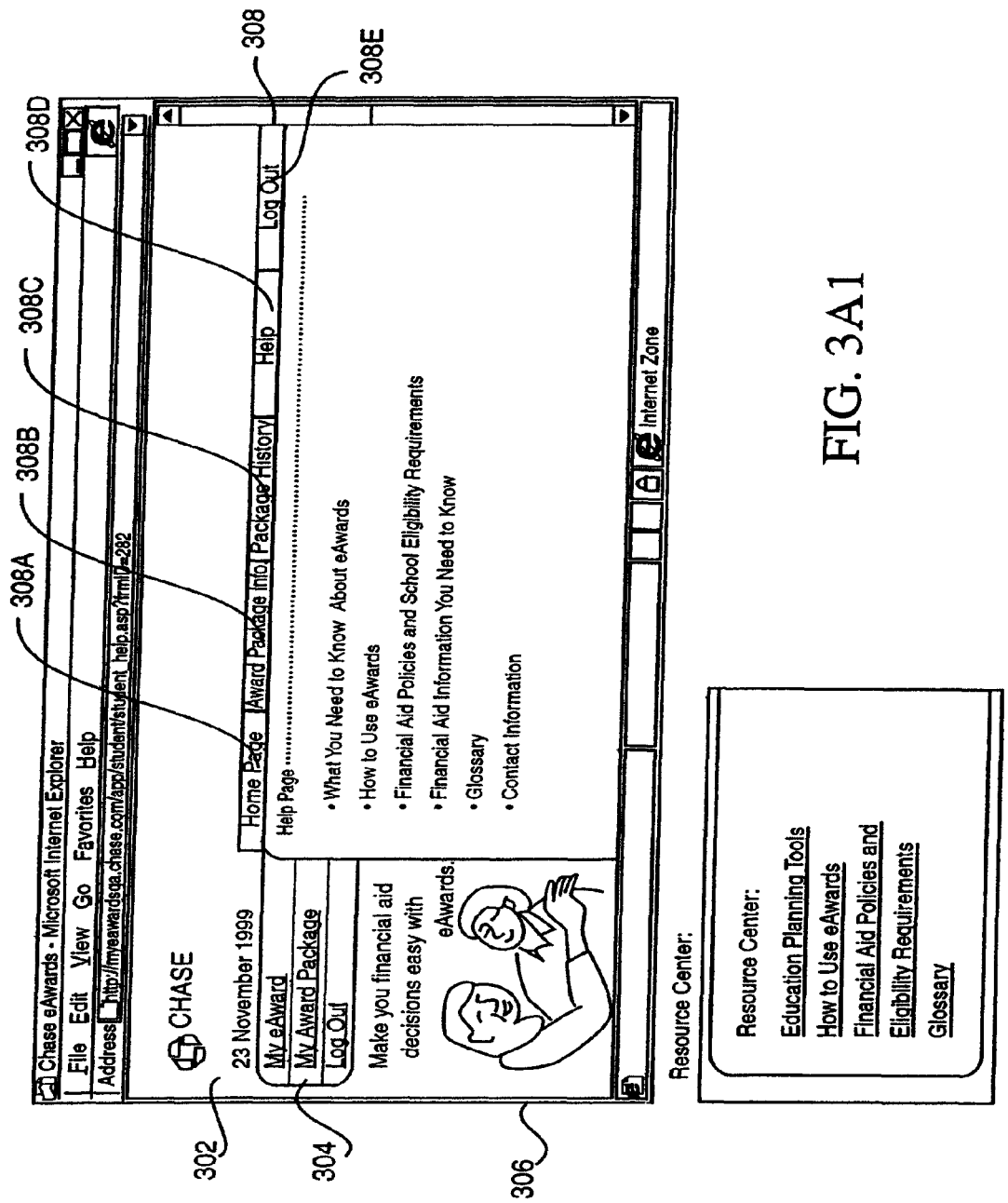
FIG. 3A1

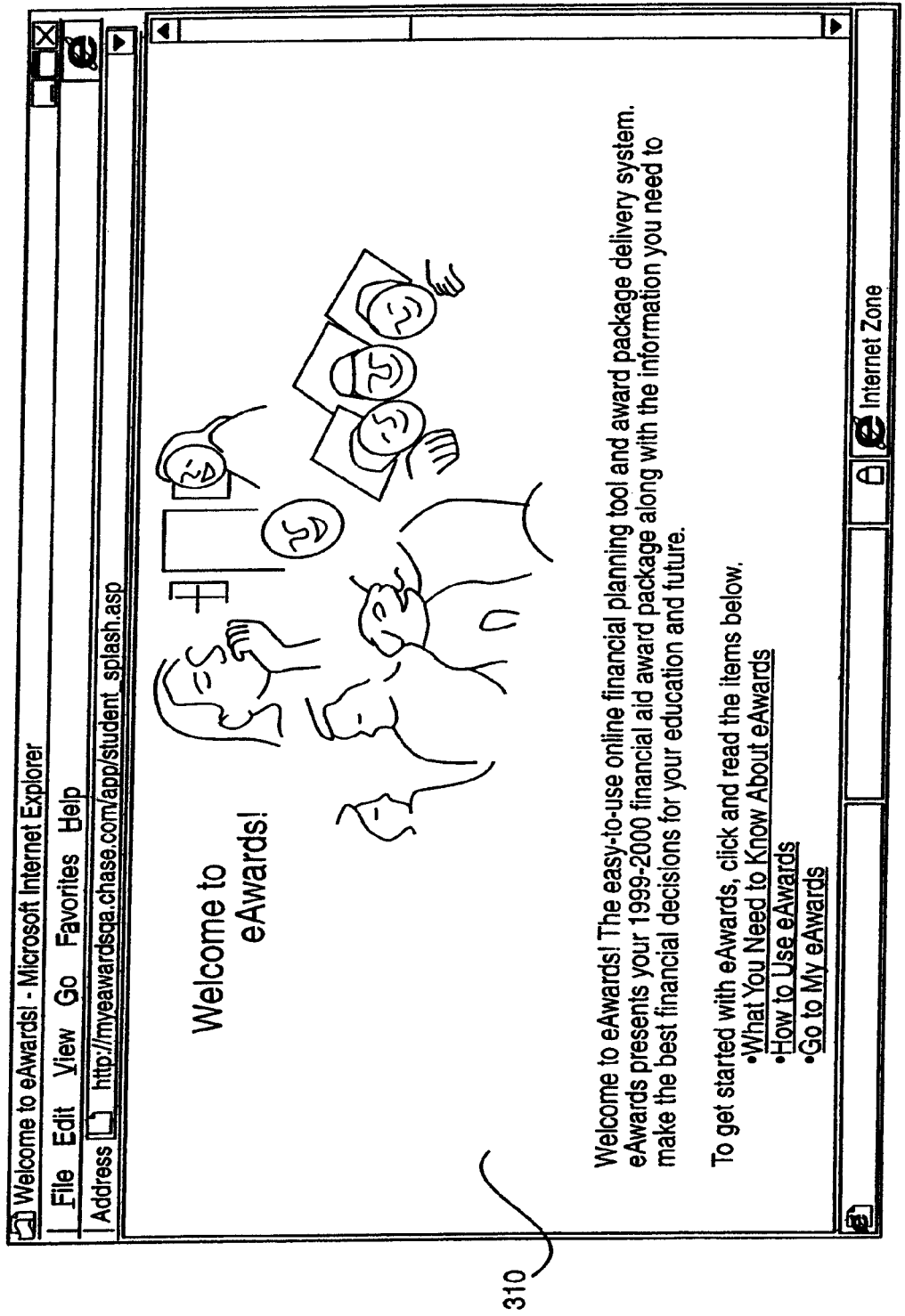
FIG. 3A2

FIG. 3C

Chase eAwards - Netscape

File Edit View Go Favorites Help

Back Forward Reload Home Search Netscape Print Security Shop Stop

Bookmarks Locations: http://myeawardsqa.chase.com:443/app/student/award_package.asp — What's Related

Make your financial aid decisions easy with eAwards.

Financial Planning Tools
Instructions
Financial Aid Policies and Eligibility Requirements
Glossary Review your financial aid award package and the options listed at the bottom of the page carefully. You may want to use the Education Planning Tools to help you evaluate your package.

- If you choose to change your award package, your changes will be subject to school Financial Aid Policies and Federal program Eligibility Requirements. Your individual eligibility will determine what changes you make and the limit the amounts you can request.
- If you have loans in your award package, you may be asked to select a lender via eAwards.
- If you do not want to make a decision at this time, you can declare later and return to eAwards anytime before the expiration date shown above.
- When you have made your decision, You must confirm and submit your decision to the Financial Aid Office via eAwards before the expiration date shown above (needs more work).

MERCIA C CIRILLO's Award Package tell me more

| Award Package | Fall | Spring | Total |
|---|---|---|---|
| Grants | | | |
| Fed Pell Grant | $500.00 | $500.00 | $1000.00 |
| Grants Total | | | $1000.00 |
| Scholarship | | | |
| Jacobs Schol | $500.00 | $500.00 | $1000.00 |
| Scholarships Total | | | $1000.00 |
| Jobs | | | |
| Jobs Total | | | $0.00 |
| Loan | | | |
| Sub Stafford Loan | $2,500.00 | $2,500.00 | $5000.00 |
| Loan Total | | | $5000.00 |
| Total Award Package | $3,500.00 | $3,500.00 | $7000.00 |

Document Done

MERCIA C CIRILLO's Award Package  tell me more  — 322

| | Fall | Spring | Total |
|---|---|---|---|
| Award Package | | | |
| Grants | | | |
| Fed Pell Grant | $500.00 | $500.00 | $1000.00 |
| Grants Total | | | $1000.00 |
| Scholarship | | | |
| Jacobs Schol | $500.00 | $500.00 | $1000.00 |
| Scholarships Total | | | $1000.00 |
| Jobs | | | |
| Jobs Total | | | $0.00 |
| Loan | | | |
| Sub Stafford Loan | $2,500.00 | $2,500.00 | $5000.00 |
| Loan Total | | | $5000.00 |
| Total Award Package | $3,500.00 | $3,500.00 | $7000.00 |

324 — ????? Need  Tell me more

| | |
|---|---|
| Your Cost of Attendance | $17,170.00 |
| Your Expected Family Contribution | $0.00 |
| Your Financial Need | $17,170.00 |
| Your Total Award Package | $7,000.00 |
| Your ????? Need | $10,170.00 |

326 — Would you like to...

- USE PLANNING TOOLS
- CHANGE MY PASSWORD
- DECIDE LATER
- CONTINUE

FIG. 3C1

My Award Package — 322

| | Award Package | My Changes |
|---|---|---|
| Your Cost of Attendance | $17,170.00 | $17,170.00 |
| Your Expected Family Contribution | $0.00 | $0.00 |
| | $17,170.00 | $17,170.00 |
| Award Package | | |
| Grants | $1000.00 | $1000.00 |
|   Fed Pell Grant | $17,170.00 | $17,170.00 |
|   Grants Total | $1000.00 | $1000.00 |
| Scholarship | | |
|   Jacobs Schol | $1000.00 | $1000.00 |
|   Scholarships Total | $1000.00 | $1000.00 |
| Jobs | | |
|   Jobs Total | $0.00 | $0.00 |
| Loans | | |
|   Sub Stafford Loan | $5000.00 | $5000.00 |
|   Loans Total | $5000.00 | $5000.00 |
| Parent Financing Options | | |
|   Parent Financing Total | $0.00 | $0.00 |
| Student Financing Options | | |
|   Student Financing Total | $0.00 | $0.00 |
| Your Remaining Unmet Need | $10,170.00 | $10,170.00 |

Make a Decision Here — 326A

Make a decision below. Then click "Next" to continue (Note: If you have decided to accept or decline your package, you must still confirm and submit your decision via eAwards.)

o Accept this Package o Decline this Package o Decide Later

FIG. 3C4

| Financial Projections for the Remaining Years of your Education Program | | | |
|---|---|---|---|
| | 1999-2000 | 2000-2001 | 2001-2002 |
| Your cost of Attendance | $17,170 | $18,004 | $18,879 |
| Your Expected Family Contribution | $0 | $0 | $0 |
| Financial Need | $17,170 | $18,004 | $18,879 |
| Award Package | | | |
| Grants | | | |
|   Fed Pell Grant | $1,000 | $1,050 | $1,103 |
|   Grants Total | $1,000 | $1,050 | $1,103 |
| Scholarships | | | |
|   Jacobs Schol | $1,000 | $1,050 | $1,103 |
|   Scholarships Total | $1,000 | $1,050 | $1,103 |
| Jobs | | | |
|   Jobs Total | $0 | $0 | $0 |
| Loan | | | |
|   Sub Stafford Loan | $5,000 | $7,857 | $7,857 |
|   Loan Total | $5,000 | $7,857 | $7,857 |
| Parent Financing Options | | | |
|   Parent Loan Total | $0 | $0 | $0 |
| Student Financing Options | | | |
|   Student Loan Total | $0 | $0 | $0 |
| Your Remaining Unmet Need | $10,170 | $8,046 | $8,817 |

FIG. 3D eAwards has calculated the estimated total loan debt and monthly repayment amount for each loan in your award package for the current award year. This includes both student and loan calculations. — 342

(Note: If you have an Unsubsidized Stafford Loan, you have the option to defer interest payments while you are in school. The calculations below assumes you want to so. eAwards will show you how you can save in Internet payments if you click on the link located under the Unsubsidized Stafford Loan.)

•If you have Parent loans, click on "View Parent Loan Calculations" at the bottom of the page.

| Student Repayment Calculations: Current Award Year | | | | | | |
|---|---|---|---|---|---|---|
| Loan Name | Award Amount ($) | # of Monthly Payments | Interest Rate (%) | Total Interest ($) | Total Principal + Interest ($) | Monthly Payment ($) |
| Sub Stafford Loan | $8,500.00 | 120 | 8.25 | $4,010.57 | $12,510.57 | $104.25 |
| UnSub Stafford Loan (with interest deferred) | $1,000.00 | 23 | 8.25 | $91.55 | $1,174.05 | $51.05 |
| To see how you can save on interest payments, click here. | | | | | | |
| Federal Perkins Loan | $2,000.00 | 120 | 5.00 | $545.57 | $2,545.57 | $21.21 |
| Student Loan 1 | $2,000.00 | 120 | 7.25 | $817.62 | $2,817.62 | $23.48 |
| Total: $13,500.00 | | | | $5,465.31 | $19,047.81 | |

◁ Back ( VIEW PARENT LOAN CALCULATIONS ) — 345

FIG. 3E eAwards has calculated the estimated total loan debt and monthly repayment amount for each loan in your award package for the current award year. This includes both student and loan calculations.
- If you have parent loans, see calculations below.

- If you have student loans, click on "View Student Loan Calculations" at the bottom of the page.

346

| Parent Repayment Calculations: Current Award Year | | | | | | |
|---|---|---|---|---|---|---|
| Loan Name | Award ($) | # of Monthly Payments | Interest Rate (%) | Total Interest ($) | Total Principal + Interest ($) | Monthly Payment ($) |
| Alternate Loan 2 | $1,000.00 | 21 | 9.00 | $84.55 | $1,084.55 | $51.65 |
| Total: $1,000.00 | | | | $84.55 | $1,084.55 | |

◁ Back  ( VIEW PARENT LOAN CALCULATIONS )

FIG. 3E1

| Unsubsidized Stafford Loan Interest Comparison | | |
|---|---|---|
| | If you defer interest payment | If you pay interest while in school |
| Total Principal (Amount Borrowed) | $5,000.00 | $5,000.00 |
| Interest Rate | 8.25% | 8.25% |
| Months in School | 36 | 36 |
| Months of Repayment After School | 120 | 120 |
| Monthly Payment to Repay Loan | | |
| After Graduation | $76.50 | $61.33 |
| During School | $0.00 | $34.38 |
| Accrued Interest | $1,237.50 | $1,237.50 |
| Accrued Interest Paid While in School | $0.00 | $1,237.50 |
| Total Principal and Interest | $9,180.55 | $8,596.66 |
| If you Pay Interest While in School, You will Save | | $583.89 |

FIG. 3E2 eAwards has calculated the estimated total loan debt and monthly repayment amount for each loan borrowed during your full education program.

- eAwards allows you to enter prior student loan debt in order to more fully estimate the total student loan debt for your full education program.

°Use the fill-in box(es) in the "Prior Debt" column as applicable to you.

°Once you have completed entering your prior debt, click "Recalculate Total"
  (Note: The school may have already prepopulated your prior debt amount(s) for you. If the amount is incorrect, adjust accordingly)

•If you have parent loans, click on "View Parent Loan Calculations" at the bottom of the page.

350

Parent Repayment Calculations: Current Award Year

| Loan Name | Prior Debt ($) | Current Year Award Amount ($) | Total Amount ($) | # of Monthly Payments | Interest Rate(%) | Total Interest ($) | Total Principal+ Interest ($) | Monthly Payment ($) |
|---|---|---|---|---|---|---|---|---|
| Sub Stafford Loan | 0 | $8,500.00 | $8,500.00 | 120 | 8.25 | $4,010.57 | $12,510.57 | $104.25 |
| UnSub Stafford Loan | 0 | $1,000.00 | $1,000.00 | 21 | 8.25 | $77.35 | $1,077.35 | $51.30 |
| Federal Perkins Loan | 0 | $2,000.00 | $2,000.00 | 120 | 5.00 | $545.57 | $2,545.57 | $21.21 |
| Student Loan 1 | 1,000 | $2,000.00 | $3,000.00 | 120 | 7.25 | $1,226.44 | $4,226.44 | $35.22 |
| Total: | | | $14,500.00 | | | $5,859.93 | $20,359.93 | |

Recalculate Total

◁ Back  VIEW PARENT LOAN CALCULATIONS

Multiple-Award Years Loan Repayment Calculations eAwards has calculated the estimated total loan debt and monthly repayment amount for each loan borrowed during your full education program. This includes both student and parent loan calculations.

- If you have parent loans, see calculations below.

(Note: eAwards allows you to enter prior parent loan debt in order to more fully estimate the total loan debt for your full education program. Use the fill-in box(es) in the "Prior Debt" column as applicable to you. Once you have completed entering your prior debt, click "Recalculate Total")

•If you have Student loans, click on "View Parent Loan Calculations" at the bottom of the page.

352

Parent Repayment Calculations: Multiple Award Years

| Loan Name | Prior Debt ($) | Current Year Award Amount ($) | Total Amount ($) | # of Monthly Payments | Interest Rate(%) | Total Interest ($) | Total Principal+ Interest ($) | Monthly Payment ($) |
|---|---|---|---|---|---|---|---|---|
| Alternate Loan 2 | 0 | $1,000.00 | $1,000.00 | 21 | 9.00 | $84.55 | $1,084.55 | $51.65 |
| Total: | | | $1,000.00 | | | $84.55 | $1,084.55 | |

Recalculate Total

◁ Back  VIEW STUDENT LOAN CALCULATIONS

FIG. 3F1

| Package Worksheet Tell me more | Award Package | My Changes |
|---|---|---|
| My Financial Need | | |
| My Cost of Attendance | $17,170.00 | $17,170.00 |
| My Expected family Contribution | $0.00 | $0.00 |
| My Financial Need Total | $17,170.00 | $17,170.00 |

FIG. 3G1

| My Grants | | |
|---|---|---|
| Fed Pell Grant | $1,000.00 | $1,000.00 |
| Other | | |
| Other | | |
| Other | | |
| Other | | |
| Other | | |
| Grand Total | $1,000.00 | $1,000.00 |

| My Scholarships | | |
|---|---|---|
| Jacobs Schol | $1,000.00 | $1,000.00 |
| Other | | |
| Other | | |
| Other | | |
| Other | | |
| Other | | |
| Scholarships Total | $1,000.00 | $1,000.00 |

| My Jobs | | |
|---|---|---|
| Jobs Total | $0.00 | $0.00 |

| | | | 364 |
|---|---|---|---|
| My Jobs | | | |
| Sub Stafford Loan | $5,000.00 | 5000 | |
| Loans Total | $5,000.00 | $5,000.00 | |

FIG. 3G5

| Student Financing Options | | 366 |
|---|---|---|
| ▼ | | |
| ▼ | | |
| Student Loan 1 | | |
| Student Loan 2 | | |
| Signature | | |
| Alternate Loan 3 | | |
| | $0.00 | |

FIG. 3G6

| Parent Financing Options | | 367 |
|---|---|---|
| ▼ | | |
| Plus Parent | | |
| Alternate Loan 2 | | |
| | $0.00 | |

FIG. 3G7

| There are errors present on this page. Click here to be taken to the first one | | |
|---|---|---|
| Package Worksheet Tell me more | Award Package | My Changes |
| My Financial Need | | |
| My Cost of Attendance | $17,170.00 | $17,170.00 |
| My Expected family Contribution | $0.00 | $0.00 |
| My Financial Need Total | $17,170.00 | $17,170.00 |

FIG. 3G9

| My Jobs | | |
|---|---|---|
| Jobs Total | $0.00 | $0.00 |
| My Jobs | | |
| Sub Stafford Loan | $8,500.00 | 8500 |
| Federal Perkins Loan | $2,000.00 | 2000 |
| UnSub Stafford Loan ▼ | | 1000 |
| Loans Total | $10,500.00 | $11,500.00 |
| Student Financing Options | | |
| Student Loan 1 ▼ | | 2000 |
| ▼ | | |
| ▼ | | |
| ▼ | | |
| Student Financing Options | | |
| Parent Financing Options | | |
| Alternate Loan 2 | | 1000 |
| Parent Financing Total | | $1,000.00 |
| My ????? ????? Need | $4,670.00 | $670.00 |

[ Change My Package ]  368

[ Clear My Package ]  369

Click here to recalculate and save any changes made to the Worksheet

Click here to refresh the Worksheet and remove previous changes.

FIG. 3G8

| Parent Financing Options | | |
|---|---|---|
| PLUS Parent ▼ | | 10000 1 |
| ▼ | | |
| Parent Financing Total | | $10,000.00 |
| My ????? ????? Need | $10,170.00 | ($4,330.00) |

[ Change My Package ] [ Clear My Package ]

— 371

| Error Messages |
|---|
| 1 The value of this award cannot exceed 5670 |

FIG. 3G10

| Parent Financing Options | | |
|---|---|---|
| Alternate Loan 2 ▼ | | 1000 |
| Parent Financing Total | | $1,000.00 |
| My ????? ????? Need | $4,670.00 | $670.00 |

[ Change My Package ] [ Clear My Changes ]

Would you like to...

( USE PLANNING TOOLS )
( REVISIT YOUR PACKAGE )
( DECIDE LATER )
( CONTINUE )  — 370

FIG. 3G11

Federal Stafford Loans

• Select your previous lender from the drop-down list.

• If the lender column blank, or your previous lenders not in the list, please select "Other". Then, type the name of your previous lender in the box located to the right of the drop-down list.

• If you do not recall the name of your previous lender, then click "Do Not Recall".

| Loan | Amount | Lender | | |
|---|---|---|---|---|
| Sub Stafford Loan | $8,500 | Chase | ▼ | |

/374

Other Financial Loans

• Select your previous lender from the drop-down list.
• If the lender column blank, or your previous lenders not in the list, please select "Other". Then, type the name of your previous lender in the fill-in box located to the right of the drop-down list.
• If you do not recall the name of your previous lender, then click "Do Not Recall".

| Loan | Amount | Lender | | |
|---|---|---|---|---|
| Federal PLUS | | | | |
| PLUS Parent | $5,000.00 | Chase | ▼ | |
| Other Student Loans | | | | |
| Student Loan 1 | $1,000.00 | Other | ▼ | |
| Alternate Loan 2 | $3,000.00 | Chase | ▼ | |

/374

◀ Back    Next ▶

FIG. 3H1

Federal Stafford Loans

• Under the "lender" columns elect a lender from the drop-down list.

• If you choose a lender that is not listed, please select "Other" from the drop-down list. Type the name of your "other" lender in the fill-in box located to the right of the drop-down list.

(Note: The option to select "other" is primarily intended for use by students who have borrowed loans in the past from a lender not included in the drop-down list.)

| Loan | Amount | Lender | |
|---|---|---|---|
| Sub Stafford Loan | $8,500 | Chase ▼ | |

/374

Other Financial Loans

• Under the "lender" columns elect your lender from the drop-down list.
• If you choose to select a lender that is not in the drop-down list, please select "Other". Type the name of your "other" lender in the fill-in box located to the right of the drop-down list.
(Note: The option to select "other" is primarily intended for use by students who have borrowed loans in the past from a lender not included in the drop-down list.)

| Loan | Amount | Lender | |
|---|---|---|---|
| Federal PLUS | | | |
| PLUS Parent | $5,000.00 | Chase ▼ | |
| Other Student Loans | | | |
| Student Loan 1 | $1,000.00 | Other ▼ | |
| Alternate Loan 2 | $3,000.00 | Chase ▼ | |

/374

◄ Back    Next ►

FIG. 3H2

Confirm Your Lender

You have completed lender selection for the loans listed below.
Review and confirm that this information below is correct.
• If it is correct, click "Next" to submit your award package decision.

• If it is not correct, click "Back" to make changes.

Other Financial Loans

| Loan | Amount | Lender |
|---|---|---|
| Student Loans | | |
| Sub Stafford Loan | $3,500.00 | Citibank |
| Student Loan 1 | $1,000.00 | Union Bank |
| Alternate Loan 3 | $3,000.00 | Chase |
| Parent Loan(s) | | |
| PLUS Parent | $5,000.00 | Chase |

/374

◄ Back    Next ►

FIG. 3H3

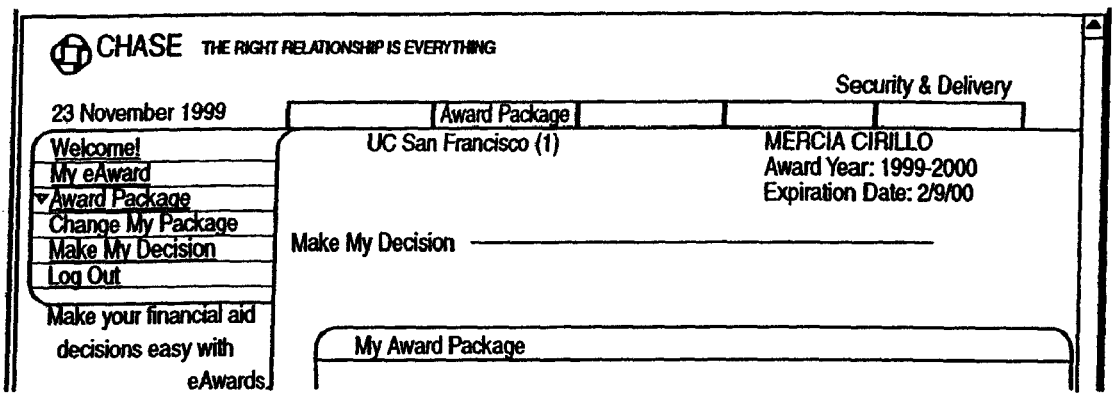

FIG. 3I

| My Award Package | | |
|---|---|---|
| | Award Package | My Changes |
| Your Cost of Attendance | $17,170.00 | $17,170.00 |
| Your Expected Family Contribution | $0.00 | $0.00 |
| Financial Need | $17,170.00 | $17,170.00 |
| Award Package | | |
| Grants | | |
| Fed Pell Grant | $1,000.00 | $1,000.00 |
| Grants Total | $1,000.00 | $1,000.00 |
| Scholarships | | |
| Jacobs Schol | $1,000.00 | $1,000.00 |
| Other Football | | $2,000.00 |
| Scholarships Total | $1,000.00 | $1,000.00 |
| Jobs | | |
| Jobs Total | $0.00 | $0.00 |
| Loans | | |
| Sub Stafford Loan | $5,000.00 | $3,500.00 |
| Loans Total | $5,000.00 | $3,500.00 |
| Parent Financing Options | | |
| PLUS Parent | | $5,000.00 |
| Parent Financing Total | $0.00 | $5,000.00 |
| Student Financing Options | | |
| Student Loan 1 | | $1,000.00 |
| Alternate Loan 3 | | $3,000.00 |
| Student Financing Total | $0.00 | $4,000.00 |
| Your Remaining Unmet Need | $10,170.00 | $670.00 |

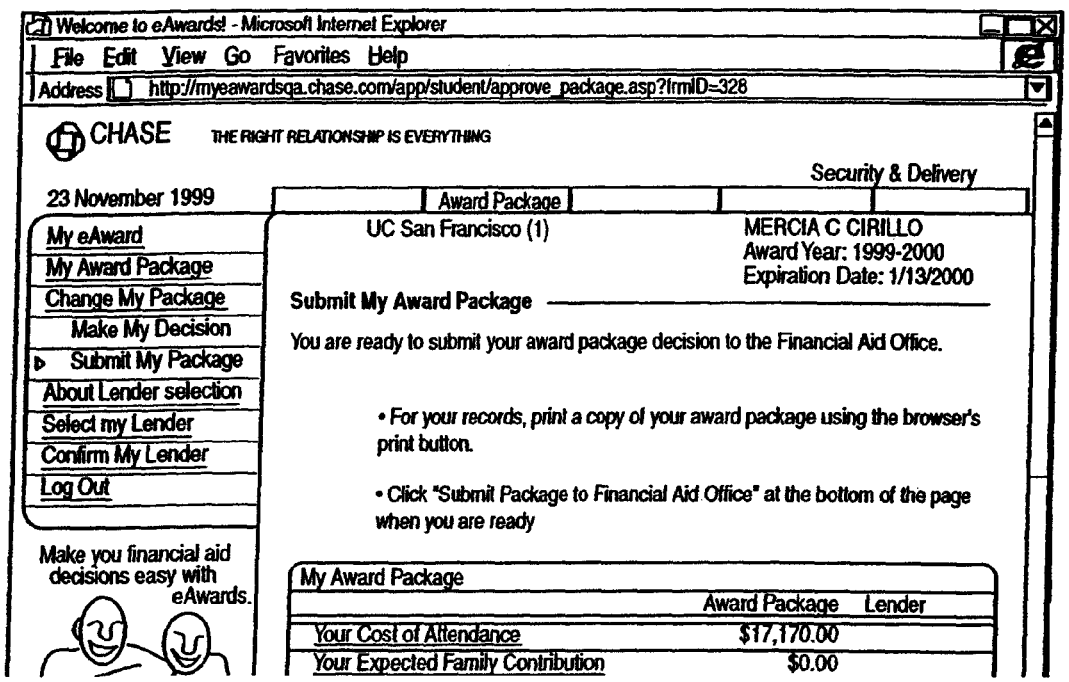

FIG. 316

| My Award Package | | |
|---|---|---|
| | Award Package | Lender |
| Your Cost of Attendance | $17,170.00 | |
| Your Expected Family Contribution | $0.00 | |
| Financial Need | $17,170.00 | |
| Award Package | | |
| Grants | | |
|    Fed Pell Grant | $1,000.00 | |
| Scholarships | | |
|    Jacobs Schol | $1,000.00 | |
| Jobs | | |
| Loans | | |
|    Sub Stafford Loan | $3,500.00 | Chase |
| Student Financing Options | | |
|    Student Loan 1 | $1,000.00 | Farmers Union |
|    Student Loan 2 | $1,000.00 | Union Bank |
| Parent Financing Options | | |
|    PLUS Parent | $1,000.00 | Citibank |
|    Alternate Loan 2 | $1,000.00 | Chase |
| Your Remaining ????? Need | $7,670.00 | |

◁ Back    [SUBMIT PACKAGE TO FINANCIAL OFFICE ▷]

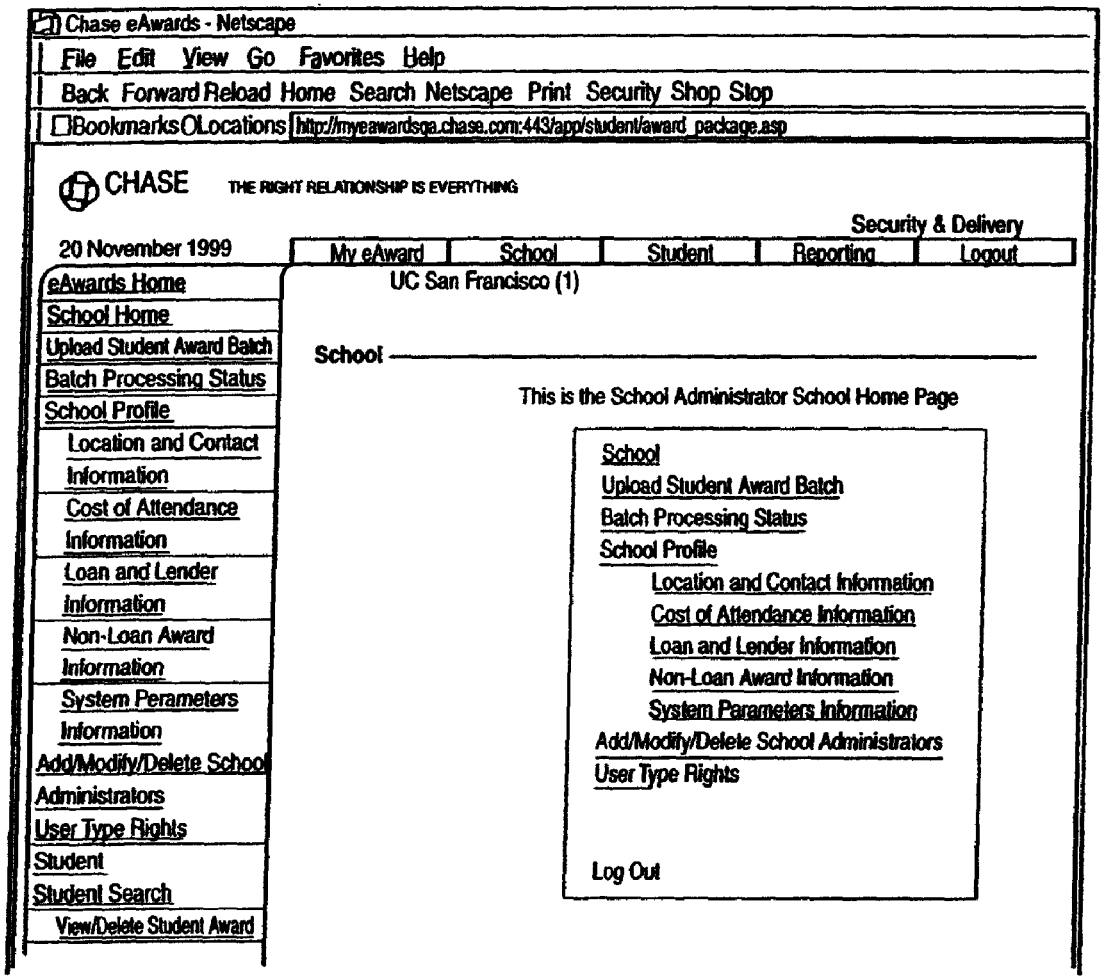
FIG. 5A1

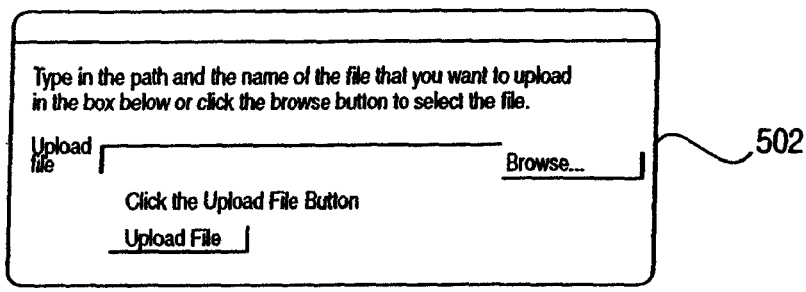
FIG. 5B
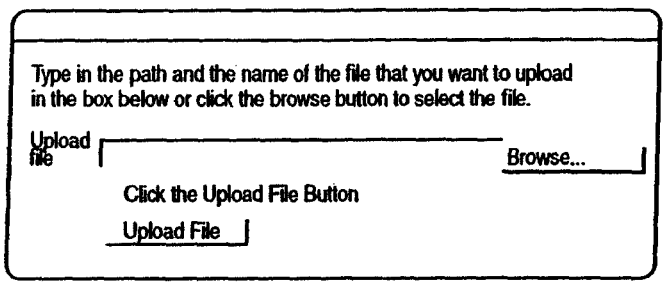
FIG. 5B1
FIG. 5C1

Batch processing Status
Please select a file to view. For details on processing results, click on the filename.

Please select the status of the batch you wan to see:
[All ▼] 506

[Go]

| Date of Upload | Filename | Records | Records Accepted | Status |
|---|---|---|---|---|
| 11/20/99 10:02 PM | uploadfile.txt | 0 | 0 | Rejected |
| 11/14/99 9:00 PM | UCSF1test1inet.mdb | 10 | 10 | Processed |
| 11/11/99 2:47 PM | UCSF1awards.mdb | 155 | 155 | Processed |
| 11/11/99 2:46 PM | vssver.scc | 0 | 0 | Rejected |

504

(Return to School Menu)

Welcome to eAwards! - Microsoft Internet Explorer
File  Edit  View  Go  Favorites  Help
Address: http://myeawardsqa.chase.com/app/student/amend_package.asp

CHASE  THE RIGHT RELATIONSHIP IS EVERYTHING

Security & Delivery

24 November 1999 | School
UC San Francisco (1)

Sidebar:
- eAwards Home
- ▽School Home
- Upload Student Award Batch
- Batch Processing Status
- ▷School Profile
  - Location and Contact Information
  - Cost of Attendance Information
  - Loan and Lender Information
  - Non-Loan Award Information
  - System Parameters Information
- Add/Modify/Delete School Administrators
- User Type Rights
- Student
- Student Search
- View/Delete Student Award

Profile Menu

Each link below provides you with your school's eAwards profile. These are usually reviewed and modified, if necessary, on an annual basis. Changes can be made at any time, however, and are actually submitted on-line to the eAwards Administrators, who will then update the system. Click on any link below to begin your review.

Location and Contact Information
Cost of Attendance Information
Loan and Lender Information
Non-Loan Award Information
System Parameters Information

508 http://myeawardsqa.chase.com/app/student    Internet Zone

FIG. 5D

Location Information

| | | | |
|---|---|---|---|
| FICE/OPEID | 2847 | School Name | UC San Francisco (1) |
| Branch Code | 1 | Street Address | 1 Sunset Blvd. |
| School Short Name | UCSF1 | City | San Francisco |
| Branch Name | UCSF1 | State | CA |
| Department Name | Office of Financial Aid | Zip + 4 | 94131 |

Primary Contact Information

Primary User
- Name: Peggy Yu
- Title: Vp
- e-Mail: peggy.yu@chase.com
- Phone: 212-552-4031
- Fax: 212-552-0125

Primary technical User
- Name: Tom Mcguire
- Title:
- e-Mail: thomas.m.mcguire@chase.co
- Phone: 516-745-3957
- Fax:

Secondary Contact Information

Secondary User
- Name: Michele D. Goldberg
- Title: Vp
- e-Mail: michele.d.goldberg@chase.co
- Phone: 212-552-4433
- Fax: 212-552-0125

Secondary technical User
- Name:
- Title:
- e-Mail:
- Phone:
- Fax:

◄ Back  Submit

FIG. 5D1

Cost of Attendance Information

Rates of Increase

| | Annual Rate of Increase(%) |
|---|---|
| Direct Cost (511) | |
| Tuition: | 5 |
| Room and Board: | 8 |
| Books and Supplies: | 5 |
| Transportation: | 5 |
| Miscellaneous: | 5 |
| Indirect Cost (512) | |
| Room and Board: | |
| Books and Supplies: | |
| Transportation: | |
| Phone: | |
| Miscellaneous: | |

510

◄ Back  Submit

FIG. 5E

| Priority | Award | Grade Level | Min.($) | Max.($) | Interest Rate(%) | Repayment Period (Mo.) | |
|---|---|---|---|---|---|---|---|
| 1 ▼ | PLUS | | 0.00 | 10,000.00 | 9.00 | 120 | Lenders |
| 2 ▼ | PLUS Loan | 1 | 0.00 | 1,200.00 | 9.00 | 120 | Lenders |
| | | 2 | 0.00 | 2,200.00 | | | |
| | | 3 | 0.00 | 3,200.00 | | | |
| | | 4 | 0.00 | 4,200.00 | | | |
| | | 5 | 0.00 | 5,200.00 | | | |
| | | 6 | 0.00 | 6,200.00 | | | |
| | | 7 | 0.00 | 7,200.00 | | | |
| | | 8 | 0.00 | 8,200.00 | | | |
| 3 ▼ | Perkins | | 0.00 | 10,000.00 | 9.00 | 300 | Lenders |
| 4 ▼ | Sub Stafford Loan | 1 | 0.00 | 2,625.00 | 8.25 | 120 | Lenders |
| | | 2 | 0.00 | 2,625.00 | | | |

FIG. 5F

Academic terms
Enter the term convention for your school.

| 1. Fall | 2. Spring | 3. |
| 4. | 5. | 6. |
| 7. | 8. | 9. |
| 10. | 11. | 12. |

Parameters
| Account Aging Parameters (Days) | 365 |
| Response Aging Parameters (Days) | 90 |

Preferences
Select your preferences for the students

| Display cost of attendance | ○ Yes | ● No |
| Display student activity | ● Yes | ○ No |
| Display line item breakdown | ○ Yes | ● No |
| Allow Downloadable Spreadsheet | ● Yes | ○ No |
| Is Federal Unsubsidized Loan Packaged? | ● Yes | ○ No |
| Is Tuition Payment Plan Available | ● Yes | ○ No |
| Is School Subject to One Lender Rule? | ● Yes | ○ No |
| Will School Transmit Outstanding Debt? | ○ Yes | ● No |
| Which Federal Stafford Loan Program does your school participate in? | FFELP Only ▼ |
| Which Federal PLUS Loan Program does your school participate in? | FFELP Only ▼ |

◀ Back  Submit

FIG. 5H

| Priority | Award | Min. | Max. | Interest Rate | Period |
|---|---|---|---|---|---|
| 1 | FSAG Grant | 0 | 10000 | 0 | 0 |
| 2 | FSEOG Grant | 0 | 10000 | 0 | 0 |
| 3 | Fed Pell Grant | 0 | 0 | 0 | 0 |
| 4 | Increase | 0 | 1000 | 1.23 | 120 |
| 5 | Johns Award | Grade 1:0<br>Grade 2:0<br>Grade 3:0<br>Grade 4:0<br>Grade 5:0<br>Grade 6:0<br>Grade 7:0<br>Grade 8:0 | 1000<br>1000<br>1000<br>1000<br>1000<br>1000<br>1000<br>1000 | | 120 |
| 6 | Rutgers Grant 2 | 1 | 5000 | 0 | 0 |
| 7 | Rutgers Inst Grant 1 | 1 | 0 | 0 | 0 |

| Priority | Award | Min. | Max. | Interest Rate | Period |
|---|---|---|---|---|---|
| 1 | PLUS | 0 | 10000 | 5 | 0 |

FIG. 5G

Administrator List

Below are the current authorized users to administrator eAwards for your school. To add a new user, select "school administrator."

| User Name | School Short Name | Last Name | First Name | Active |
|---|---|---|---|---|
| 28471 clerk | UCSF1 | lname | fname | Y |
| 28471 coun1 | UCSF1 | lname | fname | Y |
| 28471 coun2 | UCSF1 | lname | fname | Y |
| 28471 nonf | UCSF1 | lname | fname | Y |
| 28471 prof | UCSF1 | lname | fname | Y |
| 28471 super | UCSF1 | lname | fname | Y |
| 28471 supp | UCSF1 | lname | fname | Y |
| johnel1 | UCSF1 | Nelson | john | Y |
| sadmgi clerk | UCSF1 | lname | fname | Y |
| sadmgi coun1 | UCSF1 | lname | fname | Y |
| sadmgi coun2 | UCSF1 | lname | fname | Y |
| sadmgi nonf | UCSF1 | lname | fname | Y |
| sadmgi prof | UCSF1 | lname | fname | Y |
| sadmgi super | UCSF1 | lname | fname | Y |
| sadmgi supp | UCSF1 | lname | fname | Y |
| ucsf1 admin | UCSF1 | lname | fname | Y |

(Add School Administrator)

Search Student ─────────────

To search by student, please enter the name or ID/SSN

Search By:
Student ID [ ]
or
Student Last Name [ ]
Student First Name [ ]
[ Search ]  ──── 526

FIG. 5I1

Search Results ─────────────

Below are the results of your student search. Click on a student name to view or delete the student award, view the student package history, or input a student response.

| Last Name | First Name | Student Id | Active |
|-----------|------------|------------|--------|
| DOSSOUS | BILLY | 001010606 | Y |

FIG. 5I2

Student ─────────────

Below are your options to manage student population currently uploaded in eAwards.

Award Package For
BILLY D DOSSOUS
ID/SSN 001-01-0106
7614 Bay Parkway
Queens, CT 11111-010
111-111-1216
Enabled
Student
View/Input Student Response
View Student Package History ( Delete Student Award )

Report

- To obtain a copy of the results into your system, click on "Download Report Results".
  (Note: you must manually change the file extension to .csv in the file browser dialog)
- You can also click on the arrows in the header column to have the report sorted differently.
- Lastly, if you would like to view other report, please click on "View Another Report".

Accepted

| Student ID | Student Name | Action Date |
|---|---|---|
| 001010541 | BROWN, SALVADOR | 11/16/99 |
| 001010548 | BUSTER, STACY | 11/20/99 |

( Download Report Result )   View Another Report ▶

FIG. 5J2

Select Report Criteria

Please select criteria

Save As dialog:
- Save As: Desktop
- My Computer, Network Neighborhood, -WRL0001.tmp, 887860-001.jpg, 985278-001.jpg, Acrobat reader 4.0
- AOL Instant Messenger (TM), chase_ft.ppt, corevalues.ppt, deliverables.doc, dialup.txt, eawards.ppt
- aacopy.DO, freelance_in, XL Options, XL-New Yo, John Nelso, MJ101w32
- Save As: eAwardsDownload.mdb  Save
- Save As type: All Files(*.*)  Cancel Student Status: Acc
Date
From:
To:

( Download File )  ( Submit )

Loan
Total PLUS Loan Acceptances
Lender Summary for the PLUS Loan

FIG. 5J3

Chase — The Right Relationship is Everything.

| Date | eAwards Home | School Administration | Access Control | Reporting | Log Out | eAwards Admin. E3 Select Report Criteria

School Administration
Add/Modify/Delete Award
Add/Modify/Delete Lender
Search School

Access Control
View User Type Rights
Add/Modify/Delete Administrators
Reset Student Password
View/Modify System Parameters

Reporting
Select Report Criteria

Select Report Criteria
Text - Instructions

School:  Select School
  All
  School 1
  School 2
  School 3
  School 4
  School 5
— 730

Student Status:  Select Student Status ▼
  All
  Accepted
  Declined
  Pending
  No Visit
— 732

Lender:  Select Lender
  All
  Lender 1
  Lender 2
  Lender 3
  Lender 4
  Lender 5
— 734

Date
  From: _____ — 736
  To: _____

Sort By:  Select Sort Order ▼
  School FICE
  School Name
  Student ID
  Student Last Name
  Lender Code
  Lender Name Graphic Submit

FIG. 7F

ON-LINE HIGHER EDUCATION FINANCING SYSTEM

RELATED APPLICATION

This patent application is a Continuation (CON) of U.S. patent application Ser. No. 11/207,992, filed on Aug. 22, 2005 entitled "ON-LINE HIGHER EDUCATION FINANCING SYSTEM", which is a Divisional (DIV) of U.S. patent application Ser. No. 09/563,299, now U.S. Pat. No. 7,062,462, filed on May 2, 2000 entitled "ON-LINE HIGHER EDUCATION FINANCING SYSTEM", which are hereby incorporated by reference in their entirety.

BACKGROUND OF THE INVENTION

1. Field of the Invention

The present invention relates to a method and apparatus for providing a user with education financing information and, more particularly, relates to enabling the user to receive financial award information from an educational institution over a computer network concerning a potential student and enabling that user to obtain cost projection information, such as loan repayment information, based on the award.

2. Related Art

Many individuals require financial assistance in paying for an education, whether it be in the form of grants, scholarships, special employment (e.g., work-study programs), and/or loans. Many such educational institutions (e.g., schools, such as colleges and universities) provide various forms of assistance in obtaining financial aid for potential students.

Typically, financial aid offices at schools assemble financial award information including, for example, financial aid award packages containing monetary awards which are funded from one or more grants, scholarships, work study or teaching assistanceship jobs, and/or loans. Representatives of the financial aid offices will often tailor these financial aid award packages for the potential students and, therefore, the awards will often be different (based on, for example, financial need, the desirability of the student, etc.).

The financial aid office will mail many (i.e., a batch or lot) financial aid award packages to potential students with the hope that the financial aid award is attractive to the student and that the student will accept the award and attend the school. The cost for mailing many financial aid award packages can be substantial, for example, each package may cost approximately $10.00 to mail to 1000 potential students. Accordingly, schools are interested in other modes of transmitting financial aid award packages to their potential students which are less costly.

Typically, the loans which find the financial aid awards include federal loans, such as Perkins and Stafford loans. The interest rates for these loans are not within the control of the schools or the financial institutions which issue those loans and, therefore, the student/parent decision on accepting a financial aid award package usually is influenced in other ways. Further, the schools and financial institutions will have little opportunity to influence the potential students to accept the award after the packages have been sent out in the mail. Accordingly, schools and financial institutions are interested in other modes of influencing the potential students to accept the award packages and admission after the awards are mailed.

The amount of money offered in a financial aid award package for a particular student is often dependent on a total amount of funds available to the school by way of grants, scholarships, work-study, etc. Accordingly, when potential students decline financial aid award packages additional funds may be available to offer to the other potential students, thereby positively influencing the student/parent decision on accepting a financial aid award package and attending the school. Thus, the schools are interested in obtaining a student/parent decision on the financial aid award packages as soon as possible. Unfortunately, using current processes there may be significant delays between the time that a student receives a financial aid award package and the time that the student responds to the package with an acceptance or declination.

A student/parent must weigh many factors in accepting or declining a financial aid award package. In particular, the student/parent must determine whether he or she can afford to attend the school even if a financial aid award package is given. Thus, the student/parent must review the cost of attendance, including any direct and indirect costs, in light of the financial aid award package and project the net costs to the student/parent in meeting the unmet needs (including loan repayment schedules) for attendance. This typically involves contacting an expert (or accessing some software) who is capable of projecting costs for the student/parent based on input from the student/parent. In working with an expert, the student/parent should consider prior school loan obligations (for example, loans incurred to obtain an earlier degree or course of study) in projecting the costs and loan repayment obligations to attend another school. In determining loan repayments, the student/parent should consider total loan balance, a repayment schedule, interest rate(s), etc. Loan repayment information should be obtained for particular school terms, particular years, and a total for all years of study.

A system called CollegeNET has been developed and offered by Sallie Mae which provides a system for presenting financial award information over the Internet to potential students. A particular school mails an award letter to a potential student which includes a user name and password to access a secure website. The student logs onto the website and accesses their financial aid award package. The student can choose a preferred lender if a loan is awarded and input other information necessary for accepting the award. The student's response to the award is reported to the school.

Unfortunately, the CollegeNET system suffers from several disadvantages, among others: (i) the website does not provide an opportunity to review cost projections or manipulate loan variables such that the student/parent can determine what the loan repayment obligations will be; (ii) the student/parent cannot modify the financial aid award package to reflect other sources of funds which would alter cost projections and/or loan repayment obligations; and (iii) the system does not provide the student/parent with information as to the break-out of the cost of attendance in terms of direct and indirect costs to the student/parent.

Sallie Mae, Nellie Mae, Educaid, and Citibank offer on-line websites which provide calculating functions to project costs, such as loan repayment obligations. These systems, however, are not linked with a financial aid award package website and, therefore, require the user to input all information necessary for obtaining a cost projection or loan repayment schedule.

Further, in addition to financial aid based on need, some students obtain financial aid based on merit, or a combination of need and merit. There is a need for users to be able to determine education financing requirements based on merit based financial aid packages as well as combination packages. Further, there is a need for users to be able to determine financial requirements for students for higher education even where no financial assistance is provided.

Accordingly, there is a need for a new method and apparatus for providing students and parents with education financing information, particularly financial aid award packages, where the student/parent can: (i) easily review the financial aid award package; (ii) review cost projections (e.g. loan repayment information); (iii) view and select potential lenders; (iv) modify a financial aid award package to include, for example, other sources of funds outside the award or to increase/decrease, for example, the amount(s) of loan(s) awarded, so that a more informed decision may be made. There is also a need for a method and system which can: (i) reduce the costs for a school to transmit financial aid award packages to potential students; (ii) quickly modify the financial aid award packages based on accept/decline/postpone decisions of the students/parents; and (iii) provide influence on the student/parent decision at the time of reviewing the award package.

SUMMARY OF THE INVENTION

In order to overcome the disadvantages of the prior art, a method according to one aspect of the present invention provides the steps of: maintaining an electronic site on a computer network to which the user may connect; sending data to the user over the network for presenting at least one electronic screen which contains financial award information concerning a potential student of an educational institution, the financial award information including a monetary award which may be used by the student to attend the educational institution; and sending data to the user over the network when requested for presenting at least one electronic screen which contains cost projection information, the cost projection information being a function of the award and including an amount of money required for the student to attend the educational institution.

A method according to another aspect of the invention includes the steps of: maintaining an electronic site on a computer network to which the user may connect; sending data to the user over the network for presenting at least one electronic screen which contains financial award information concerning a potential student of an educational institution, the financial award information including a monetary award which may be used by the student to attend the educational institution, the award including funds taken from at least one of grants, scholarships, loans, and future employment of the student; and sending data to the user over the computer network for presenting at least one electronic screen which includes an input field operable to receive data from the user representing funds other than those of the award to aggregate with the award to obtain a modified award.

A method according to yet another aspect of the present invention includes the steps of: maintaining an electronic site on a computer network to which users and an administrator of an educational institution may connect; sending data to each of the users over the network for presenting at least one electronic screen which contains financial award information concerning potential students of an educational institution, the financial award information including a monetary award which may be used by the respective students to attend the educational institution, the award including funds taken from at least one of grants, scholarships, loans, and future employment of the student; sending data to the administrator over the computer network for presenting at least one electronic screen which includes reporting information indicating whether respective users have at least one of accepted, declined, and deferred a decision on, the respective awards; and sending modified financial award information to at least one of the potential students, the modified financial award information including at least one modified monetary award based on the reporting information.

The scope of the present invention includes an apparatus for providing a user with education financing information comprising: a processor; a storage medium coupled to the processor; and a network interface coupled to the processor and operable to send and receive data over a computer network, the processor being operable to execute instructions in accordance with a computer program which is at least partially stored in the storage medium, the computer program being operable to instruct at least one of the processor and the network interface to perform the functions of: maintaining an electronic site on a computer network to which the user may connect; sending data to the user over the network for presenting at least one electronic screen which contains financial award information concerning a potential student of an educational institution, the financial award information including a monetary award which may be used by the student to attend the educational institution; and sending data to the user over the network when requested for presenting at least one electronic screen which contains cost projection information, the cost projection information being a function of the award and including an amount of money required for the student to attend the educational institution.

According to another aspect of the present invention, an apparatus for providing a user with education financing information includes: a processor; a storage medium coupled to the processor; and a network interface coupled to the processor and operable to send and receive data over a computer network, the processor being operable to execute instructions in accordance with a computer program which is at least partially stored in the storage medium, the computer program being operable to instruct at least one of the processor and the network interface to perform the functions of: maintaining an electronic site on a computer network to which the user may connect; sending data to the user over the network for presenting at least one electronic screen which contains financial award information concerning a potential student of an educational institution, the financial award information including a monetary award which may be used by the student to attend the educational institution, the award including funds taken from at least one of grants, scholarships, loans, and employment of the student; and sending data to the user over the computer network for presenting at least one electronic screen which includes an input field operable to receive data from the user representing funds other than those of the award to aggregate with the award to obtain a modified award.

The present invention also includes an apparatus for providing users with education financing information, comprising: a processor; a storage medium coupled to the processor; and a network interface coupled to the processor and operable to send and receive data over a computer network, the processor being operable to execute instructions in accordance with a computer program which is at least partially stored in the storage medium, the computer program being operable to instruct at least one of the processor and the network interface to perform the functions of: maintaining an electronic site on a computer network to which the users and an administrator of an educational institution may connect; sending data to each of the users over the network for presenting at least one electronic screen which contains financial award information concerning potential students of an educational institution, the financial award information including a monetary award which may be used by the respective students to attend the educational institution, the award including funds taken from at least one of grants, scholarships, loans, and employment of the student; sending data to the administrator over the computer network for presenting at least one electronic screen which includes reporting information indicating whether respective users have at least one of accepted, declined, and deferred a decision on, the respective awards; and sending modified financial award information to at least one of the potential students, the modified financial award information including at least one modified monetary award based on the reporting information.

BRIEF DESCRIPTION OF THE DRAWINGS

For the purposes of illustrating the invention, there are shown in the drawing forms which are presently preferred, it being understood, however, that the invention is not limited to the precise arrangements and instrumentalities shown.

FIGS. 3A-3L contain diagrams which schematically represent information which is preferably obtained through a network website in accordance with the flow diagrams of FIGS. 2A-2F;

FIGS. 5A-5J contain diagrams which schematically represent information which is preferably obtained through a network website in accordance with the flow diagrams of FIGS. 4A-4E;

FIGS. 7A-7F contain diagrams which schematically represent information which is preferably obtained through a network website in accordance with the flow diagrams of FIGS. 6A-6F.

DETAILED DESCRIPTION OF THE INVENTION

Figure 1:
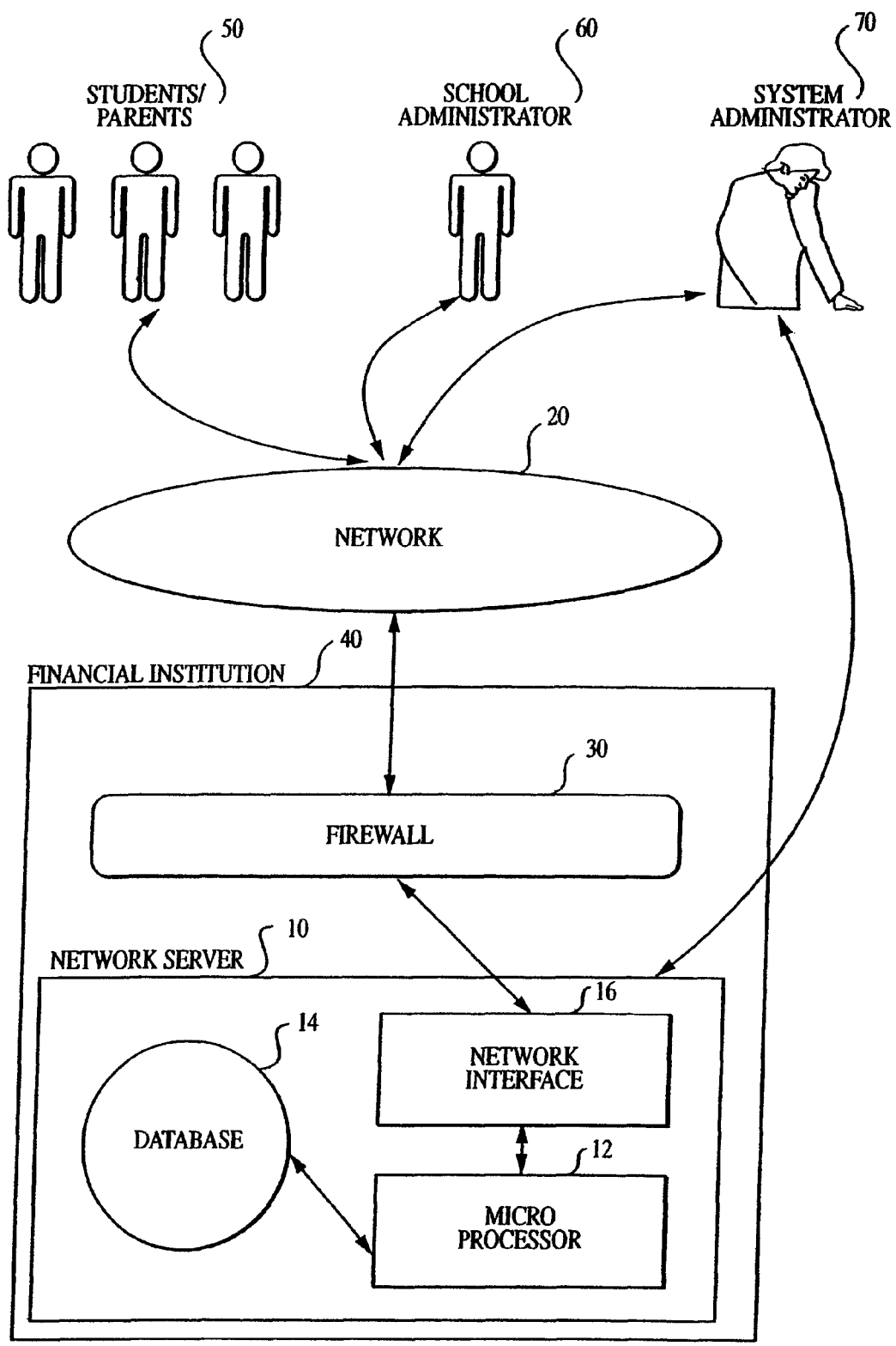
FIG. 1 is a block diagram illustrating the system architecture of the present invention.

With reference now to the drawings wherein like numerals indicate like elements, there is shown in FIG. 1 a block diagram of a system architecture which is suitable for use in practicing the invention. The system preferably includes a network server 10 coupled to a network 20 through a firewall 30. It is most preferred that the network 20 is the Internet, although any computer network is considered within the scope of the invention.

The network server 10 includes a processor, e.g., microprocessor 12, a database 14 coupled to the microprocessor 12, and a network interface (input/output circuit) coupled to the microprocessor 12 and operable to send and receive data over the computer network 20. The microprocessor 12 is operable to execute instructions in accordance with a computer program stored in a memory, not shown in FIG. 1, connected to the microprocessor 12.

Students/parents 50, school administrators 60, and at least one system administrator 70 may access the website established by the network server 10 through the computer network 20 using means which are well known in the art, for example, by mainframe or personal computer, by telephone, or by any other data input/output device. The system administrator 70 may also access the network server 10 directly if desired. As is well known in the art, the firewall 30 provides protection to the network server 10.

Preferably, the network server 10 and firewall 30 are contained within a financial institution 40, such as the Chase Manhattan Bank, and the system administrator 70 is an agent of the financial institution 40.

The computer program is preferably operable to instruct the microprocessor and/or the network interface 16 to perform the functions of maintaining an electronic site (e.g., an Internet website) on the computer network 20 to which the students/parents 50, school administrators 60, and system administrators 70 may connect.

The school administrators 60 preferably transmit financial award information from their respective schools over the computer network 20 concerning the potential students 50. The microprocessor 12 and network interface 16 preferably respond by sending data over the network 20 for presenting at least one electronic screen (i.e., an electronic file containing information suitable for presentation to the students/parents 50) which contains the financial award information.

The school administrator 60 preferably mails a letter to a potential student 50 which contains an announcement that a financial aid award package has been granted to that student 50 and may be obtained by visiting the website on the computer network 20. The letter preferably contains a URL address, user name and password.

Figure 2A:
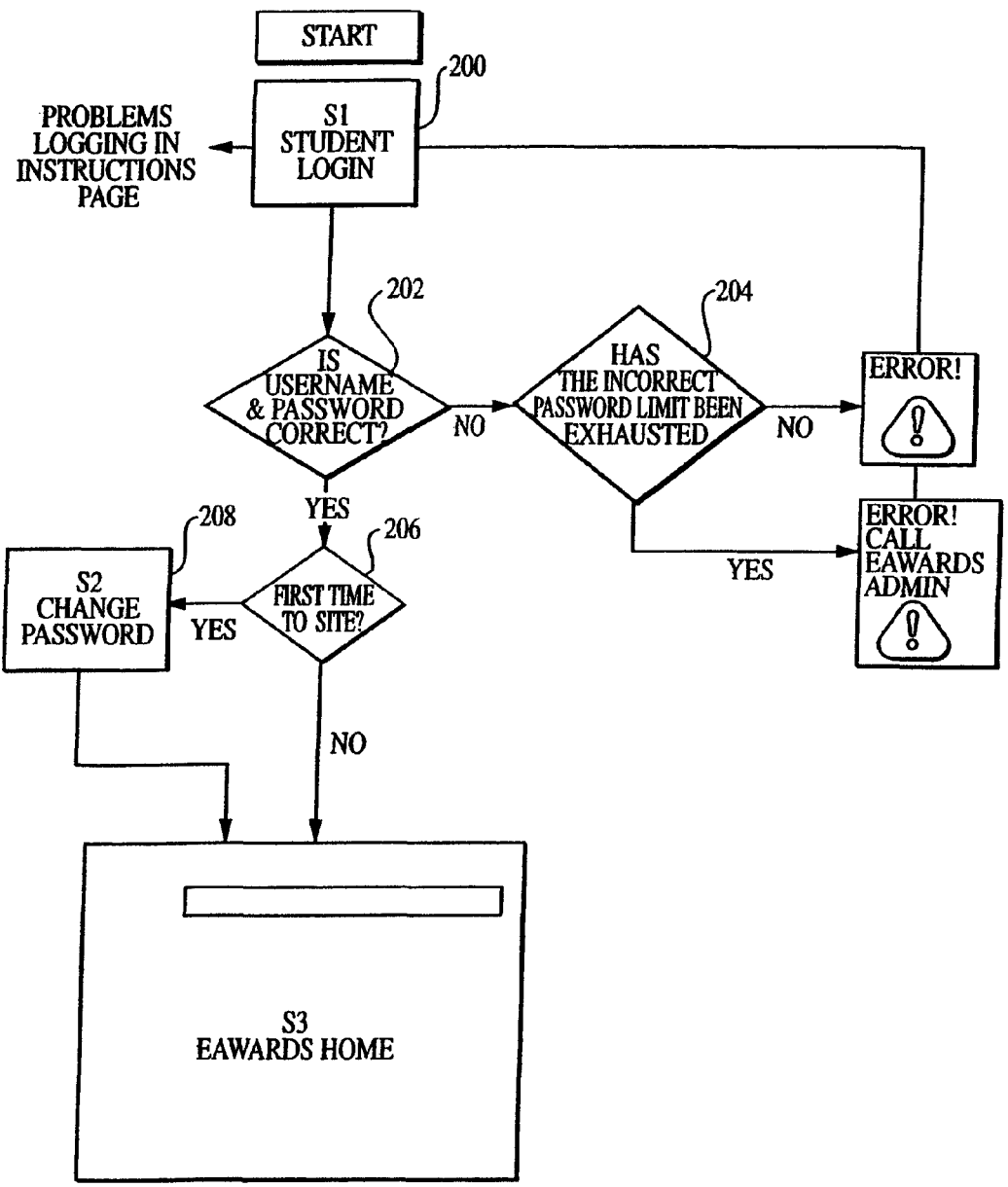
FIGS. 2A-2F contain process flow diagrams illustrating steps and control sequences carried out by the present invention, e.g., the system of FIG. 1, when one or more students/parents interact with the system.
Figure 3A:
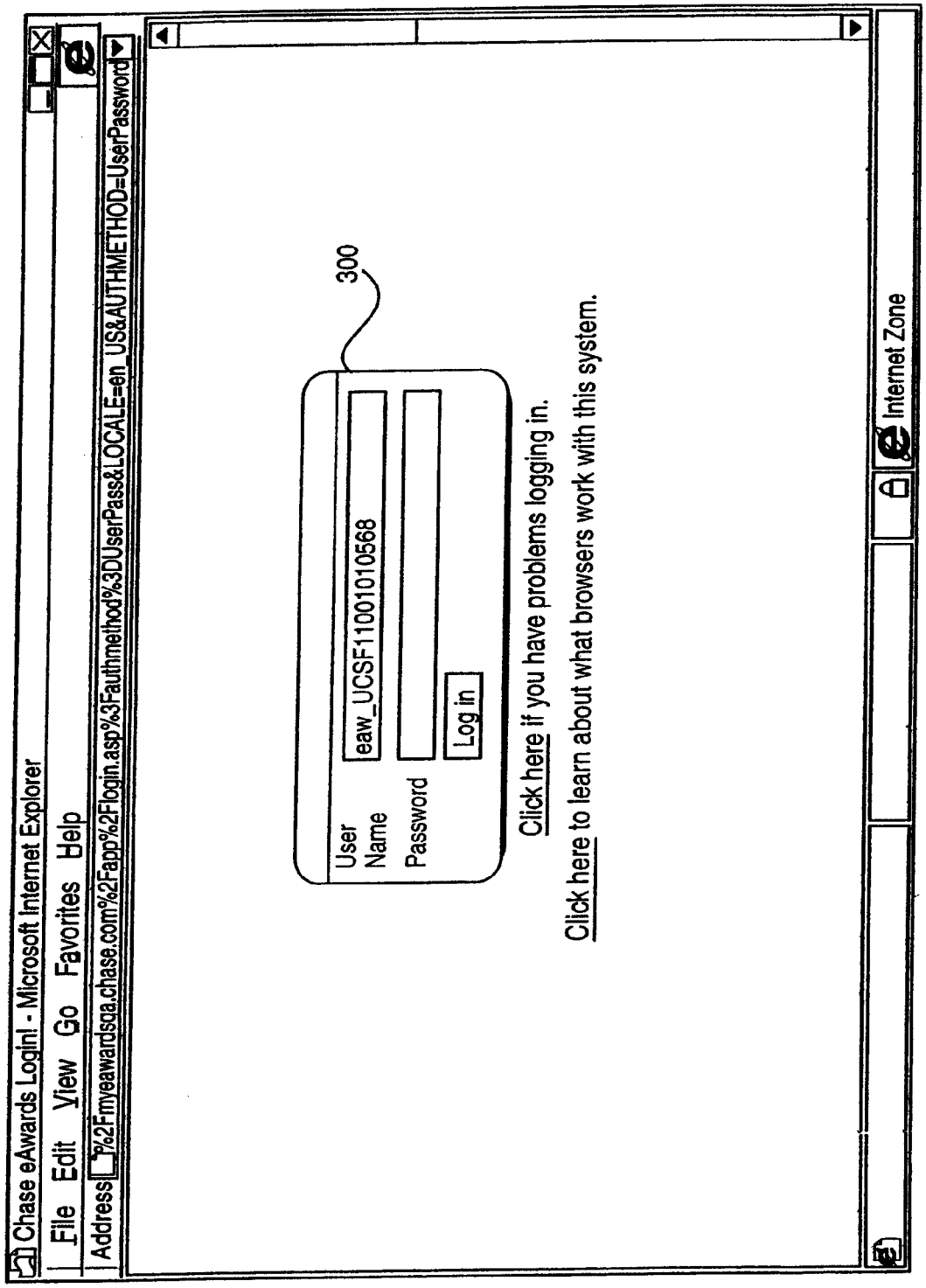

Reference is now made to FIG. 2A which illustrates some of the process flow and control sequences which are in accord with the invention. It is preferred that a student/parent 50 connect to the website provided by the network server 10 using any of the known techniques, for example, by employing an Internet browser and inputting the URL address (START). In response, the network server 10 preferably provides the student/parent 50 with data presenting an electronic screen (FIG. 3A) which facilitates a log-in procedure (step 200, FIG. 2A). FIG. 3A is an illustration of an electronic screen which facilitates the log-in procedure. A dialog box 300 enables the student/parent 50 to enter the user name and password as is well known in the art. Those skilled in the art are familiar with such log-in procedures, which include the steps of entering a user name and password, determining whether they are correct (step 202, FIG. 2A), determining whether an incorrect password limit has been reached (step 204), determining whether the student/parent 50 is visiting the website for the first time (step 206), and changing a password (step 208).

FIG. 3A1 schematically illustrates several areas on a "help" electronic screen which may be used to improve the look and feel and/or the functionality of the website. In particular, area 302 provides a branding site for the financial institution 40, here Chase Manhattan Bank, and provides an area where a slogan or other such indicia may be presented. Area 304 preferably includes navigational icons (breadcrumbs) which may be activated to link the student/parent 50 to other areas of the website. Area 306 preferably provides either still or moving graphics to improve the look and feel of the website. Area 308 preferably provides an area where navigational icons will be disposed, it being understood that these icons are "greyed out" at log-in. An antroductory or "splash" electronic screen may also be provided after the user has successfully logged into the site. This is shown in FIG. 3A2. Area 310 preferably provides an area where indicia welcoming the student/parent 50 to the website and a disclaimer may be presented.

Those skilled in the art will appreciate that the particular schematic layout of the electronic screens of FIGS. 3A, 3A1 and 3A2 are provided by way of example only and that many modifications and variations are possible without departing from the scope of the invention.

Figure 2B:
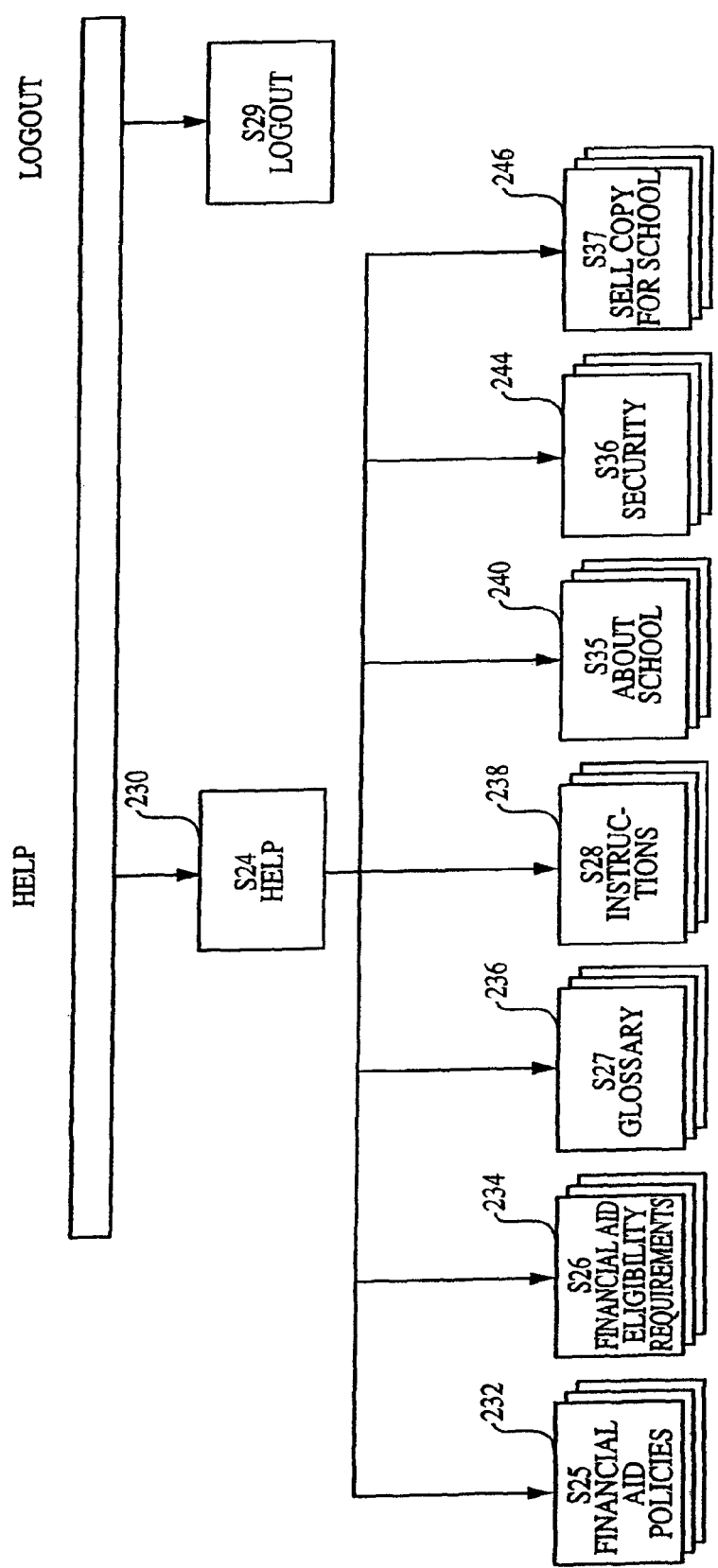
Figure 2C:
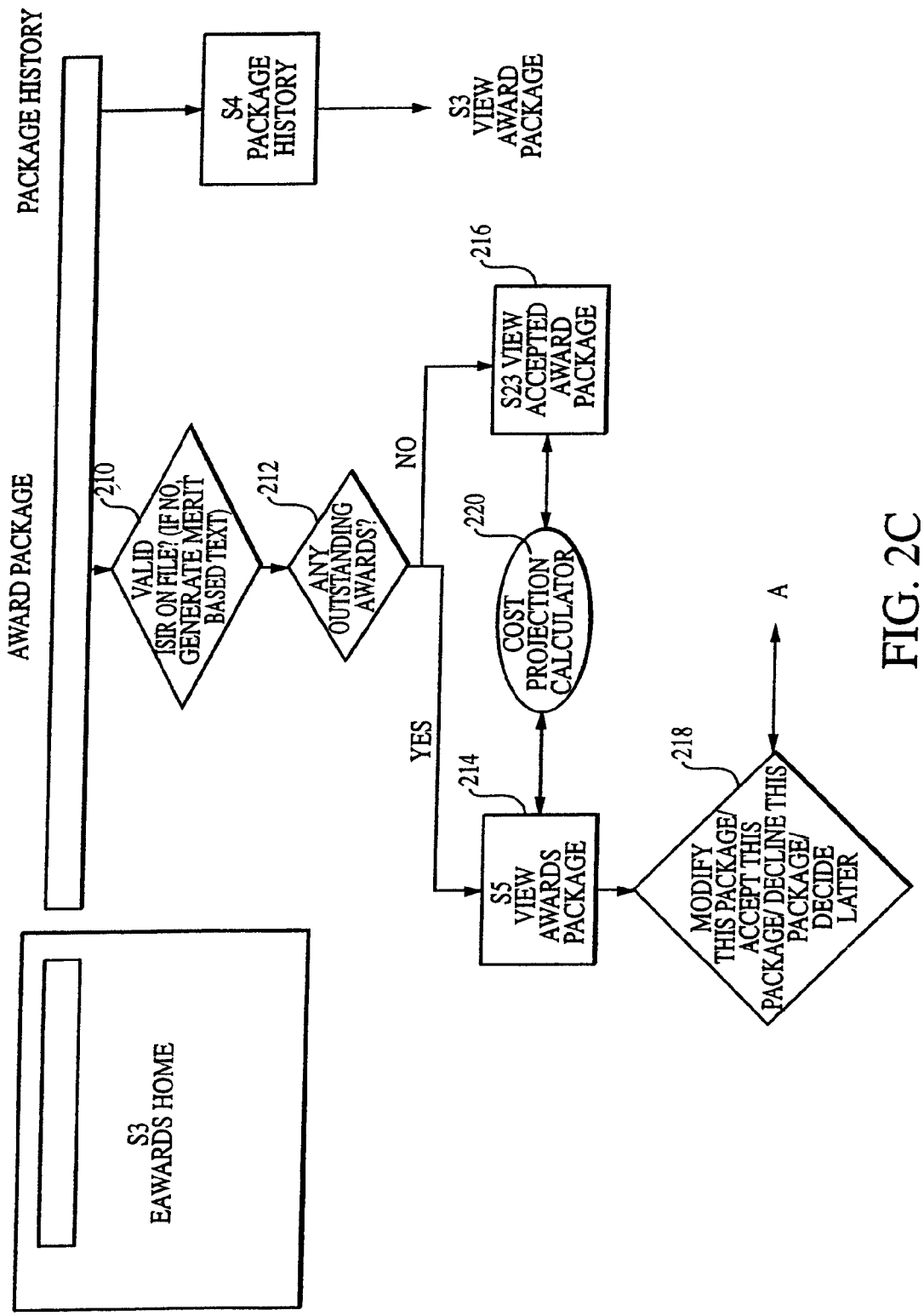
Figure 3B:
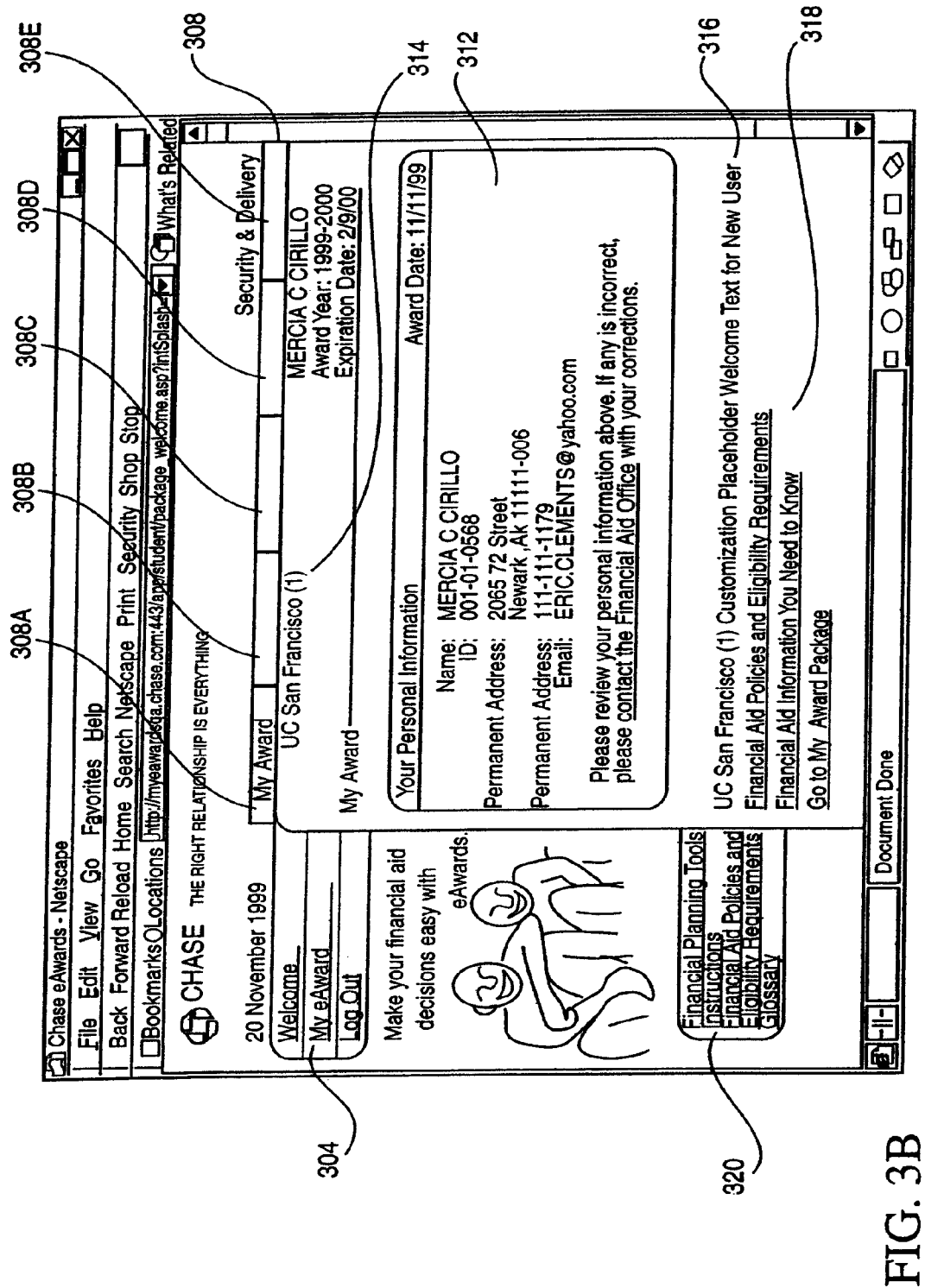

Once the log-in procedure is successfully completed, the process flow and control causes the network server 10 to provide data presenting an electronic screen to the student/parent 50 representing the home page of the website (FIG. 3B). The home page includes an area 312 which identifies the student 50 by name, student ID or social security number, address, and telephone number. The name of the school may be provided at area 314 and a welcome message from that school may be included in area 316. With reference to FIGS. 3B, 2B and 2C, area 318 provides links to other portions of the website, in particular: (i) instructions on how to use the application may be activated and reviewed (step 238); (ii) a link to the student's 50 award package may be activated (step 210, FIG. 2C); (iii) a link to the policies, rules, and/or regulations for financial aid may be activated (step 232); (iv) a link to financial aid eligibility requirements may be activated (step 234); (v) a link to information about the school may be activated (step 240); (vi) a link to security information about the website may be activated (step 244); and (vii) a link to additional information about the school, such as promotional material, may be activated (step 246).

Area 308 (FIG. 3B) preferably provides a series of icons which may be activated by the student/parent 50 to visit specific areas of the website, namely, the home page 308A, the award package information 308B, package history 308C, help 308D, and the log-out screen 308E. In addition, a resource area 320 preferably includes a plurality of additional links to the instructions, the financial aid policies, the financial aid eligibility requirements, a glossary, and a cost projection calculator (financial planning tools).

With reference to FIG. 2C, if a valid Institutional Student Information Report (ISIR) is on file (step 210) and a financial aid award is outstanding (step 212), the student/parent 50 may activate the award package icon 308B (FIG. 3B) or activate the "Go to My Award Package" link at area 318 to view his or her financial aid award package (step 214, FIG. 2C). Alternatively, if the student/parent 50 has already accepted a financial aid award package, then at step 212 the process flow would continue to step 216 where the previously accepted award package could be viewed.

Figure 3C3:
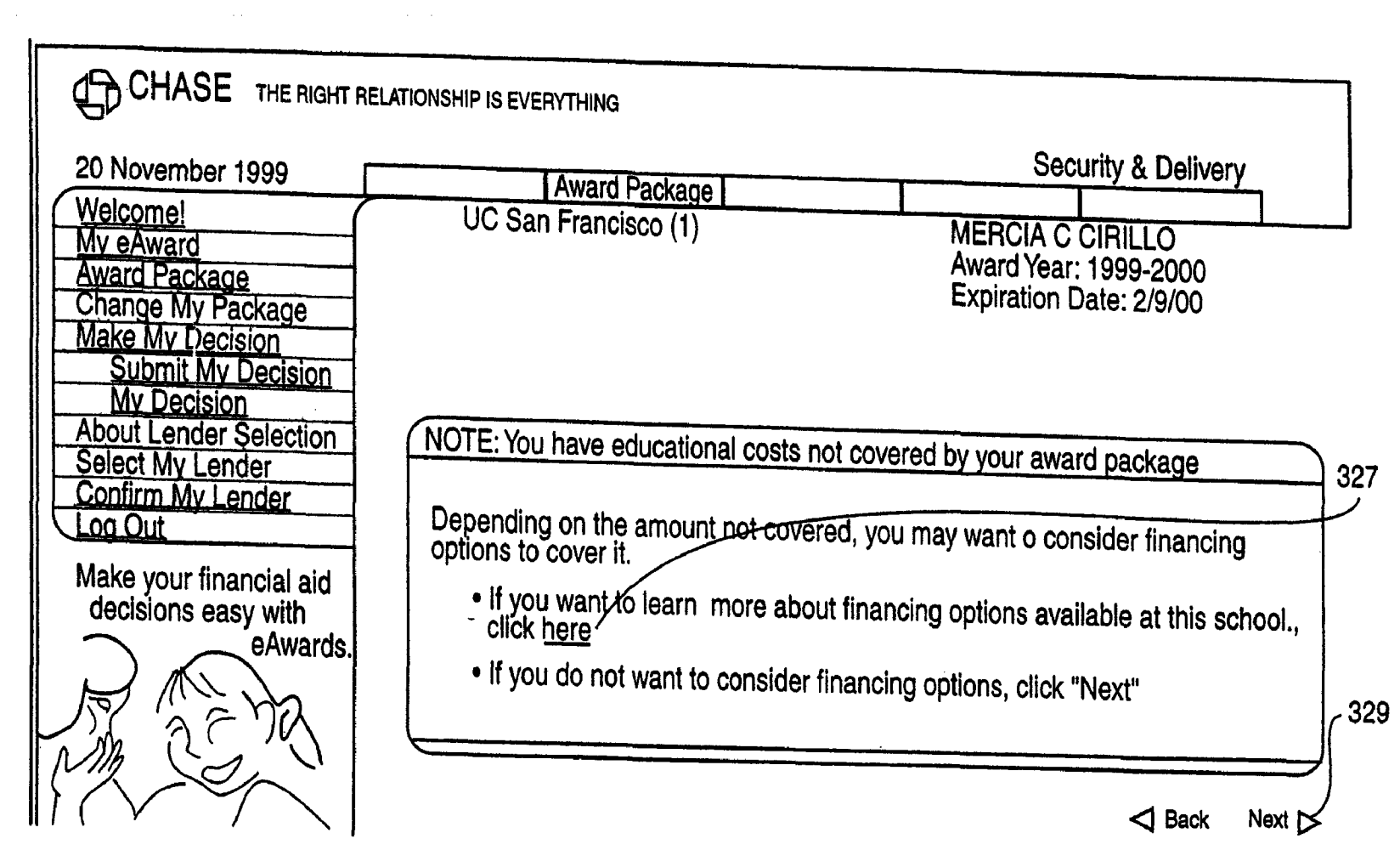

With reference to FIG. 3C, a schematic representation of an electronic screen suitable for presenting the financial aid award package to the student/parent 50 is illustrated. The electronic screen includes an area 322 which contains the details of the financial aid award package. Area 322 preferably includes details on the sources of the funds for the award package, namely: (i) grants (e.g., Federal Pell grant, Federal SEOG, State grants) 322A; (ii) scholarships (e.g., institutional scholarships, non-institutional scholarships, State scholarships, private scholarships, etc.) 322B; (iii) jobs (e.g., Federal work study jobs, institutional work study jobs, teaching assistanceships, etc.) 322C; (iv) and loans (e.g., Federal Perkins loans, Federal Unsubsidized Stafford loans, institutional loans, Plus loans, private loans, private signature loans, etc.) 322D.

Preferably, the amounts of the grants 322A, scholarships 322B, jobs 322C and loans 322D, are shown for at least individual school terms, school years, and totals for the school year 322E. Subtotals for the grants, scholarships, jobs, and loans are also preferably provided. At 322F, a total award package amount is provided which indicates the amount of award money which may be utilized by the student 50 to attend the school for the entire school year.

The screen shown in FIG. 3C also preferably includes additional information, not shown in FIG. 3C but shown in FIG. 3C1. FIG. 3C1 shows the award package information 322 as well as areas 324 and 326.

At area 324, fundamental financial information is preferably provided, namely: (i) the cost of attending the financial institution; (ii) an expected monetary contribution by/for the student 50; (iii) the student's financial need; (iv) the student's total award package; and (v) the student's unmet need. The student's unmet need is the cost of attendance less the expected contribution and the total award package, here $10,170.00.

With reference to FIG. 2C, after reviewing his or her award package, the student/parent 50 may (i) modify the award package; (ii) accept; (iii) decline the award package; (iv) or make a decision regarding the award package at a later date, (step 218). The student/parent 50 may utilize a cost projection calculator (step 220) at any time during his or her visit to the website. In FIG. 3C1, in area 326, by selecting "Continue", the user is provided with the opportunity to make an accept/decline award package decision. This is shown in FIG. 3C2 at area 326A.

FIGS. 3C3 and 3C4 show additional screens which are presented to the user. After the user has reviewed the award package, the user can continue with the process by clicking continue in area 326 of FIG. 3C. If the student has education cost not covered by the award package, a special screen will appear, the "Educational Costs Not Covered" screen. This is shown in FIG. 3C3. This step provides a user with an additional opportunity to consider financing options and/or make changes to cover these costs. If the student's award package covers all educational costs, this screen will not be displayed. The user will automatically be directed to the next step in the process. Turning to FIG. 3C3, the user is presented with several options. The student may take the opportunity to consider other financing options to cover the educational costs not covered by the award package by clicking on the link 327. Alternatively, the student can decide to continue on by clicking next 329.

By clicking "here" to review financing options, the user is presented with a screen listing financing options available, as shown in FIG. 3C4. If the student decides to add financing options to the award package, the process provides a convenient link 327A that brings the student directly to the package worksheet on the "Change My Package" page which will be described later.

Figure 2D:
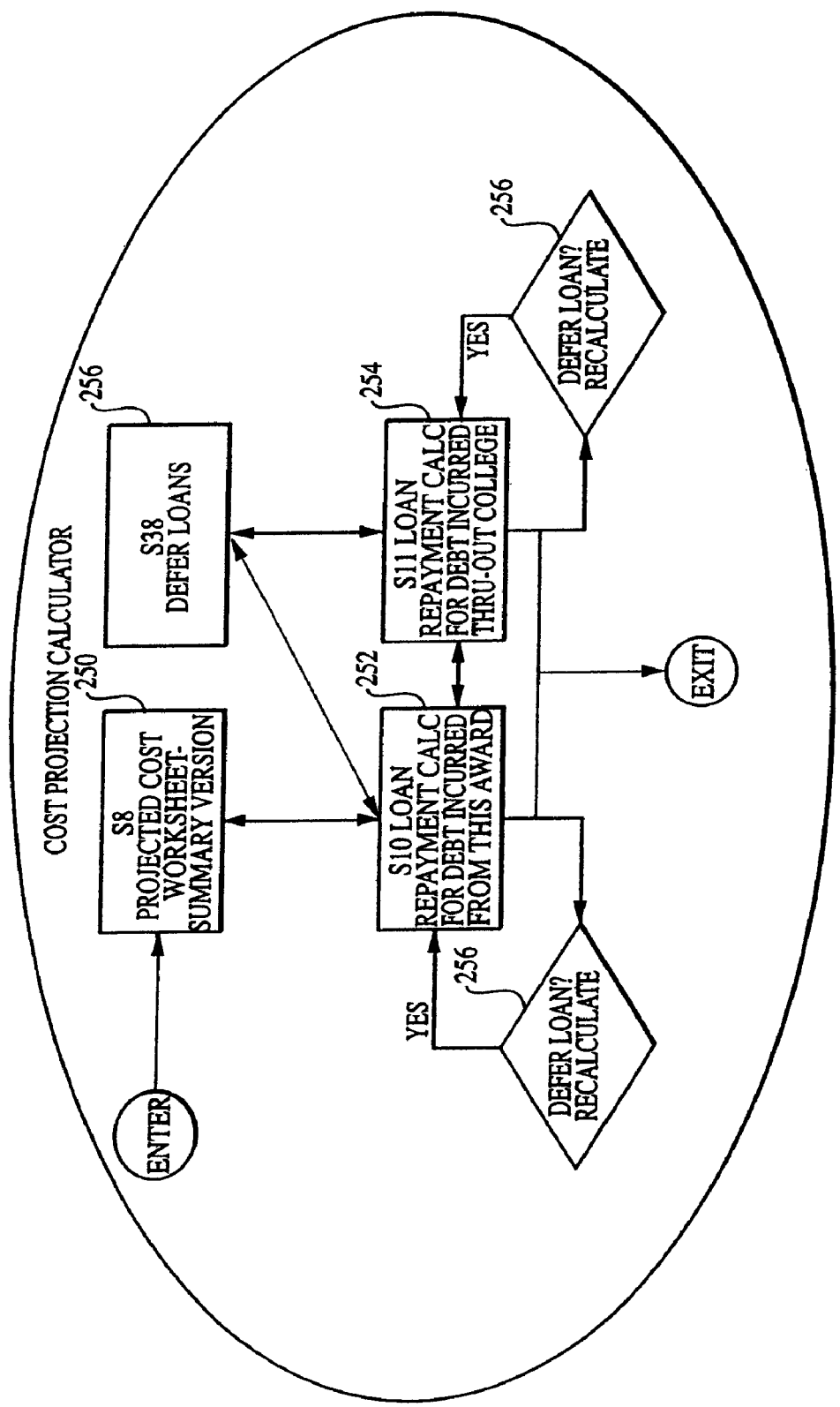

FIG. 3D schematically illustrates an electronic screen providing at least some of the cost projection calculator function and FIG. 2D illustrates the process flow. The electronic screen of FIG. 3D may be invoked by activating the "Use Planning tools" portion of area 326 in FIG. 3C1. Alternatively, the "Financial Planning Tools" portion of the resource area 320 in FIG. 3B may be activated. This corresponds to step 250 of FIG. 2D. The financial projection calculations worksheet screen (FIG. 3D) preferably includes an area 330 containing the details of the student award package 322 which has been automatically transferred from the database 14 (FIG. 1) to the electronic screen of FIG. 3D.

Area 330 also preferably includes at least one of: (i) a cost for the student 50 to attend the school; (ii) an expected monetary contribution by/for the student 50; and (iii) the student's financial need (all designated 334). Although not shown in FIG. 3D, the cost 336 for the student to attend the school may optionally be provided in terms of direct costs, such as tuition, and indirect costs, such as room, board, books, supplies, and/or transportation. Preferably, the total cost of attendance 336 is the sum of the direct and indirect costs of attending the school. The total cost of attendance 336 less the expected monetary contribution 337 results in the financial need 339 of the student/parent 50. A total award package figure may be provided which, when subtracted from the total cost of attendance of the student/parent 50, results in the unmet need 341 of the student/parent 50.

Other financing options may be entered at 338 which will reduce the unmet need 341 and result in a remaining unmet need.

Preferably, the cost of attendance, financial aid package information, and cost projection results are presented in terms of a particular time period, such as a school term or a school year. FIG. 3D illustrates the cost projection information on a yearly basis, namely, 1999-2000, 2000-2001 and 2001-2002.

An icon (not shown) may also preferably be included on the electronic screen of FIG. 3D which, when activated, causes data to be sent to the student/parent 50 for presenting an electronic screen which is suitable for calculating loan repayments (step 252, 254, FIG. 2D). With reference to FIG. 3E, a loan repayment calculator for debt incurred for the current award year is provided. The electronic screen of FIG. 3E schematically illustrates an area 342 which provides a title, instructions for how to utilize the loan repayment calculator and/or a disclaimer. Area 344 includes the loan repayment calculator for a student. If a parent desires to use the loan recalculator, the parent clicks on 345 and the screen of FIG. 3E1 is provided where area 346 includes a loan repayment calculator for the parent.

The loan repayment calculator preferably provides information which includes at least one of (i) an amount of the loan; (ii) a number of months for repayment of the loan; (iii) an interest rate of the loan; (iv) an amount of interest over the life of the loan (total interest); (v) an aggregate of the amount of the loan and the amount of the interest of the loan (total principal plus interest); and (vi) a monthly payment required to pay off the loan in the number of the months for repayment of the loan. As shown in area 344, more than one loan may be included in the calculation, for example, Federal Perkins loans, Federal Subsidized Stafford loans, Federal Unsubsidized Stafford loans, etc. Private loans may also be included in the calculation.

Preferably, the student/parent 50 may add outstanding loan amounts to the repayment schedule in order to change the monthly payments and tailor the loan repayment to their particular needs. Advantageously, students/parents 50 may become better informed regarding their financial aid award package, particularly in terms of their responsibilities for repaying loans, and, therefore, may make a better decision as to whether the financial aid award package should be accepted or declined.

Preferably, area 344A may be activated by the student/parent 50 to display the monthly payments required to pay off the loans (step 256, FIG. 2D). In effect, activating this option shows how deferring interest affects loan repayment schedules. If this is selected, the screen of FIG. 3E2 is presented.

The parent repayment schedule at area 346 of FIG. 3E1 provides a parent 50 with information regarding their obligation for repaying a parent loan. If the student/parent 50 has not secured a parental loan, area 346 will not be displayed.

Preferably, the electronic screen of FIG. 3F includes an input field which, when activated, provides an electronic screen which contains loan repayment information for debt incurred throughout the student's time at college (step 254, FIG. 2D). For example, the student/parent 50 may activate an icon which will cause an electronic screen to be provided to the student/parent 50 which is schematically illustrated in FIG. 3F. The student repayment schedule 350 includes all debt incurred throughout the student's college experience and also includes information regarding prior debt (such as debt incurred at previous schools). The student/parent 50 may enter the prior debt into the appropriate input field which will increase the monthly payment required to pay off all outstanding debts for the student's years of study.

An icon may also be provided (not shown) which, when activated by the student/parent 50, will calculate for informational purposes the monthly payments required to pay off the loans (step 254. FIG. 2D).

If area 351 is selected, the screen of FIG. 3F1 will be presented.

The parent repayment schedule at area 352 of FIG. 3F1 provides a parent 50 with information regarding their obligation for repaying a parental loan. If the student/parent 50 has not secured a parental loan, area 352 will not be displayed.

Advantageously, the financial projections calculator provides the student/parent 50 with a critical tool in making an informed decision regarding the acceptance of a financial aid award package.

Reference is again made to FIG. 3C1 and, more specifically, to area 326. Preferably, the student/parent 50 is provided with an option to activate a "Change My Package" input field. When the "Change My Package" field is activated, the student/parent 50 is preferably sent data for presenting an electronic screen which is illustrated in FIGS. 3G, 3G1, 3G2, 3G3, 3G4, 3G5, 3G6 and 3G7 in accordance with the process flow of FIG. 2E. The electronic screen of FIGS. 3G1-3G7 preferably includes an area 356 entitled "Package Worksheet" and initially contains the details of the financial aid award package provided in FIG. 2E (step 260). In particular, area 356 includes: (i) the cost of attending the school (FIG. 3G1); (ii) the financial aid award package in terms of grants, scholarships, jobs, and loans (FIGS. 3G2, 3G3, 3G4 and 3G5, 3G6 and 3G7).

In general, the Change My Package Worksheet screen provides the student/parent 50 with the ability to make changes to his or her financial aid award package. In particular, one or more input fields are operable to receive data from the student/parent 50 representing fends other than those of the award to add to the award funds and change the unmet need of the student/parent 50. As an example, additional input fields are provided at 358 into which the student/parent 50 may enter the names and amounts of other grants received outside the financial aid award package. Additional input fields are also provided at 360 into which the student/parent 50 may enter the names and amounts of other scholarships outside the award package. In the jobs category (at 362) the student/parent 50 may change the amount of funds provided by the Federal work study, institutional work study, and/or teaching assistanceship. In addition, the amounts provided by the Federal Perkins loan, Federal subsidized Stafford loan, Federal unsubsidized Stafford loan, and/or institutional loan at area 364 may be modified by the student/parent 50. Still further, the student/parent 50 may enter the names and amounts of other financing options at areas 366 and 367 (FIGS. 3G6 and 3G7) to further modify the unmet need.

The amounts entered in the input fields 358, 360, 362, 364, 366 and 367 may be increased or decreased so long as certain rules (e.g., minimum/maximum values) are not violated. For example, the amount of the Federal Pell grant, Federal SEOG, or State grant cannot be modified. Similarly, certain of the scholarships, etc., cannot be modified. After the names and amounts are entered into the modified package worksheet, the student/parent 50 preferably clicks on a "change my package" icon 368 in FIG. 3G8 (step 262, FIG. 2E). This updates the various totals, subtotals and the unmet need. The user also has the option to clear all changes as shown by icon 369 (FIG. 3G8).

Figure 2E:
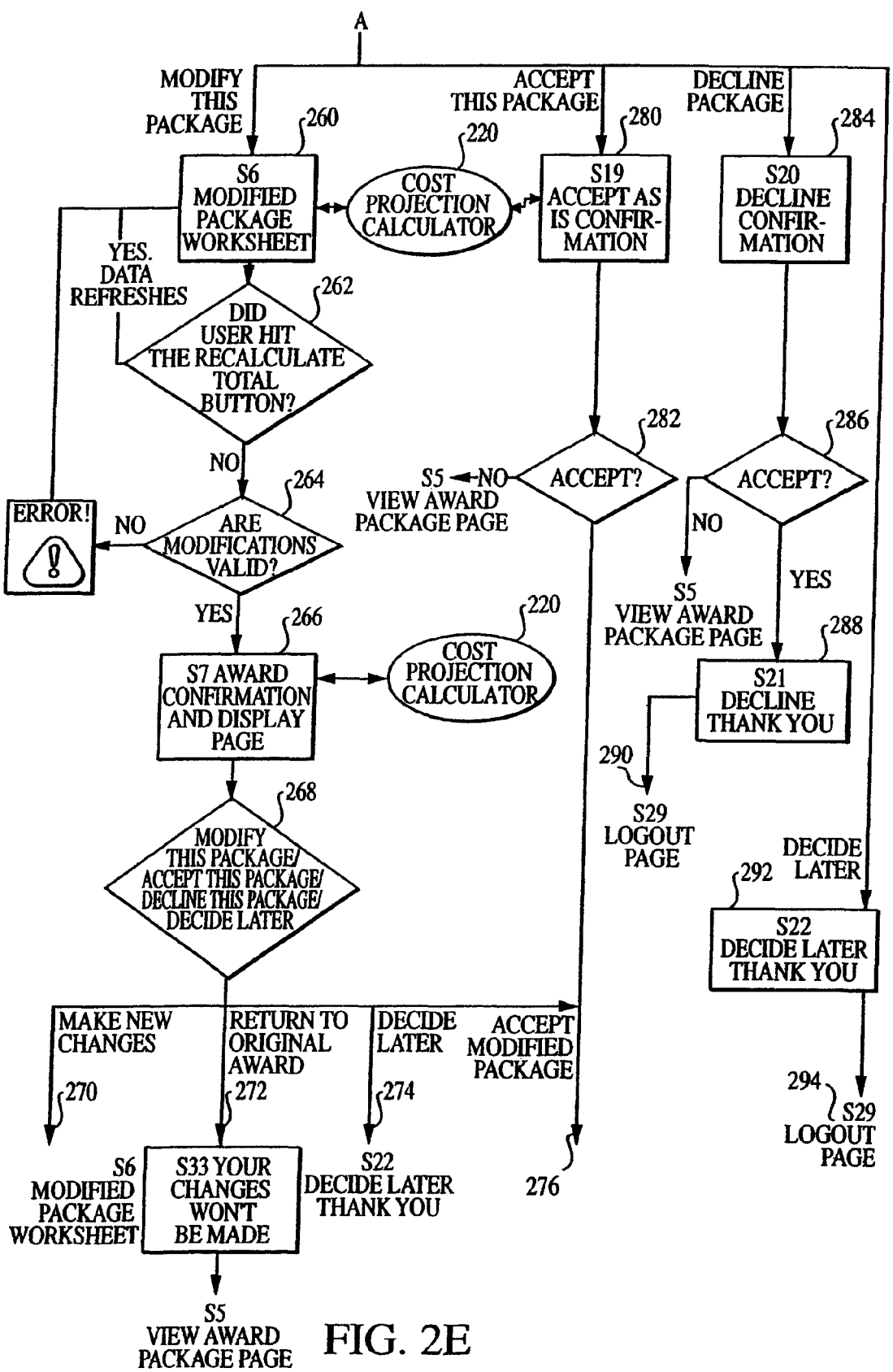
Figure 3G:
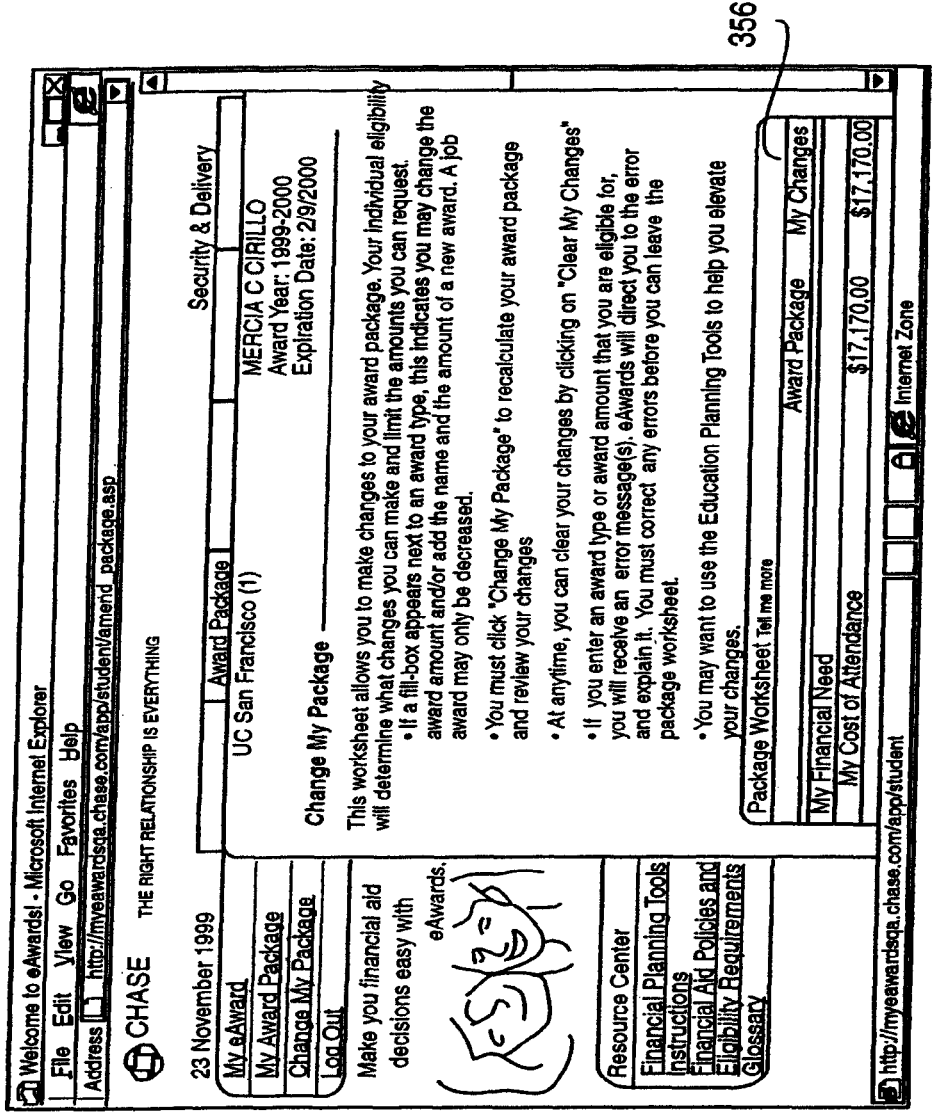

At step 264, FIG. 2E, a determination is made as to whether the modifications made by the student/parent 50 are valid. This is performed by using a set of eligibility rules based on the student's profile and the selected award, taking into consideration any additional sources of financing for the potential student. It is noted that the student/parent 50 may invoke the cost projection calculator (step 220) if he or she wishes to obtain information as to the repayment of any loans.

In the event modifications made by the student/parent 50 are not valid, an error message will be presented. Error messages will be presented if an invalid amount is entered in a field. FIGS. 3G9 and 3G10 show examples of error messages. The error message will appear at the top and bottom of the screen, preferably in red. The user will have the option to click on the message and go to the specific field of the error. The field will also have an indicator next to it showing where the invalid amount was entered. The user will not be able to proceed beyond screens presenting the error message until the error is corrected.

Once the student/parent has completed the Change Package Worksheet and all awards and amounts are correct the user may then select from one of the navigation buttons located at the bottom of the worksheet. This is shown in FIG. 3G11. The icon "Use Planning Tools" takes the student to education planning tools to assist the student in the decision making process. The icon "Revisit Your Package" takes the student to the original package. The icon "Decide Later" allows the student to exit the system. The student will be allowed to return to the site as long as the student has a current package on the system that has not expired. The "Continue" button allows the student to continue with the process with the newly changed package.

If the modifications made were valid, then the student/parent 50 may review the modified award by activating the "Continue" icon 370 (step 266, FIG. 2E). Preferably, the "continue" icon 370, when activated, causes data to be sent to the student/parent 50 for presenting an electronic-screen which provides a confirmation as to the modified award package. This advantageously provides the student/parent 50 with the opportunity to review the modification(s) made and thereafter confirm the details of the modification.

As discussed previously, the system notifies users if there are educational costs not covered by the package. If applicable, notification will appear when the user clicks on the continue button 370 on the "Change My Package" page. If the student's educational costs are covered by the award package, the screen shown in FIG. 3C3 will not be displayed and the user will go directly to the next step in the process.

The student can continue the process by clicking the "Next" button shown in FIG. 3C3. If the student needs to make additional changes to the award package, the student must click on the "Back" button of FIG. 3C3. The student may also review other financing options available by clicking the "here" link shown in FIG. 3C3.

At this stage, the student/parent is provided with the opportunity to make a decision with respect to the award package. If a student clicks on the "Next" button (FIG. 3C3), the student will be presented with the "Make My Decision" page shown in FIGS. 3I and 3I1. A summary of the award package will appear as shown in FIGS. 3I and 3I1. The summary shows both the original award package and the newly changed award package made by the student. After the student reviews the package, a decision can be made.

The student/parent 50 is preferably provided with several icons which may be activated to invoke: (i) the cost projection calculator (step 220, FIG. 2E); (ii) acceptance of the (modified) package (step 276, FIG. 2E); (iii) modification of the package (step 270, FIG. 2E); (iv) return to the original award (step 272 FIG. 2E); and (v) deferring a decision on the original or modified award (step 274, FIG. 2E). When the return to original award icon is activated (step 272, FIG. 2E), the changes entered in the package worksheet of FIGS. 3G-3G11 will not be saved and the original award (FIG. 3C) will be invoked. If the student/parent 50 wishes to make new changes and invokes that icon (step 270, FIG. 2E), the process flow loops back to step 260 in FIG. 2E and the modified package worksheet of FIG. 3G is again presented.

With reference to FIG. 3G2, when the student is ready to make a decision, the "Make a Decision" area 326A shown in FIG. 3C2 is presented. The student is given the option to accept the package, decline the package or decide later.

Referring again to FIG. 3C2, area 326A, the student/parent 50 may activate the "Accept this Package" icon (276, FIG. 2E), to accept the award package.

Referring still to FIG. 3C2, area 326A, the student/parent 50 may activate the "Decline this Package" icon (step 284, FIG. 2E), to decline the original award package. At step 286 the declination is confirmed. If the package is declined, an electronic screen providing a "thank-you" or other message (see FIG. 3I2) appropriate for a student/parent 50 who is declining the package is presented (step 288). Further, a screen requesting the reason for declining can also be presented. See FIG. 3I3. At step 290 the student/parent 50 is provided with an electronic screen for logging out of the website.

Referring again to FIG. 3C2, area 326A, the student/parent 50 may activate the "Decide Later" icon (step 274, FIG. 2E), to postpone a decision as to whether to accept or decline the award package. An electronic screen providing an appropriate "thank-you" and/or other message is provided at step 292 (See FIG. 3I4) and at step 294 the student/parent 50 is provided with an electronic screen for logging out of the website.

Figure 2F:
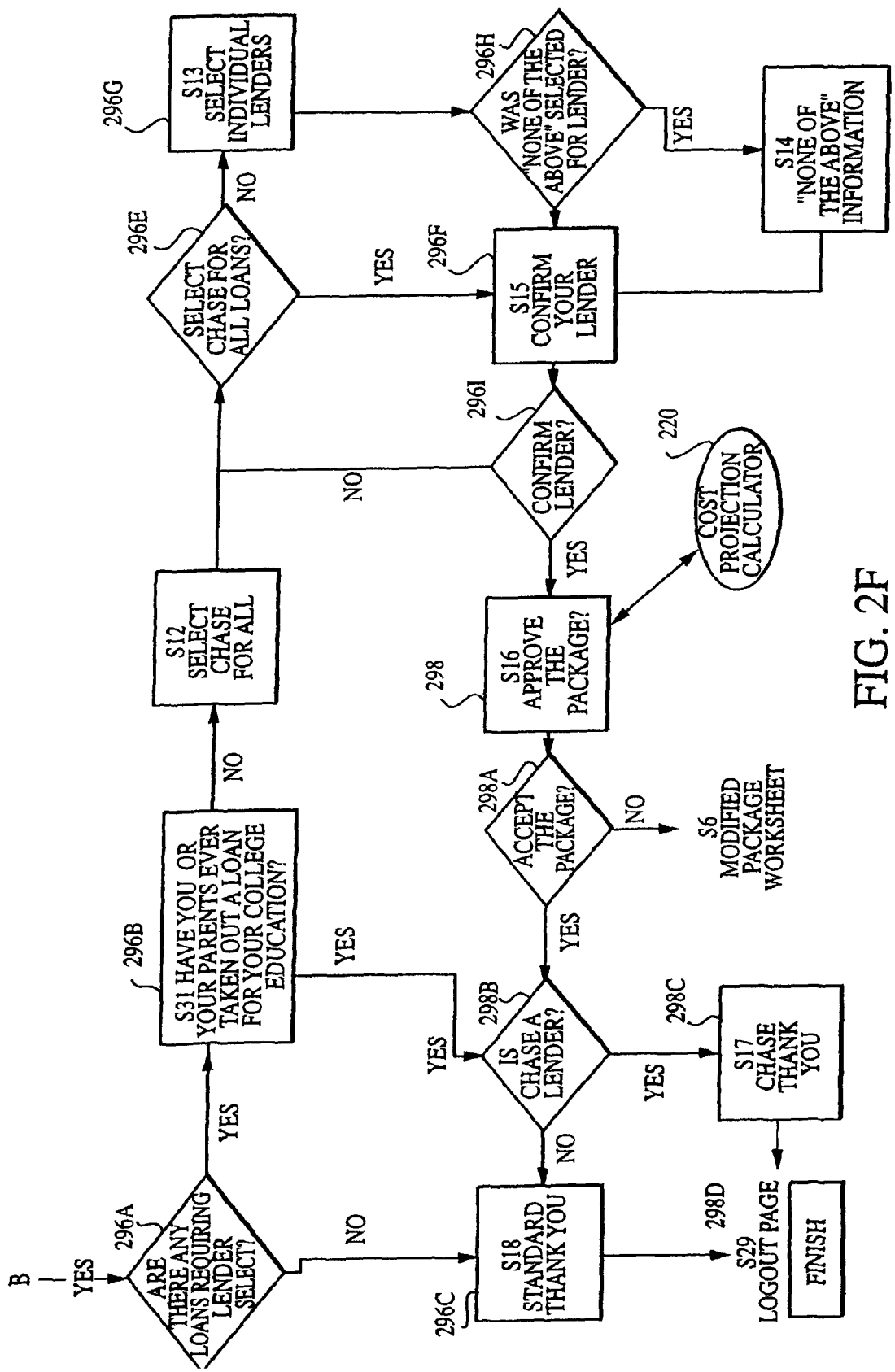

When the student/parent 50 has accepted an award or modified award package, the process flow preferably proceeds to a lender selection process shown in FIG. 2F. At step 296, a determination is made as to whether the accepted award package includes any loans which require the selection of a lender. If there are no such loans, a thank-you is provided as shown at step 296C followed by a logout (298D).

Figure 3H:
Figure 312:
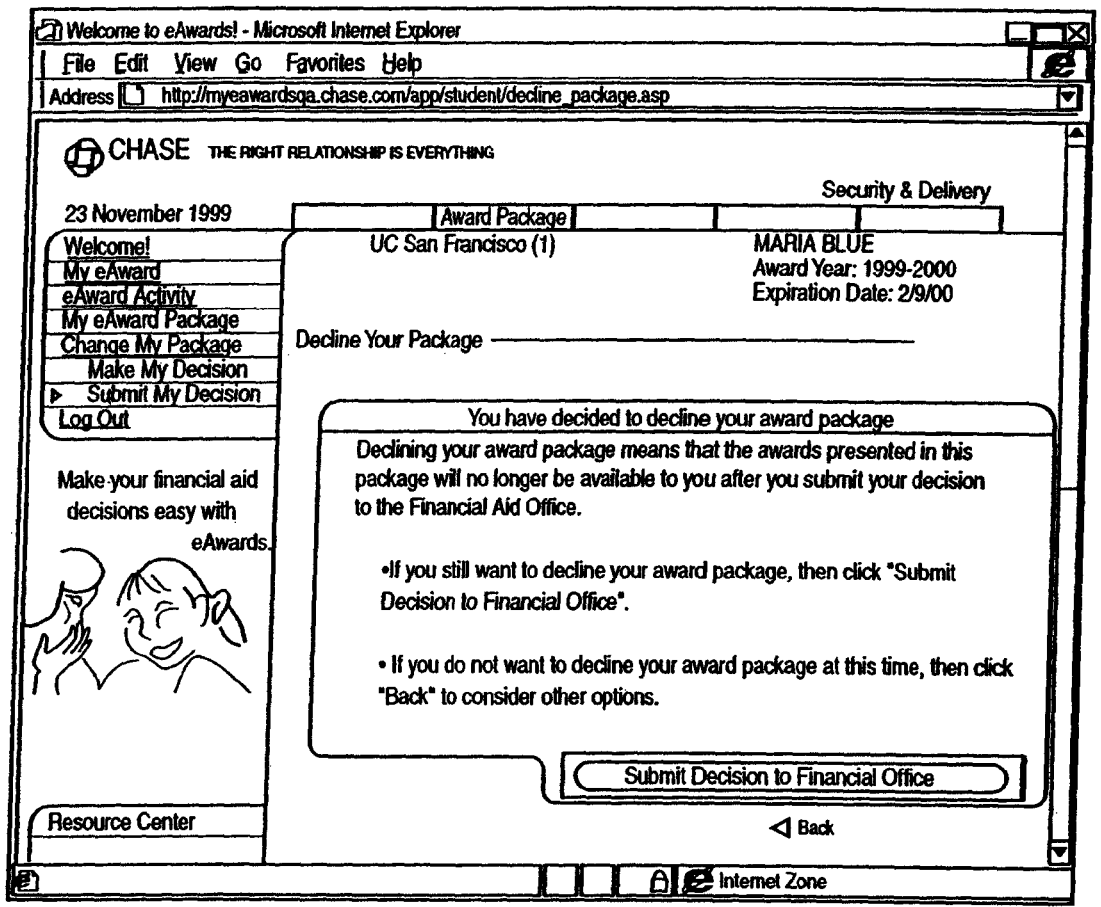
Figure 313:
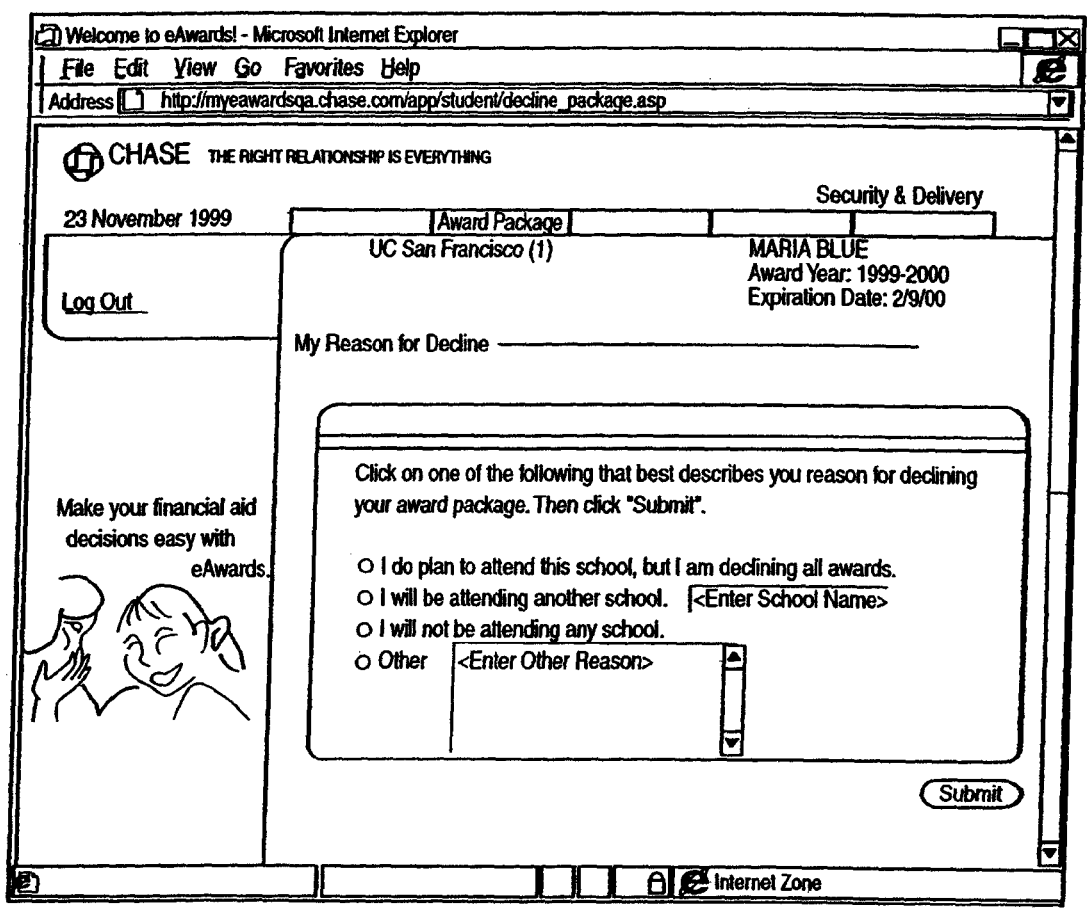
Figure 314:
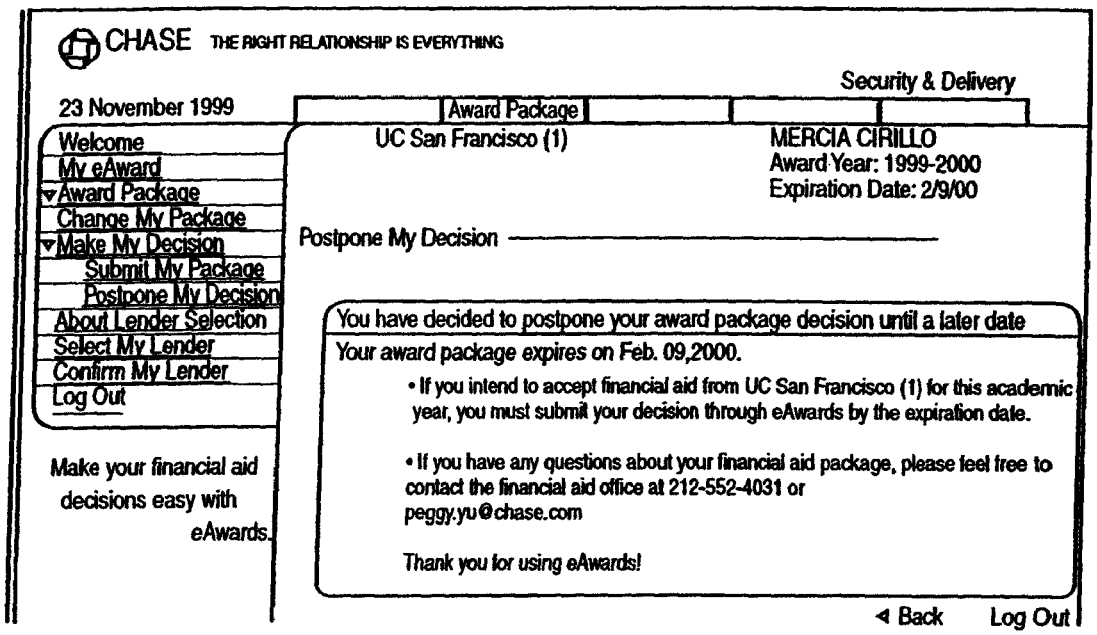
Figure 315:
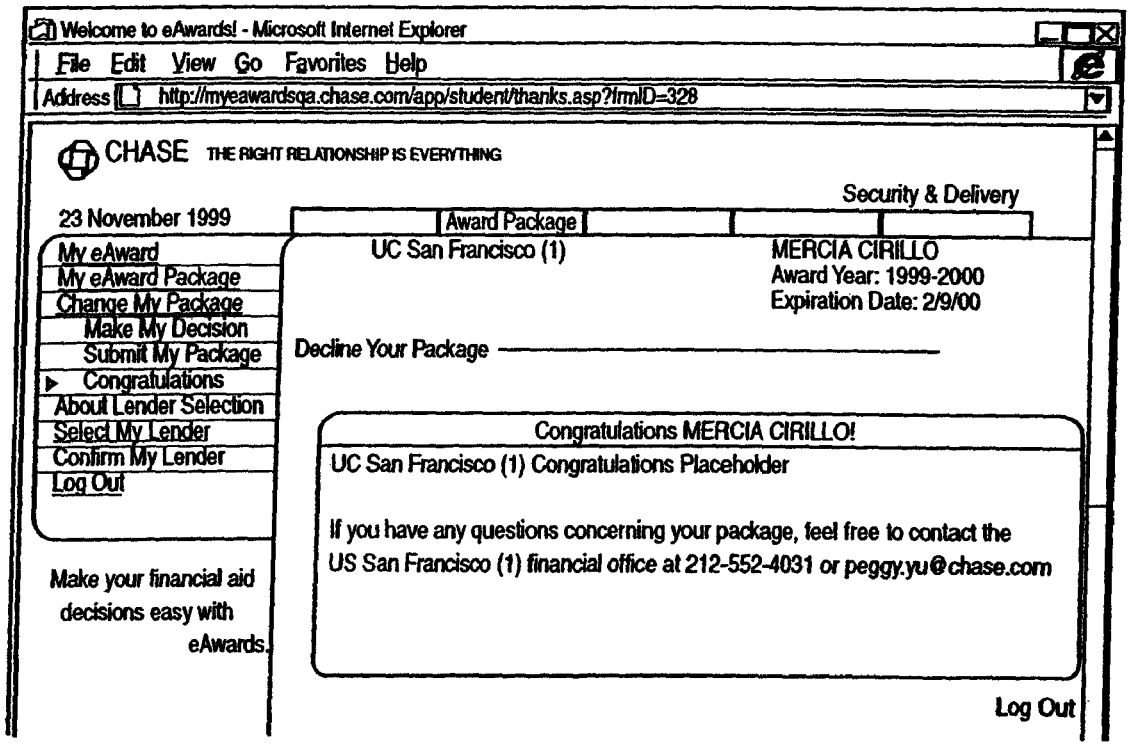

If a loan requires the selection of a lender, then the process flow preferably proceeds to step 296B where an electronic screen as shown in FIG. 3H is preferably presented to the student/parent 50 which asks whether the student/parent 50 has previously taken out a loan for attending the school. If so, then an electronic screen is presented to the student/parent 50 containing an appropriate thank-you (steps 296C, 298C), followed by a logout (298D). If the student/parent 50 has not previously taken out a loan, then the student/parent 50 is asked whether he or she wishes to select a particular financial institution (such as Chase Manhattan Bank) as the lender for all loans of the award (296E). If the response is yes, then the process flow preferably continues to step 296F where an electronic screen is preferably presented to the student/parent 50 which confirms the selection of the lender. If the answer is no, then the process flow preferably proceeds to step 296G where an electronic screen is preferably presented to the student/parent 50 which is schematically illustrated in FIG. 3H.

After a student has decided to accept the package, whether it is the original package or one that has been changed, the system of the invention will check over whether the award package contains any loans. If the system determines that a student needs to go through lender selection because there are loans, the system will automatically select the appropriate lender selection module.

Depending upon the module, the lender selection process may begin with questions to determine whether the student/parent has previously borrowed using, Stafford or PLUS loans. This is shown in the screen of FIG. 3H. Upon completing the questions, the student/parent clicks "Continue".

The lender selection program is dynamic in nature. FIG. 3H1 and 3H2 present two examples to illustrate the dynamic nature of the process. Preferably, a plurality of lender selection processes are built into the system. These lender selection processes are preferably provided to satisfy the varying needs of the varying educational institutions. For example, direct lending, FFELP lending and direct-hybrid lending situations are preferably all included. FIG. 3H1 shows an example of a school that participation in FFELP lending and a student/parent having a previous loan history. The student selects the previous lender from a drop down list or if the lender column is blank or the previous lender is not in the list, "Other" is selected when the student/parent types the name of the previous lender in the box located to the right of the drop down list. A student/parent also has the option of clicking on "Do Not Recall". In contrast to the example of FIG. 3H1, FIG. 3H2 shows an example of a student/parent who does not have a previous borrowing history. This specific loan type and the amounts to be financed are displayed as shown in FIG. 3H2. The student/parent chooses a lender from the drop down list. This list contains all the prescribed lenders associated with the student's school. If a student chooses a lender that is not on the drop down list by selecting "other", the student will need to enter the lender name in the fill-in box. When the student/parent has completed lender selection, "Next" is selected to proceed to lender confirmation (Step 296F, FIG. 2F).

After the student has chosen a lender, a confirmation page will appear as shown for example in FIG. 3H3. This will show all the lenders along with the loan types and amounts the student has selected. If the student confirms these are the right lenders, the student/parent clicks on the next button to continue the process of submitting the package decision to the financial aid office of the educational institution. If the student wishes to make changes, the student must click on the "back" button.

As shown, the electronic screen of FIGS. 3H1 and 3H2, preferably includes an area 374 containing at least one of: (i) the loans of the award; (ii) the corresponding amount of the loan; and (iii) an input field operable to receive a command from the student/parent 50 indicating which of a plurality of possible lenders is selected to provide the funds for that loan. Preferably, area 374 of FIGS. 3H1 and 3H2 includes all loans of the award that requires lender selection and the corresponding amounts borrowed. For each loan, a pull down box is preferably provided which includes a preferred lender among a plurality of lenders, where the preferred lender is placed at the top of the list such that when the pull down box is closed, it is the only lender shown. The student/parent 50 preferably selects a lender for each loan by highlighting one of the plurality of lenders within the pull down box and submitting all selections.

If the student/parent 50 does not select a lender, then it is preferred that an appropriate electronic screen or message is provided which prompts the selection of a lender (step 296H).

At step 296F (FIG. 2F), an electronic screen is preferably presented to the student/parent 50 listing the loans, amounts, and lenders selected. See FIG. 3H3. The electronic screen preferably includes an icon or other input field (e.g. Next) which requests that the student/parent 50 confirm the selected lenders (step 296I).

At step 298, the student/parent 50 may approve the award package. If approved, the user is presented with an electronic screen presenting the financial aid award package and selected lenders. FIGS. 3I6 and 3I7 schematically illustrate the electronic screen suitable for this purpose. In particular, area 380 shown in FIG. 3I7 preferably includes the cost of attendance information, the expected monetary contribution, the financial award in terms of grants, scholarships, jobs and loans, the unmet need, the other financing options, etc., as well as the selected lenders for corresponding loans.

One or more icons or other input field(s) are preferably provided at area 382 which, when activated, will submit the award and lender selections to the financial aid office of the school (step 298A, FIG. 2F). It is noted that the student/parent 50 may invoke the cost projection calculator 220 (FIG. 2D) to obtain more information for a better decision as to whether to approve the financial aid award package prior to submitting the award. If the package is accepted at step 298A, then the process flow may continue to step 298B where a determination as to whether a preferred lender was selected and, if so, providing an electronic screen containing an appropriate "thank you" (step 298C). If the preferred lender (such as Chase Manhattan Bank) was not selected, then the standard "thank you" is preferably provided (step 296C). In either case, the process flow then preferably proceeds to the log-out procedure (step 296D).

Once the award package has been submitted to the financial aid office of the institution, the student/parent no longer will be able to change the package in any way. The student will need to contact the financial aid office if the student has any further questions or issues concerning their decision. After submitting the package to the financial aid office, the student will preferably receive a congratulatory message acknowledging the action. An example of such a screen is provided in FIG. 3I5.

Figure 3J:
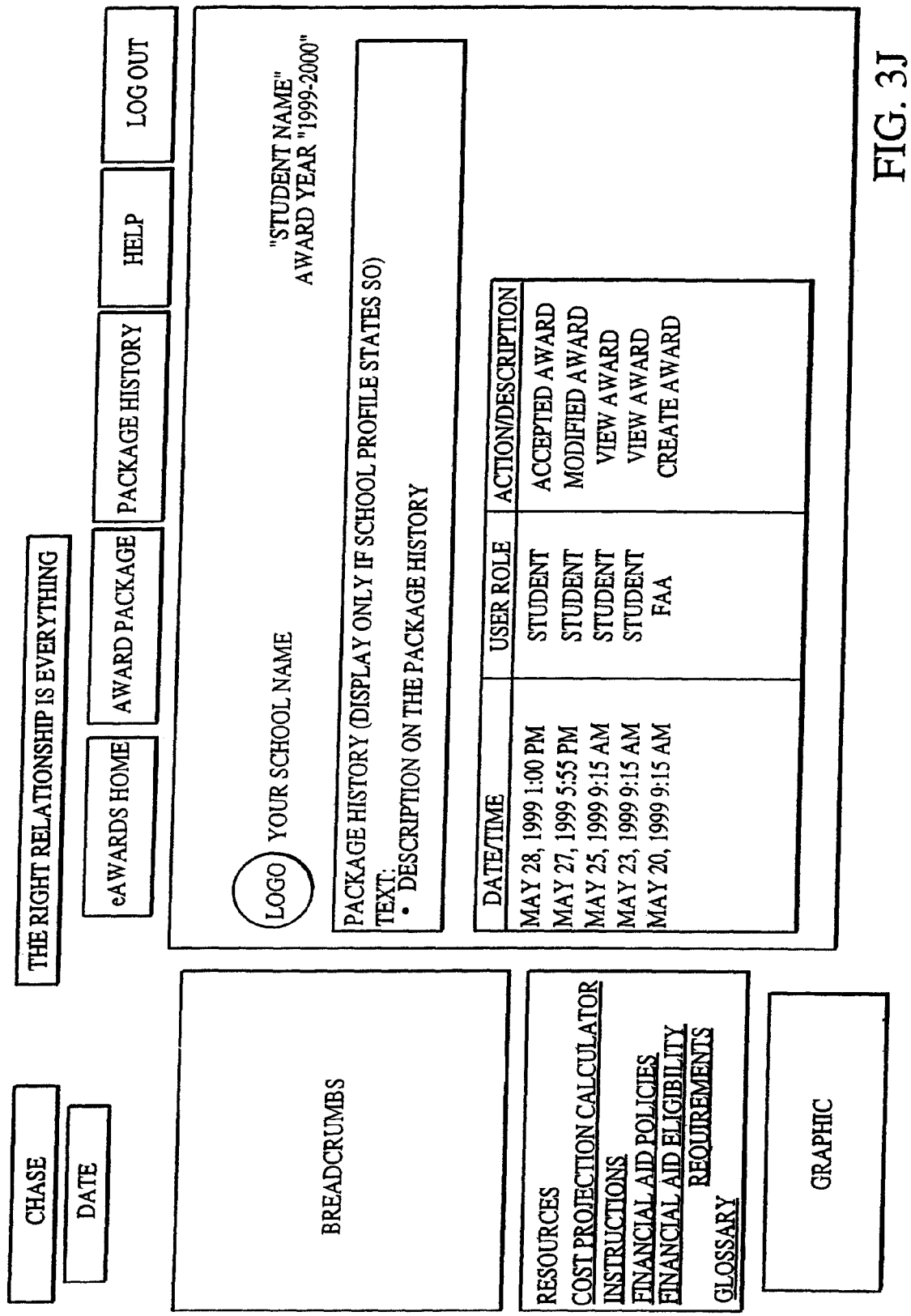

Reference is now made to FIG. 3J which schematically illustrates an electronic screen which is preferably presented to the student/parent 50 when, for example, the Package History icon 308C (FIG. 3B) is activated. The electronic screen preferably provides information on who has visited the website concerning that student, the date and time that the website was visited, and any actions taken. For example, the student/parent 50 may visit the website several times to review, modify, and accept an award. Advantageously, the student/parent 50 may note any activities concerning the award at any time.

Figure 3K:
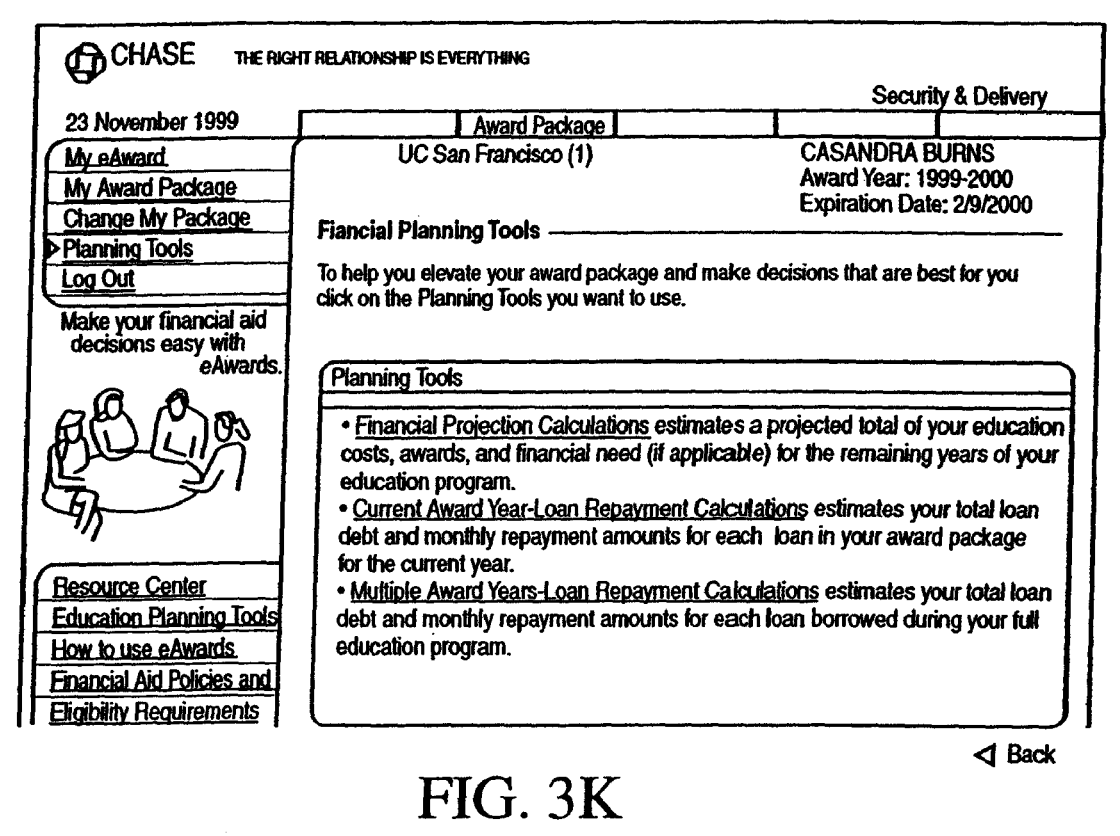
Figure 3L:
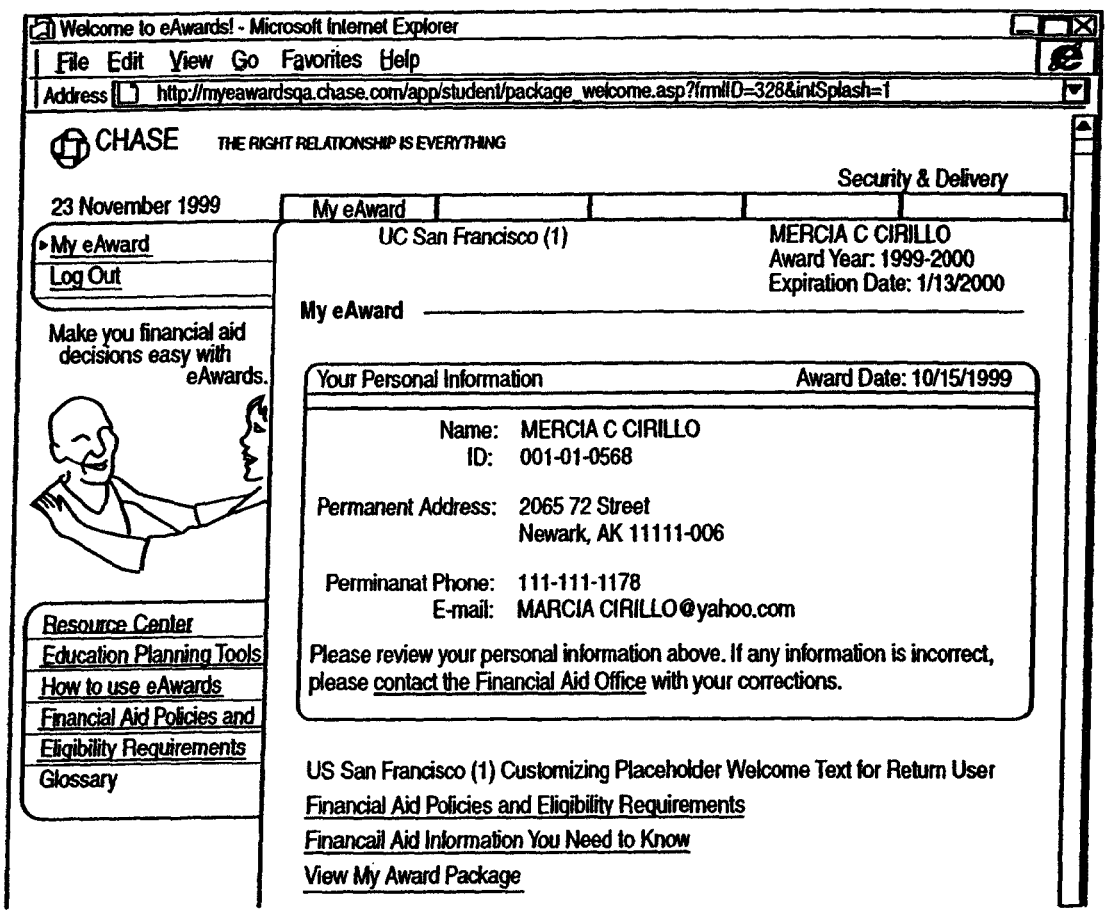

To help a student/parent evaluate the award package, the system provides several planning tools to assist them. FIG. 3K shows an example of a screen which can be presented to the student/parent. Preferably the financial planning tools include the Financial Projection Calculator which estimates a projected total of the education cost, awards and financial need, if applicable, for the remaining years of the education program. Another planning tool is a Current Award Year Loan Repayment Calculator which estimates the total loan debt and monthly repayment amount for each loan in the award package for the current year. A further tool is the Multiple Award Years-Loan Repayment Calculator which estimates the total loan debt and monthly repayment amounts for each loan borrowed during the full education program. These tools are described with respect to FIGS. 3D, 3E, 3E1, 3E2, 3F and 3F1 and have been previously described. FIG. 3L shows that after submitting the financial aid package, a student can return to the site in order to be able to review the package and access information. FIG. 3L shows an example of a screen presented. A student may view the award package by selecting the appropriate icon, in which case, the award package is then displayed, as shown, again referring to FIG. 3I7.

Advantageously, the present invention described above is a new method and apparatus for providing students and parents with education financing information, particularly financial aid award packages, where the student/parent can: (i) easily review the financial aid award package; (ii) review cost projections (e.g., loan repayment information); (iii) view and select potential lenders; (iv) modify a financial aid award package to include, for example, other sources of funds outside the award or to increase/decrease, for example, the amount(s) of loan(s) awarded, so that a more informed decision may be made.

Figure 4A:
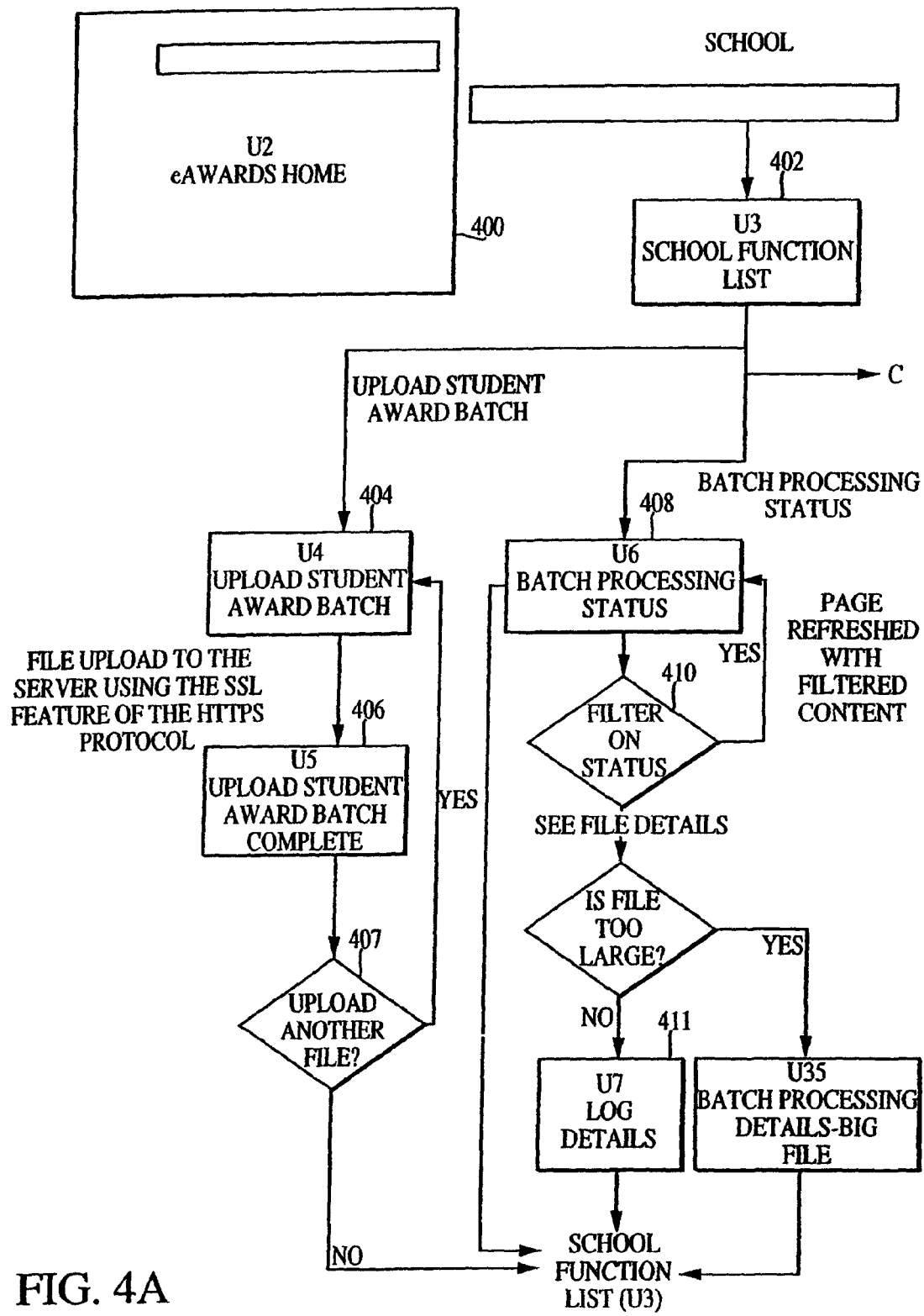
FIGS. 4A-4E contain process flow diagrams illustrating steps and control sequences carried out by the present invention, e.g., the system of FIG. 1, when one or more school administrators interact with the system.
Figure 5A:
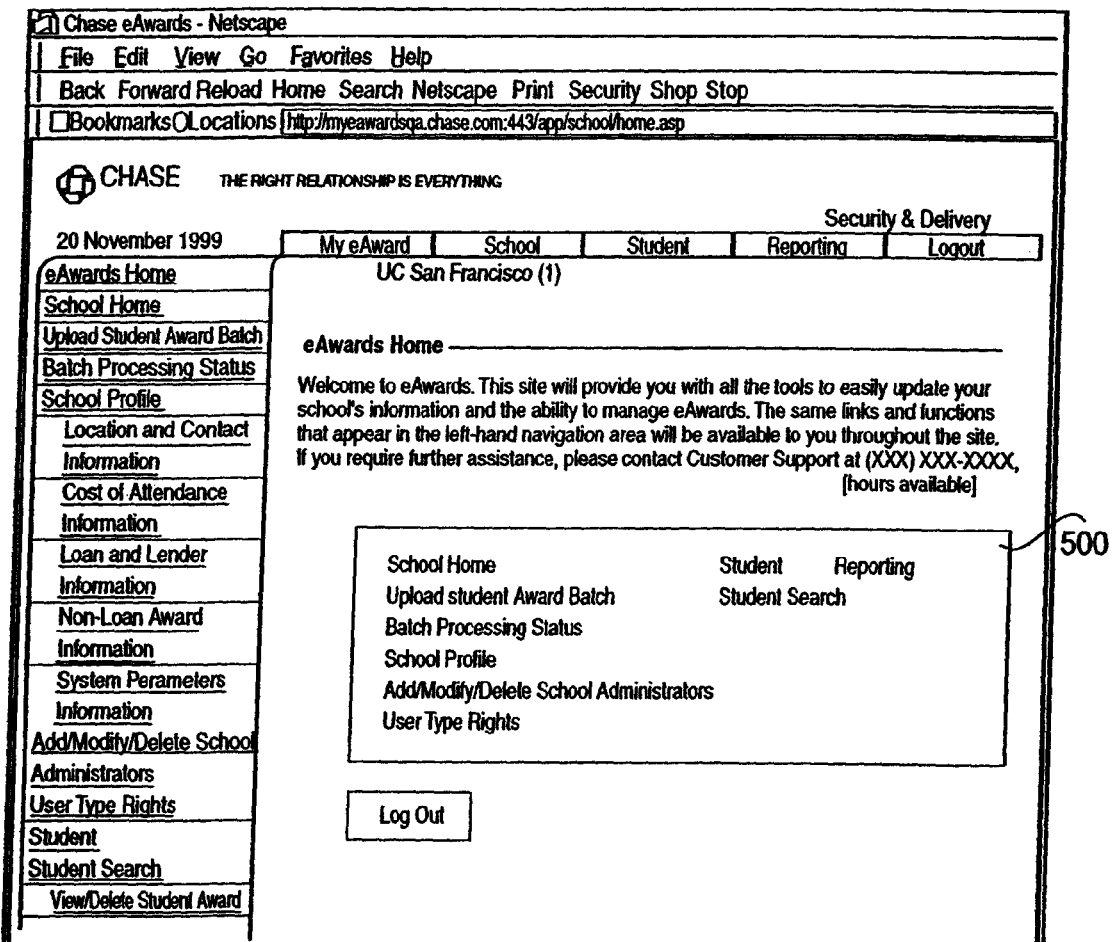

Reference is now made to FIGS. 4A and 5A which illustrates some of the structure and function of the present invention when a school administrator 60 accesses the system. It is understood that the school administrator 60 connects to the website in a substantially similar manner as the student, i.e., the administrator 60 must provide a user ID and password. At the website home page for a school administrator (step 400) an electronic screen is preferably presented to the school administrator 60 such as that schematically shown in FIG. 5A. Preferably, the electronic screen includes a plurality of activatable icons at area 500 which invoke a plurality of functions permitting the school administrator 60 to manipulate the system. In particular, the following icons/functions are preferably provided: (i) upload student award batch; (ii) batch processing status; (iii) school profile menu; (iv) school administrator's list; (v) view user type rights; (vi) student search; and (vii) reporting.

When the administrator 60 selects the school home icon, the screen of FIG. 5A1 is presented. If the "upload student award batch" icon, is the selected, an electronic screen is preferably presented to the administrator 60 containing information schematically represented in FIG. 5B (step 404, FIG. 4A). The electronic screen preferably includes an area 502 containing an input field suitable for receiving a file name containing the financial award information for a particular student or a group of students. An upload file icon is preferably also provided which, when activated, causes the file containing the financial award information to be transmitted from the school to the network server 10 over the network 20 (FIG. 1). Preferably, the input field in area 502 is capable of receiving a batch of records to be uploaded to the network server 10 and, when the batch upload is complete (step 406) the administrator 60 is prompted to upload another file if desired (step 407). When the batch upload is complete, it is preferred that the school administrator 60 be sent data for presenting an electronic screen indicating that the record(s) have been successfully transmitted (See FIG. 5B1) (or not successfully transmitted).

When the "batch processing status" icon is activated (FIG. 5A), process flow preferably proceeds to step 408 (FIG. 4A) where data is preferably sent to the school administrator 60 over the computer network 20 for presenting an electronic screen which contains information schematically illustrated in FIG. 5C. Preferably, the electronic screen includes an area 504 containing a list of uploaded batches. Each batch preferably represents a number of records, one record for each potential student containing financial aid award and merit based award information for that student. Optionally, a file name may be provided for each batch. More importantly, the status of the batch is also provided, the status at least providing the number of records successfully transmitted to the database.

It is preferred that the electronic screen of FIG. 5C include an input field 506 operable to receive a command from the school administrator 60 which separates certain of the batch. By transmission status In particular, the school administrator 60 may select: (i) all batches; (ii) uploaded batches on queue to be processed; (iii) batched in the process; (iv) processed batches, and (vO rejected batches (step 410, FIG. 4A). (See FIG. 5C1).

Details as to the batch upload may be obtained by activating an appropriate icon "Go" in FIG. 5C1 which preferably causes data for presenting an electronic screen to be sent to the administrator 60 (step 411, FIG. 4A) containing additional details, such as the upload date, filename, the total records, details on the success/failure of the upload, the record ID, the field name, and any reasons for rejection as shown in FIG. 5C.

Figure 4B:
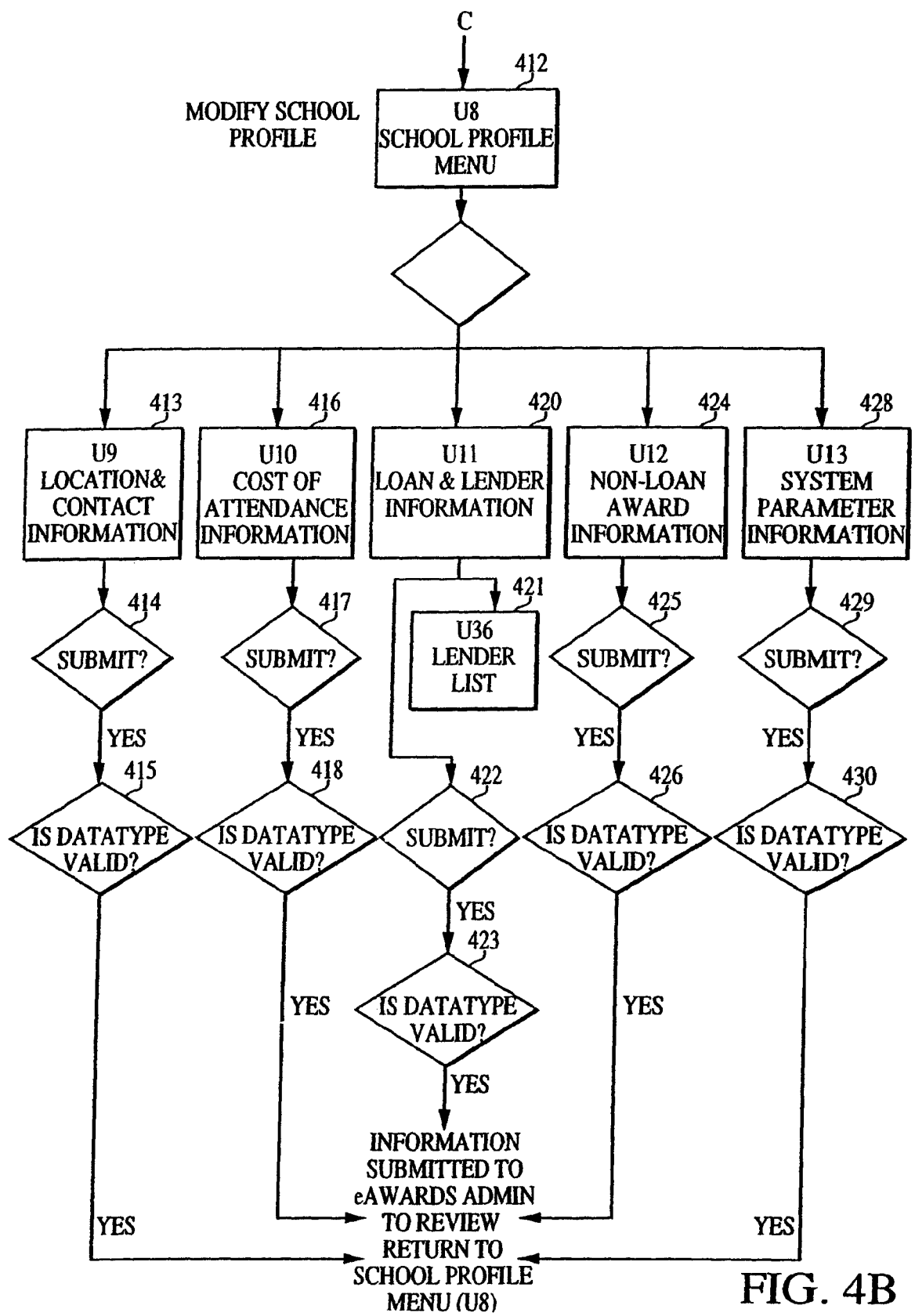
Figure 4C:
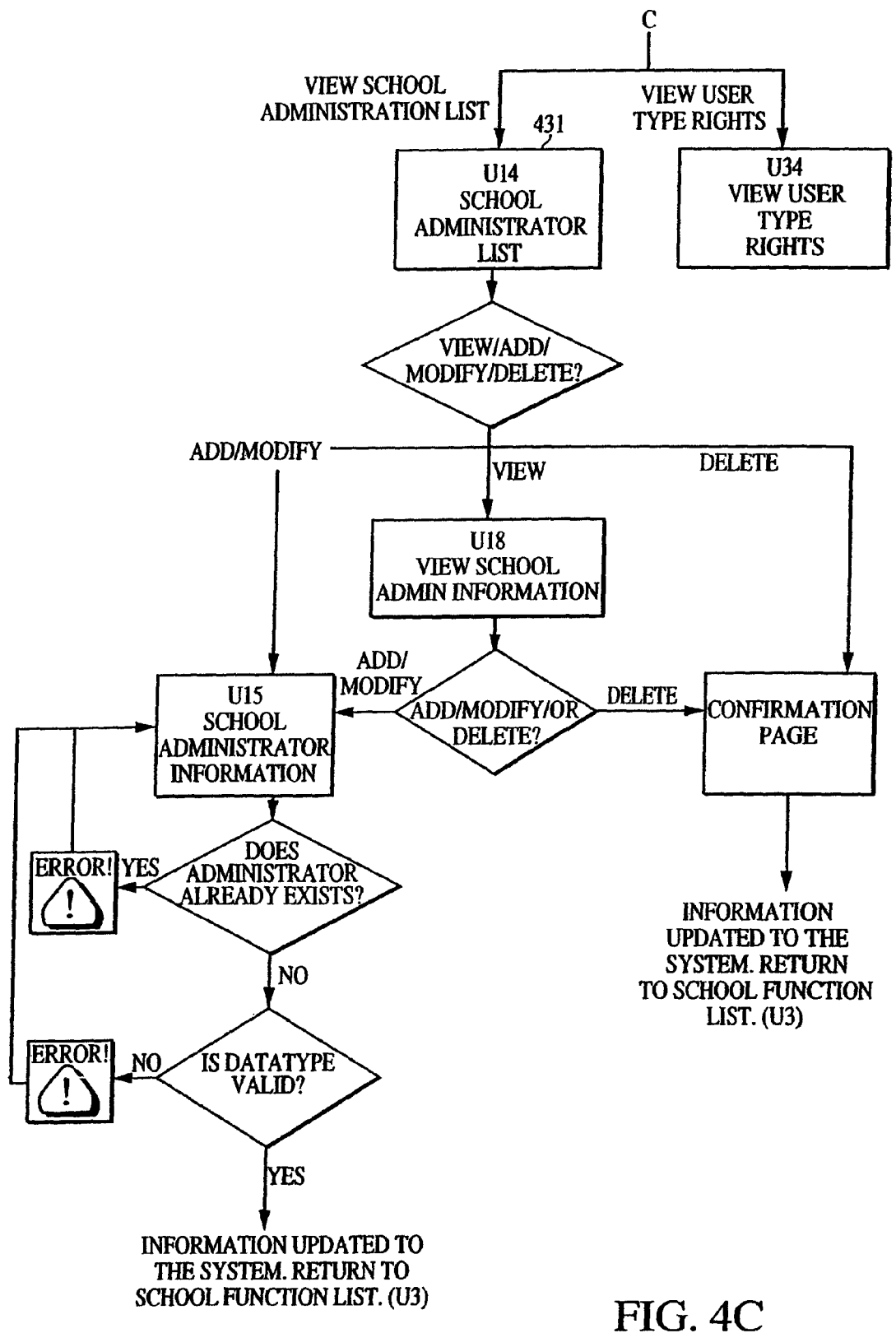

Referring again to FIG. 5A, when the school administrator 60 activates the "school profile menu", the process flow preferably continues to step 412 of FIG. 4B. In particular, data is preferably sent to the school administrator 60 over the network 20 for presenting an electronic screen which contains information schematically illustrated in FIG. 5D. More particularly, the school administrator 60 may review or modify: (i) location and contact information; (ii) cost of attendance information; (iii) loan and lender information; (iv) non-loan award information; and (v) system parameter information. See 508 in FIG. 5D.

With reference to FIG. 4B, when the school administrator 60 activates the location and contact information icon at area 508 of FIG. 5D, the process flow preferably continues to step 413 which preferably causes data to be provided to the school administrator 60 over the network 20 for presenting an electronic screen (FIG. 5D1) containing input fields for school location and contact information. More particularly, location information, such as school name, school address, FICE/OPEID information, branch code, school short name, branch name, and department name are preferably included. The school administrator 60 may modify these parameters by inputting information into one or more input fields and submitting the information to the network server 10 by activating an appropriate icon. Other information, such as primary contact information (name, title, e-mail, phone, fax, etc.) input fields may be provided. Secondary contact information input fields may also be provided (such as name, title, e-mail, phone, fax, etc.). The above information is submitted to the network server 10 over the computer network 20 by activating an appropriate icon of the electronic screen at step 414. At step 415, a determination is made as to whether the data of the input fields is valid and, if so, the information is submitted to the system and process control returns to step 412, the school profile menu (FIG. 5D).

When the school administrator 60 activates the "cost of attendance information" icon at area 508 of FIG. 5D, process flow preferably proceeds to step 416 (FIG. 4B) which causes an electronic screen to be presented to the school administrator 60 containing information schematically illustrated in FIG. 5E. In particular, the electronic screen of FIG. 5E preferably includes an area 510 containing at least one input field related to the cost of attending the educational institution. Most preferably, the cost of attendance is divided into direct costs 511 and indirect costs 512. For each of the direct and indirect costs, a corresponding input field is preferably provided into which the school administrator may enter numerical values representative of the annual rate of increase which may be applied to the costs for attending the educational institution. For example, the direct cost may include tuition, room and board, books and supplies, transportation, and/or miscellaneous expenses. Similarly, the indirect costs 512 may include room and board, books and supplies, transportation, and/or miscellaneous expenses.

With reference to FIG. 4B, any information input by the school administrator 60 into the input fields of area 510 (FIG. 5E) may be submitted to the network server 10 over the network 20 by activating an appropriate icon (step 417. At step 418, a determination is made as to whether the data input by the school administrator is valid and, if so, process control returns to step 412, the school profile menu (FIG. 5D).

When the school administrator 60 activates the "loan and lender information" icon at area 508 of FIG. 5D, process flow preferably continues to step 420 (FIG. 4B) which preferably causes data to be sent to the school administrator 60 over the network 20 for presenting an electronic screen containing information schematically illustrated in FIG. 5F. In particular, the electronic screen preferably includes a list of the loans available for funding the financial aid award packages of the educational institution, namely, Perkins loans, subsidized Stafford loans, unsubsidized Stafford loans, additional unsubsidized Stafford loans, PLUS loans, institutional loans, private loans, etc. For each loan, it is preferred that an input field be included into which a command indicating the priority of that loan may be entered 514. Advantageously, the school administrator 60 can prioritize the display of each loan as desired. Minimum and maximum amounts for each loan, the interest rate, and the repayment period may also be provided for each loan 515. Preferably, a list of lenders may also be viewed within the electronic screen or, more preferably, an electronic screen is sent to the school administrator containing a list of lenders for each loan (step 421, FIG. 4B) when an appropriate icon 516 is activated.

When the school administrator 60 has modified the information contained in the electronic screen of FIG. 5F, he or she may submit the information to the network server 10 through the computer network 20 by activating an appropriate icon (step 422, FIG. 4B). At step 423, a determination is made as to whether the data entered by the school administrator 60 is valid and, if so, the process control returns to step 412, the school profile menu of FIG. 5D.

When the school administrator 60 selects the "non-loan award information" icon at area 508 of FIG. 5D, process flow preferably continues to step 424 (FIG. 4B) which causes data to be sent to the school administrator 60 over the computer network 20 for presenting an electronic screen containing information schematically illustrated in FIG. 5G. Preferably, the electronic screen of FIG. 5G includes information on grants 518, scholarships 520 and jobs (not shown), each containing lists of the respective grants, scholarships, and jobs available. For each source of funding, it is preferred that an input field be provided into which the school administrator may enter a priority level. Further, it is preferred that for each source of funding, a minimum and maximum value may be specified.

When the school administrator 60 wishes to submit any modified information regarding the grants, scholarships, and/ or jobs he or she activates an appropriate icon which causes the process flow to continue to step 425 (FIG. 4B). At step 426, a determination is made as to whether the information provided by the school administrator 60 is valid and, if so, the process control returns to step 412, the school profile menu (FIG. 5D). For each award, it is preferred that an input field be included into which a command indicating the priority of the award may be entered. Advantageously, the school administrator 60 can prioritize the display of each award as desired.

When the school administrator 60 selects the "system parameters information" icon, process flow preferably continues to step 428 (FIG. 4B) which causes data to be sent to the administrator 60 over the computer network 20 for presenting an electronic screen containing information schematically represented in FIG. 5H. The electronic screen of FIG. 5H preferably includes a plurality of input fields operable to receive information concerning the particular conventions of the educational institution. In particular, input fields concerning the length and periodicity of the academic term for the educational institution are preferably provided at area 522. Aging parameters are preferably entered into input fields at area 523. Preferences are preferably set by selecting yes/no toggles at area 524, including but not limited to: display indirect cost, display cost of attendance, display package history, display line item breakdown, allow downloadable spreadsheet, whether Federal unsubsidized loans are packaged, whether tuition payment plans are available, whether the school is subject to a one lender rule, and/or whether the school will transmit outstanding debts. The lender selection module is preferably set by selecting from a drop down list at area 525.

The above information may be submitted to the network server 10 over the computer network 20 by activating an appropriate icon (step 429, FIG. 4B). At step 430, the information provided by the school administrator 60 is reviewed to determine whether such data is valid and, if so, process control returns to step 412, the school profile menu (FIG. 5D).

Referring again to FIG. 5A, when the school administrator selects the "Add/Modify/Deleting school administrator" icon, the process flow preferably continues to step 431 (FIG. 4C) which causes data to be sent to the school administrator 60 over the computer network 20 for presenting one or more electronic screens (FIG. 5H1) which contain information concerning the various administrators who may access the system. In particular, it is preferred that such electronic screens include input fields and lists suitable for viewing, adding, modifying and/or deleting administrators authorized to access the system. FIG. 5H2 shows an input field for adding/modifying/deleting administrator users. Additionally, it is preferred that the electronic screens include lists and input fields suitable for receiving information regarding each administrator, such as the administrator's name, the user name, the password, the user type, e-mail address, etc. When such information is first input or modified, an administrator 60 may submit the information to the network server 10 over the computer network 20 by activating an appropriate icon. The process control then returns to step 402 (FIG. 4A).

Figure 4D:
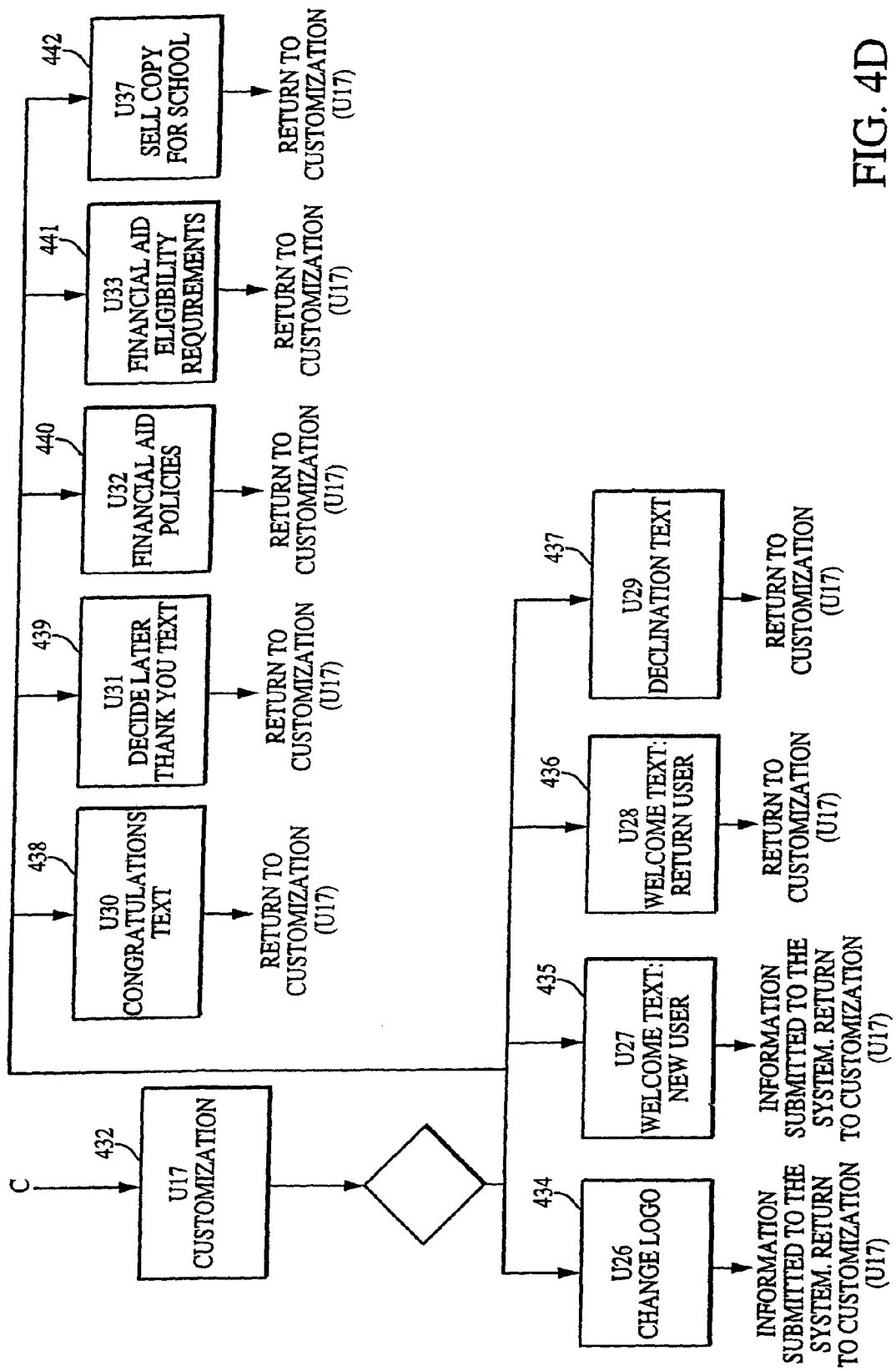
Figure 4E:
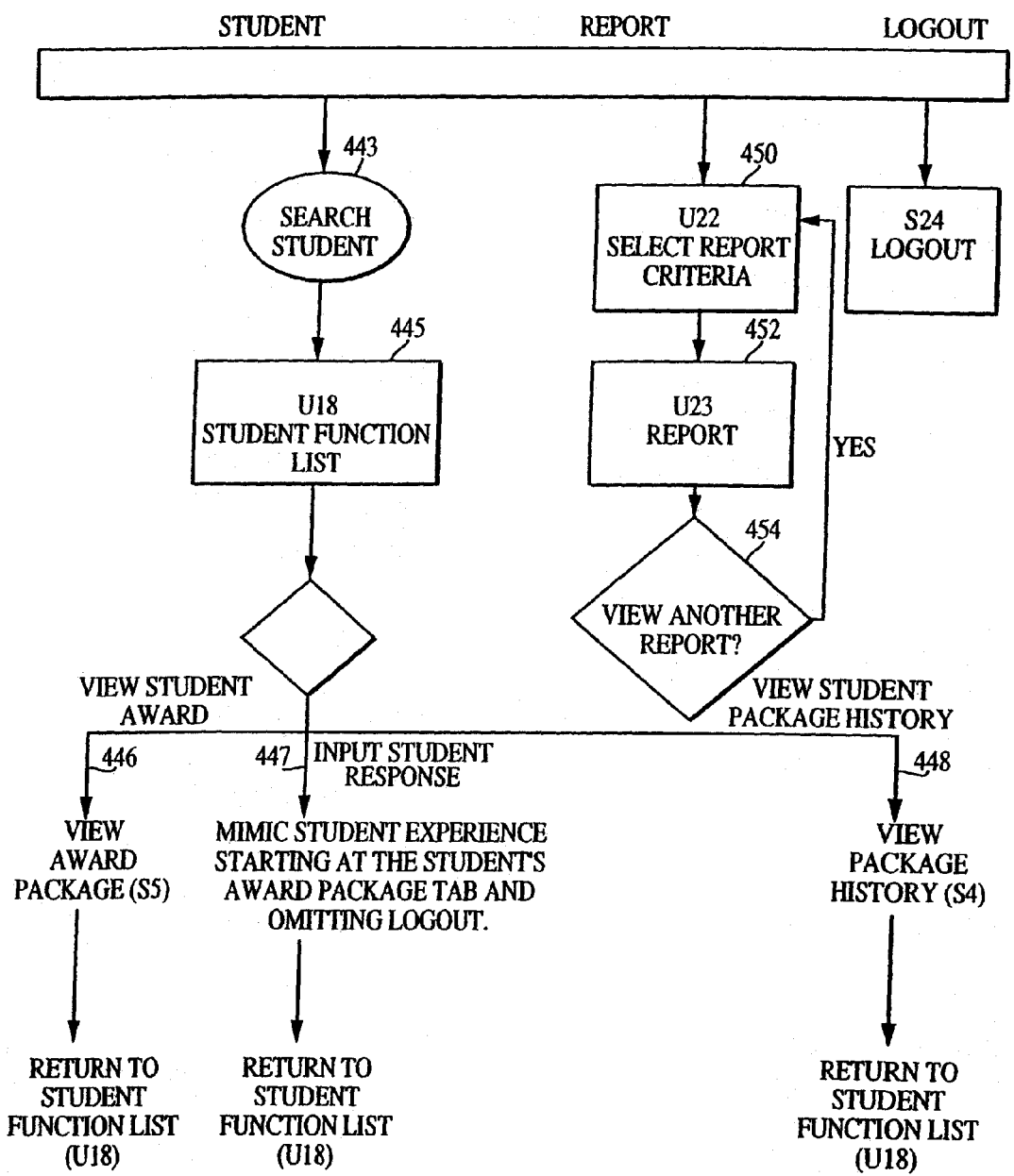

FIG. 4D shows an optional embodiment of the system. In this optional embodiment, which need not be provided, when the school administrator 60 selects the "customization" icon (not shown), process control preferably continues to step 432 (FIG. 4D) which causes data to be sent to the school administrator over the computer network 20 for presenting one or more electronic screens which contain information concerning the customization of information provided to the potential students in the financial aid award package. In particular, it is preferred that the electronic screens include input fields operable to receive input concerning but not limited to the following: (i) a change of logo (step 434); (ii) welcome text to a new user (step 435); (iii) welcome text to a return user (step 436); (iv) declination text (step 437); (v) congratulations text (step 438); (vi) decide later text (step 439); (vii) financial aid policies (step 440); (viii) financial aid eligibility requirements (step 441); and (ix) sell copy for school (step 442).

In order to facilitate a change in any one or more of the above categories, a school administrator 60 would input the modified information into the appropriate input field and submit the information by activating an appropriate icon which would transfer that information to the network server 10 over the computer network 20. Thereafter, the subject information would appear in appropriate areas of the electronic screens discussed above, for example, when a student/parent 50 reviews, modifies, accepts, declines, etc., his or her award package.

Figure 5I:
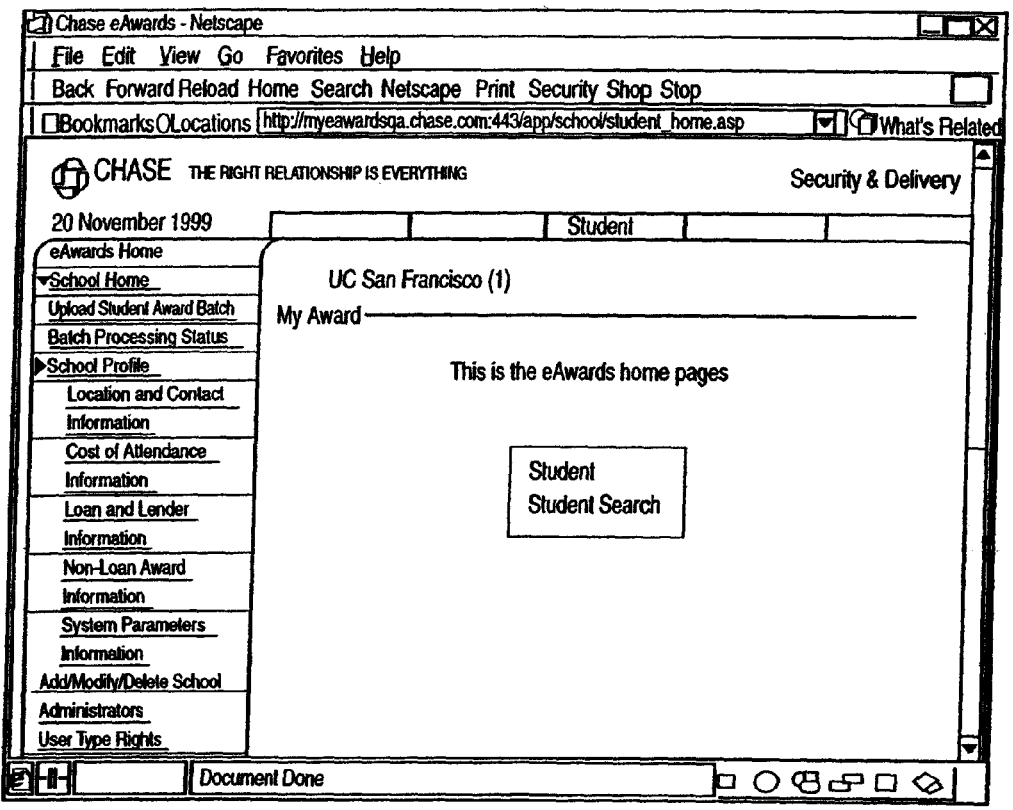

When the school administrator 60 selects the "student" icon (FIG. 5A), the process flow preferably proceeds to step 443 (FIG. 4E) which causes data to be sent to the school administrator 60 over the computer network 20 for presenting electronic screen containing information which is schematically illustrated in FIG. 5I. Upon clicking on "student search", the school administrator 60 is provided with the ability to search for a student award package, for example, by way of student ID number, student last name, and/or student first name, by entering the appropriate information into input fields at area 526, as shown in FIG. 5I1. When the search icon is activated, the process flow preferably proceeds to step 445 which causes data to be sent to the school administrator 60 for presenting an electronic screen which contains a list of financial aid award packages which have been sent to specific students meeting the search criteria. FIG. 5I2 shows such a list. FIG. 5I3 shows a detail page when a student from the list has been selected.

FIG. 5I3 shows a sample of a student detail page which contains the student's personal information along with options to view/input a student response, view the student's package history and delete the student award package. The administrator selects and activates a particular icon to select an option.

When a particular financial aid award package is selected from a list, data is preferably sent to the school administrator 60 for presenting an electronic screen which contains icons which, when activated, invoke certain functions, namely, viewing the award package (step 446), inputting a student response (i.e., acting on behalf of a student) at step 447, and viewing the package history (step 448). After the school administrator 60 has viewed the award package, acted on behalf of a student and/or viewed the package histories, the process control preferably returns to step 402 (FIG. 4A).

Figure 5J:
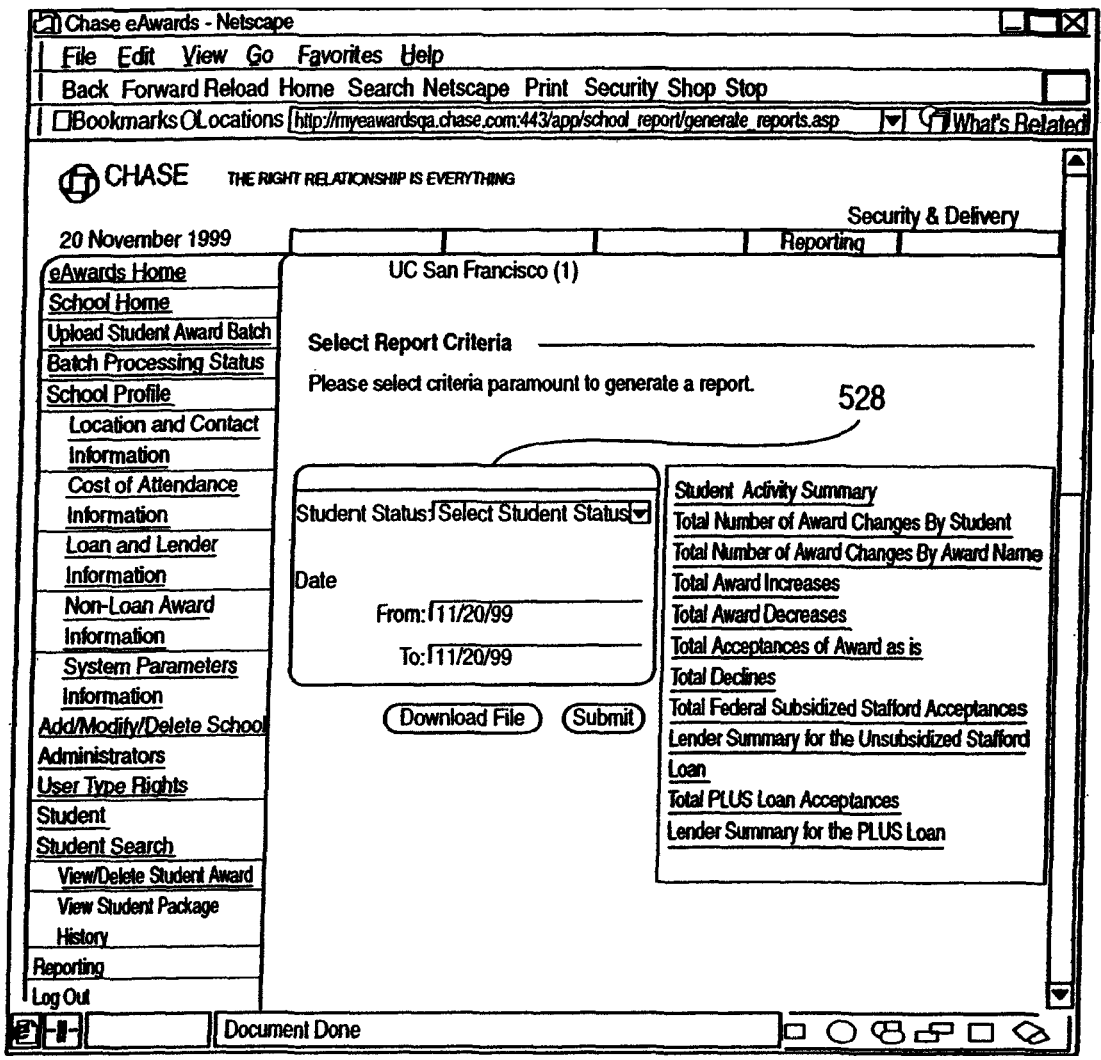

When the school administrator 60 selects the "Reporting" icon (FIG. 5A), the control sequence preferably continues to step 450 (FIG. 4E), which causes data to be sent to the school administrator 60 for presenting an electronic screen which includes information schematically represented in FIG. 5J. In particular, the electronic screen preferably includes an area 528 having one or more input fields operable to receive criteria concerning the financial aid award packages sent to potential students. The criteria is selected by the school administrator 60 in a way which will produce a useful search result. In particular, a search may be performed on the status of a student's action related to an award package, for example: (i) all students; (ii) students who have accepted; (iii) students who have declined; (iv) students who have received their packages but have not decided; (v) students whose records have been disabled by the school administrator 60; or (vi) students who have not visited or received their packages. See FIG. 5J1. The search criteria may also include a range of dates. The order of the resulting search may also be controlled, for example, by sorting based on student ID, student last name and action dae. FIG. 5J2 shows a sample screen presenting report results.

Once the report criteria have been entered, the process flow preferably continues to step 452 which causes data to be sent to the school administrator 60 for presenting an electronic screen containing a list of financial aid award packages which meet the criteria. At step 454, if the school administrator 60 wishes to view another report, then the process control returns to step 450 and the school administrator 60 is prompted to enter another set of criteria.

The reporting menu provides the school administrator 60 with the ability to generate two types of reports; ad hoc reports and predefined reports. Each report can be either viewed on the screen or downloaded to an extract file. As shown in FIG. 5J1, on the left side of the reporting menu screen is the ad hoc report query box. Using a drop down list the user selects the desired student status as shown in FIG. 5J1. The user also enters a date range in these fill in boxes. The user can create an extract file in Microsoft Access DB format that contains the student award package detail submitted by the student via the system. In order to do this, the school administrator 60 clicks on "download file" as shown in FIG. 5J1. To review the report results on the screen, the school administrator 60 clicks on "submit" as shown in FIG. 5J1. FIG. 5J2 is an example of a report obtained.

In order to download an extract file in Microsoft Access DB format, that contains the student award package detail submitted by the student, the school administrator 60 clicks the "download file" button. A browser window then appears, as shown in FIG. 5J3. The school administrator 60 then selects the location to which the file is to be downloaded, then clicks "save" in which case the file is downloaded to the school's system in Microsoft Access DB format.

On the right side of the screen of FIG. 5J1, a list of predefined reports appears. In order to review a report, the school administrator 60 clicks the name of the report. Once the report is displayed the school administrator 60 has the option to download it, as described above. The school can then use a spread sheet program to analyze the results off-line.

Thus, the educational institution can download reporting results based upon ad hoc queries and predefined reports, as described, to the educational institution's other electronic systems for conversion into a format useful to the educational institution for the purpose of updating the institution's system electronically.

Advantageously the method and system is operable to: (i) reduce the costs for a school to transmit financial aid award packages to potential students; (ii) quickly modify the financial aid award packages based on accept/decline/postpone decisions of the students/parents; and (iii) provide influence on the student/parent decision at the time of reviewing the award package.

Figure 6A:
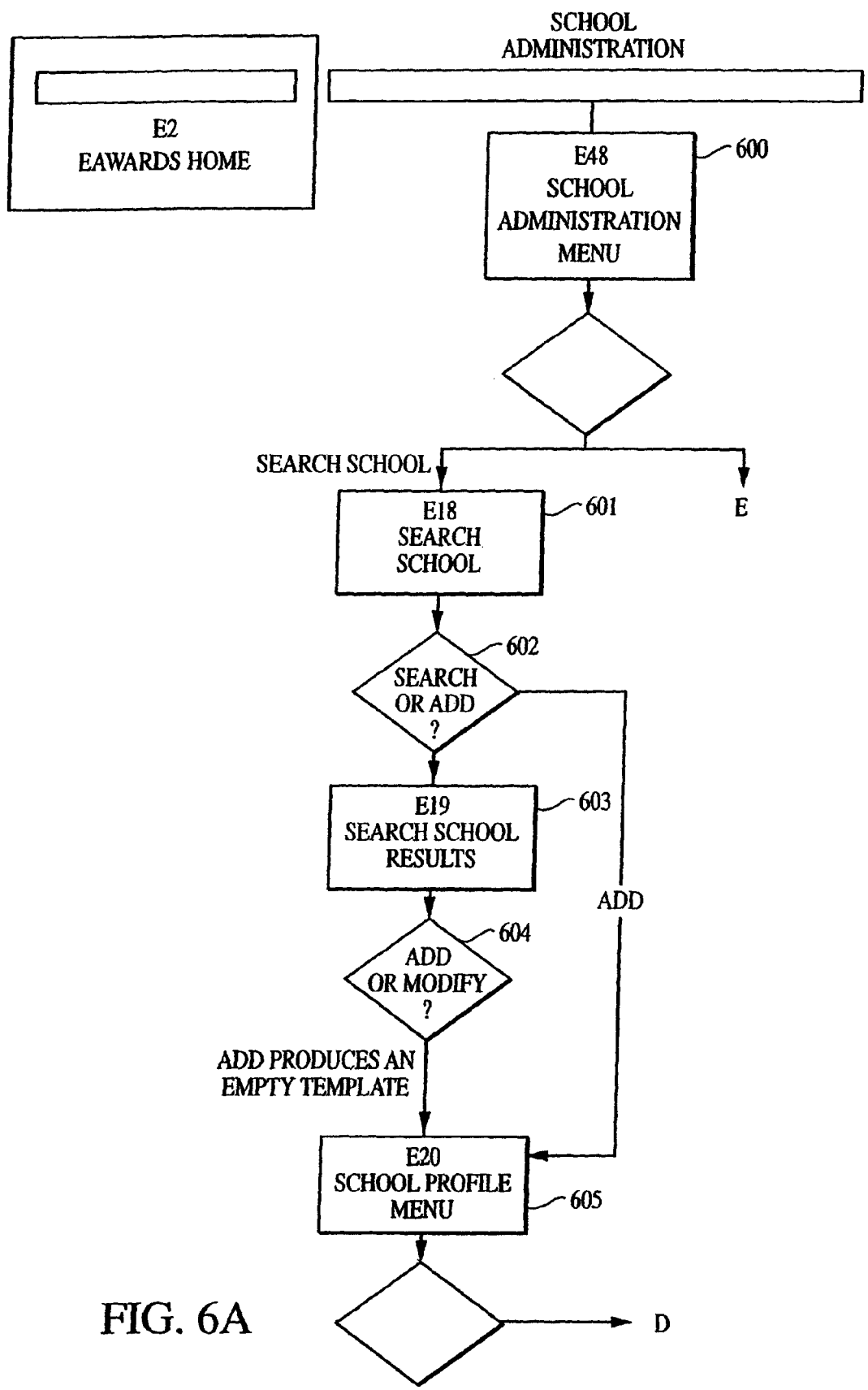
FIGS. 6A-6F contain process flow diagrams illustrating steps and control sequences carried out by the present invention, e.g., the system of FIG. 1, when one or more system administrators interact with the system.
Figure 7A:
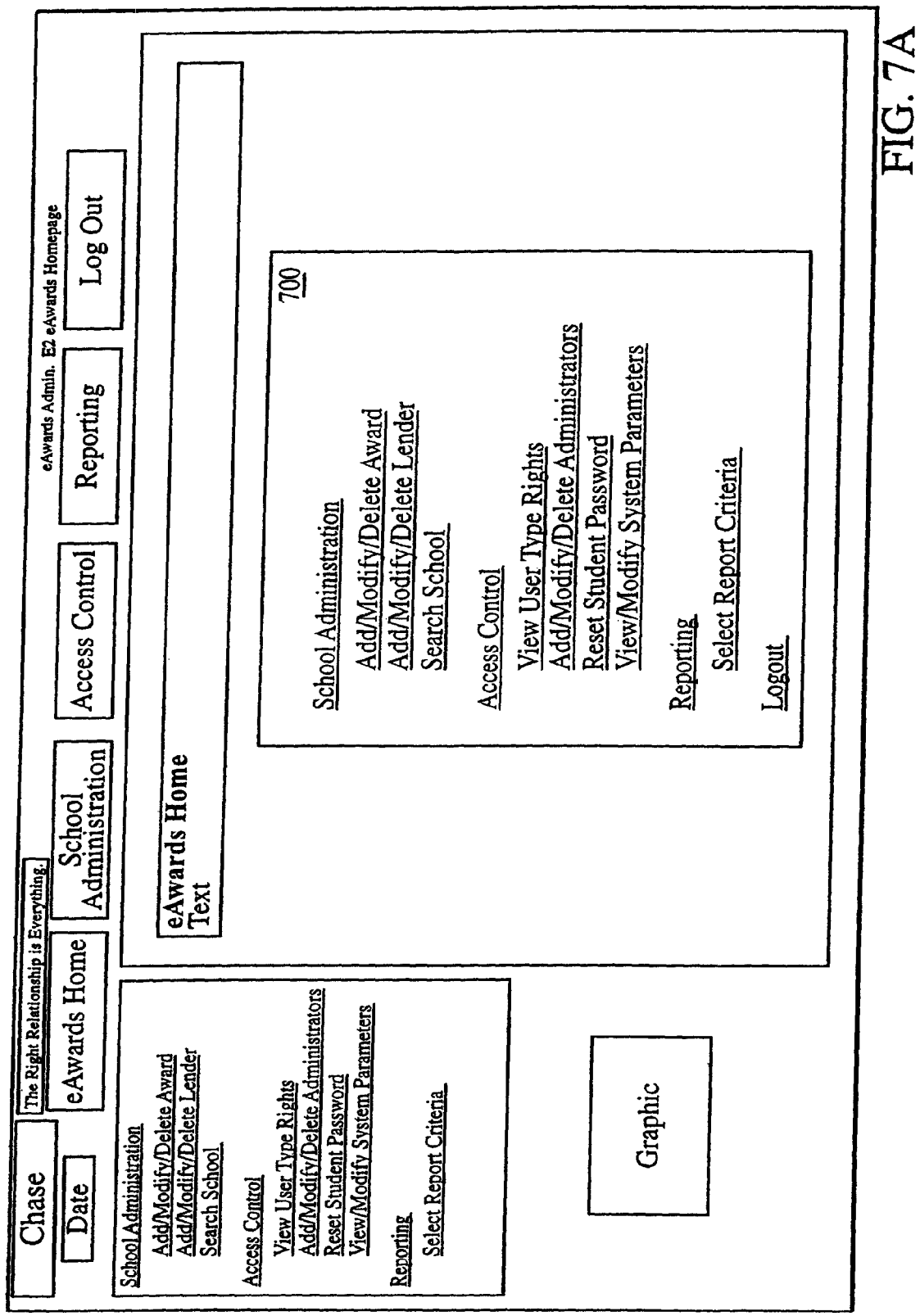

Reference is now made to FIGS. 6A and 7A which illustrate at least part of the process flow and the home page, respectively, for a system administrator 70 who has successfully logged onto the website over the computer network 20 or directly to the network interface 16 (FIG. 1). Preferably, when the process reaches step 600, data is transmitted to the system administrator 70 for presenting one or more electronic screens which contain information which is schematically illustrated in FIG. 7A, in particular, one or more icons are preferably provided at area 700, namely, school administration, access control, and reporting. Within school administration, a system administrator 70 may select between add/modify/delete award; add/modify/delete lender; and search school.

Figure 7B:
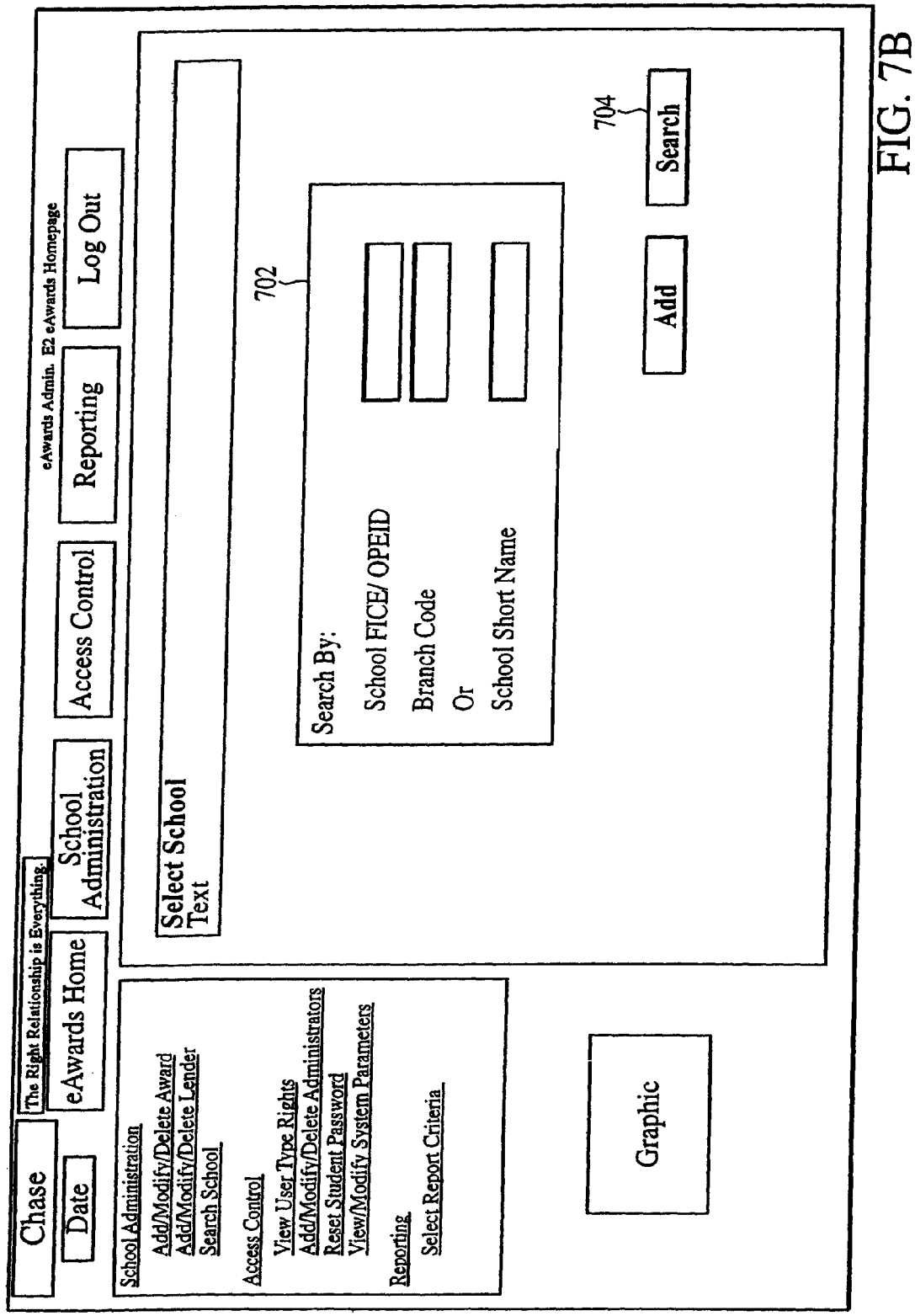

When the system administrator 70 selects the "search school" icon, process flow preferably proceeds to step 601 which causes data to be transmitted to the system administrator 70 for presenting an electronic screen which contains information which is schematically illustrated in FIG. 7B. The electronic screen preferably includes an area 702 which contains input fields operable to receive information from the system administrator 70 regarding search criteria, namely, the school FICE/OPEID information, the branch code information, and/or the school name. When a search icon 704 is activated, a search of the database 14 is conducted for schools which meet the criteria (step 602, FIG. 6A).

Figure 6B:
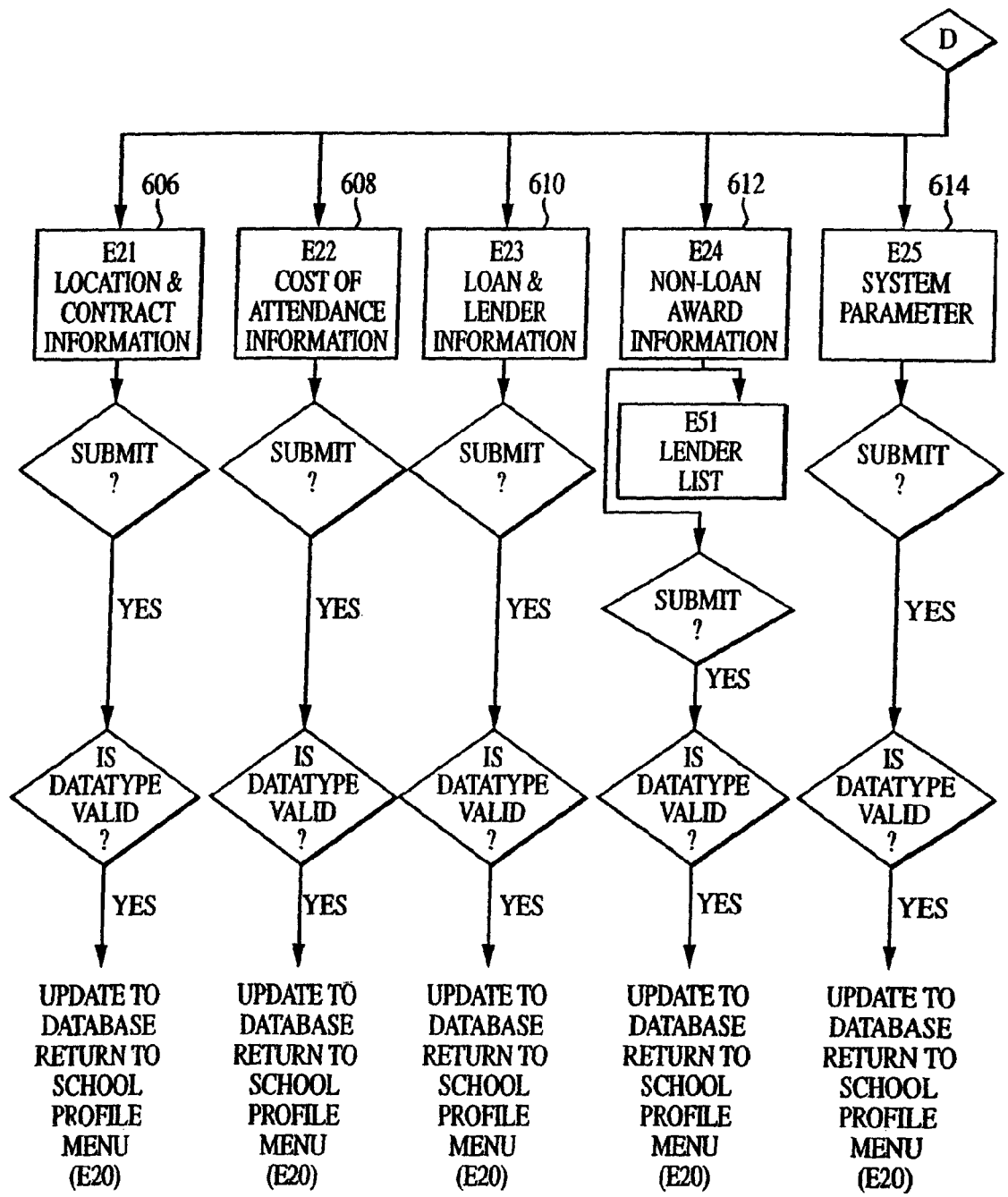
Figure 7C:
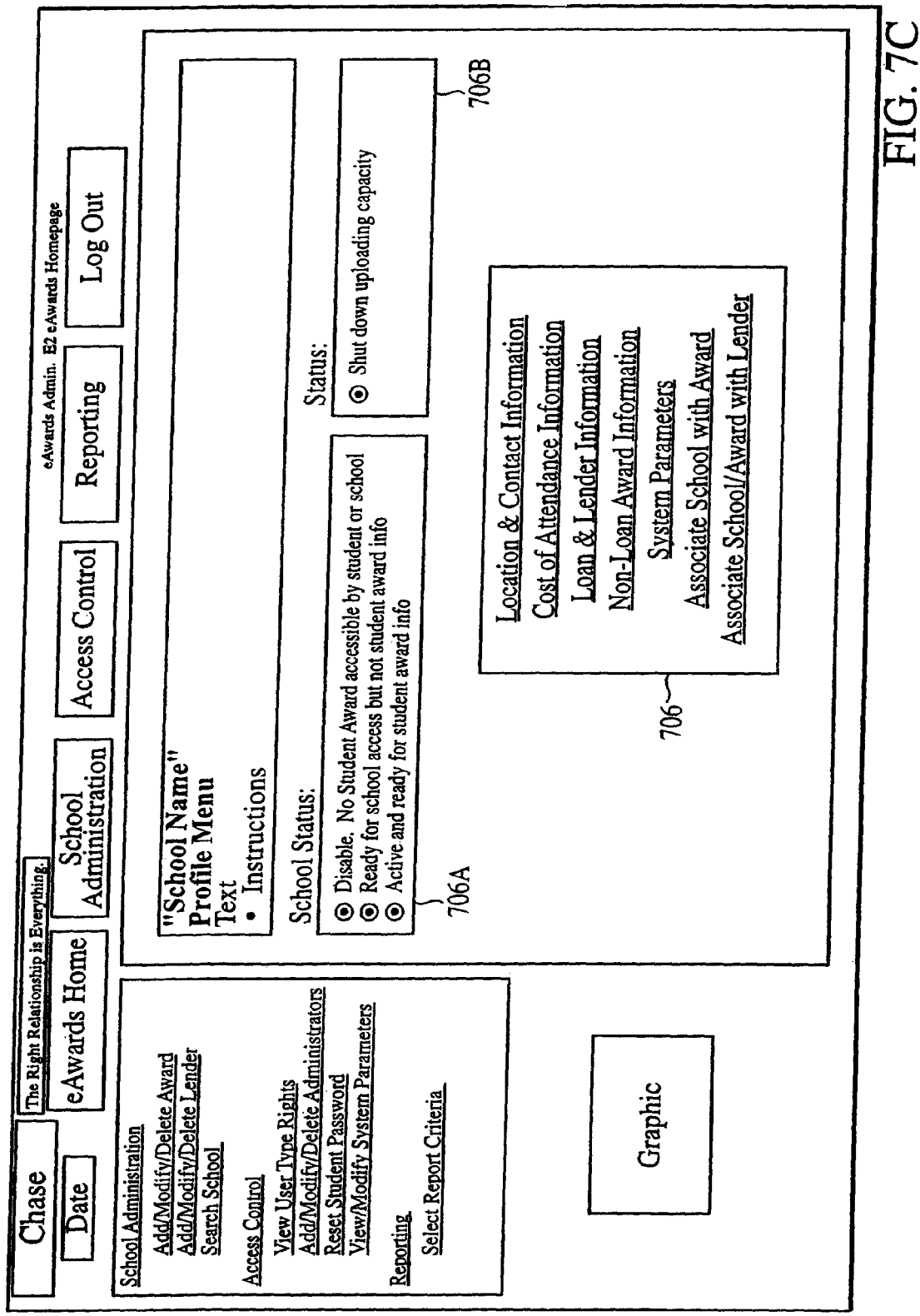

Preferably, the search results (step 603) are provided to the system administrator 70 by way of data which is transmitted over the network 20 or directly to the system administrator 70 for presenting an electronic screen. A school may be added or information concerning that school may be modified (step 604) and, thereafter, process flow continues to step 605 which causes an electronic screen to be transmitted to the system administrator 70 containing information which is schematically illustrated in FIG. 7C. The electronic screen preferably includes an area 706 having a number of activatable icons which invoke other electronic screens and functions. In particular, it is preferred that when any of the icons are activated, an electronic screen containing information concerning that icon is presented to the system administrator 70, for example: (i) location and contact information (step 606. FIG. 6B); (ii) cost of attendance information (step 608); (iii) loan and lender information (step 610); (iv) non-loan award information (step 612); (v) system parameter information (step 614). These functions mirror those of FIG. 5D; however, the system administrator 70 may view, add, modify, and/or delete such information using appropriate input fields contained in one or more electronic screens.

As shown in FIG. 7C, the system administrator is presented with school status menus 706a and 706b. Menu 706a allows the administrator to 1) completely disable the ability of a student/parent 50 or school to access any student awards; 2) allow school access but prevent student/parent access to award information; and 3) enable access to the award information. Menu 706b allows the administrator the ability to shut down the uploading capacity provided by the system.

Figure 6C:
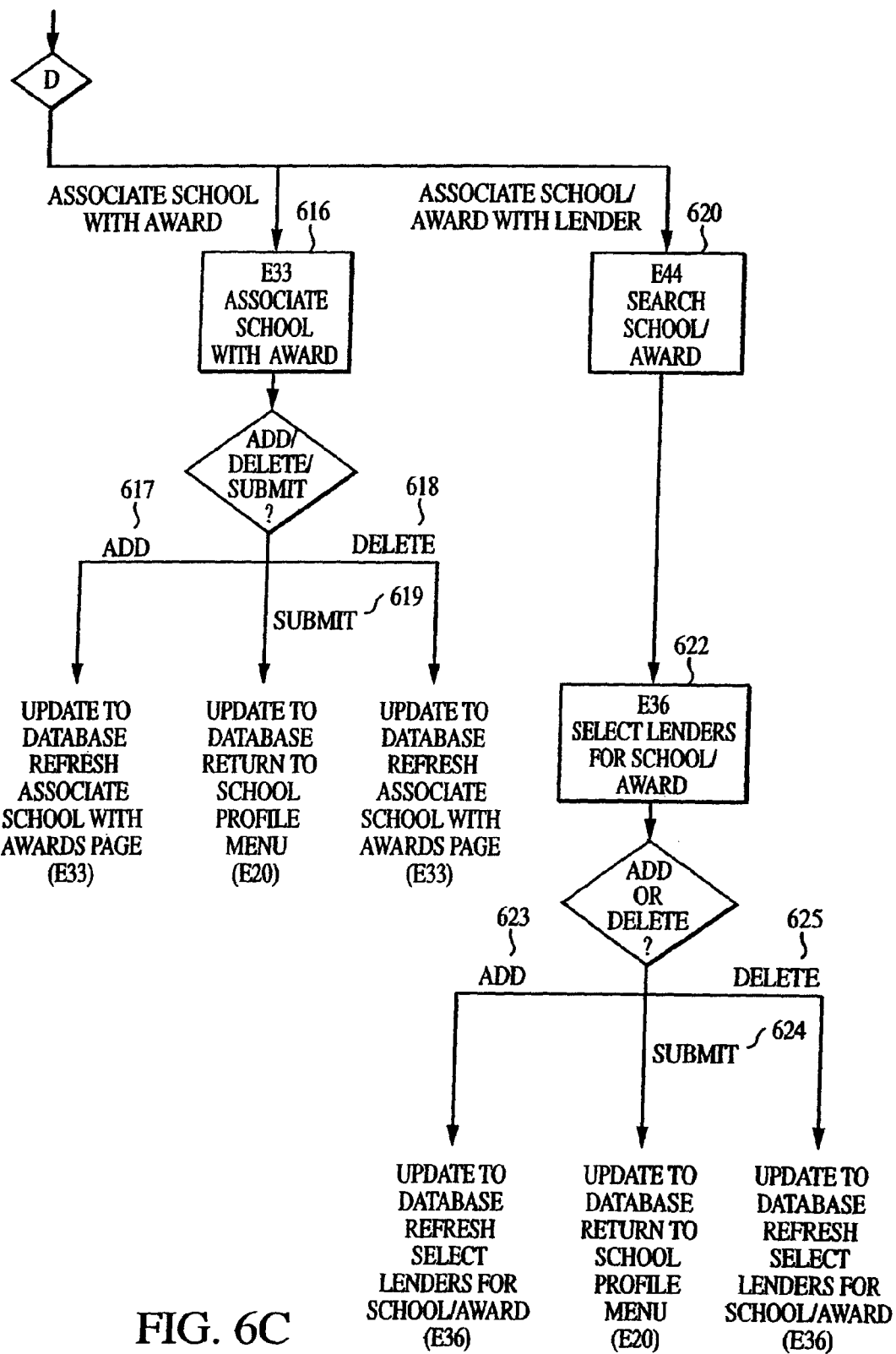
Figure 7D:
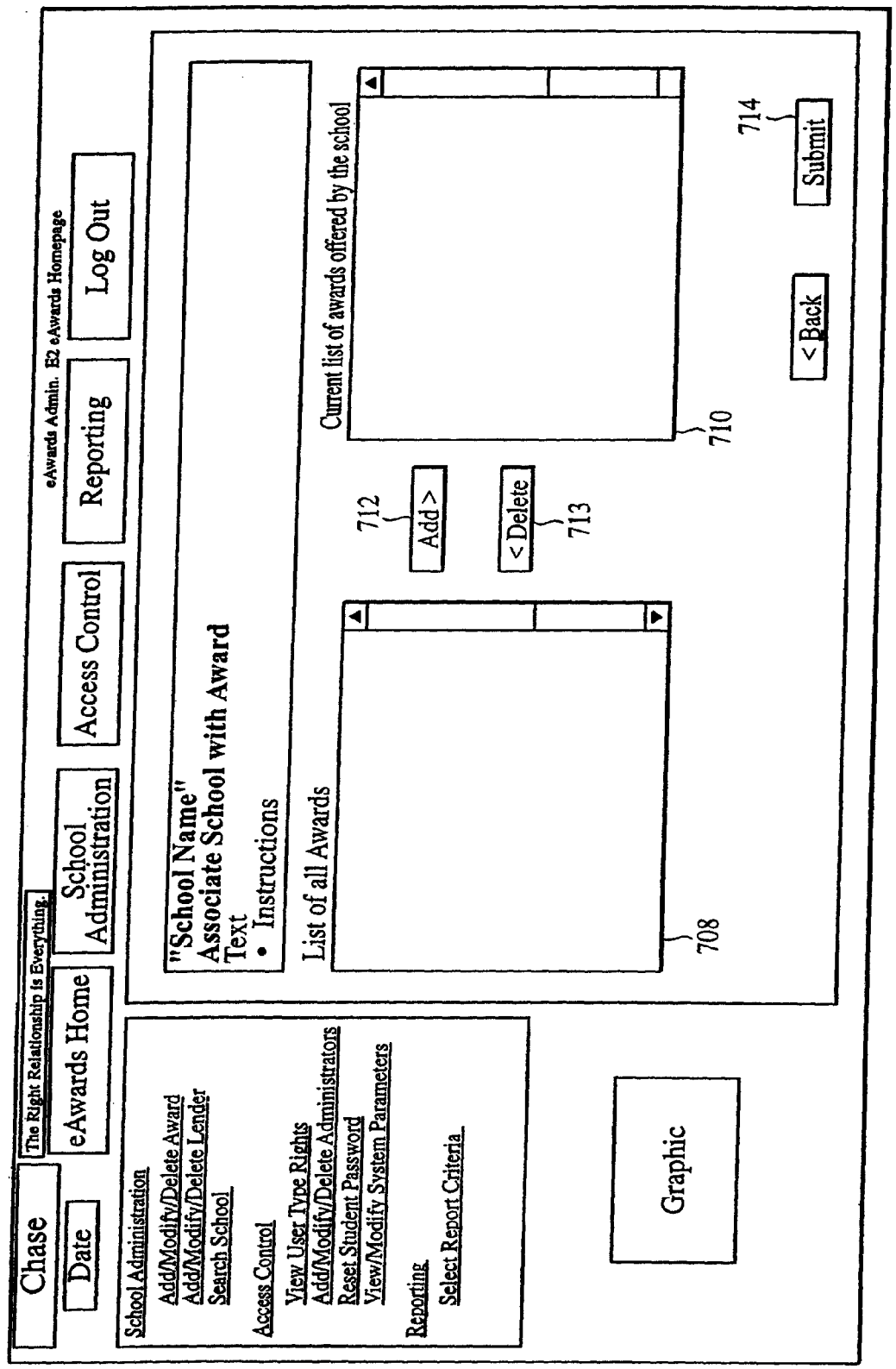
Figure 7E:
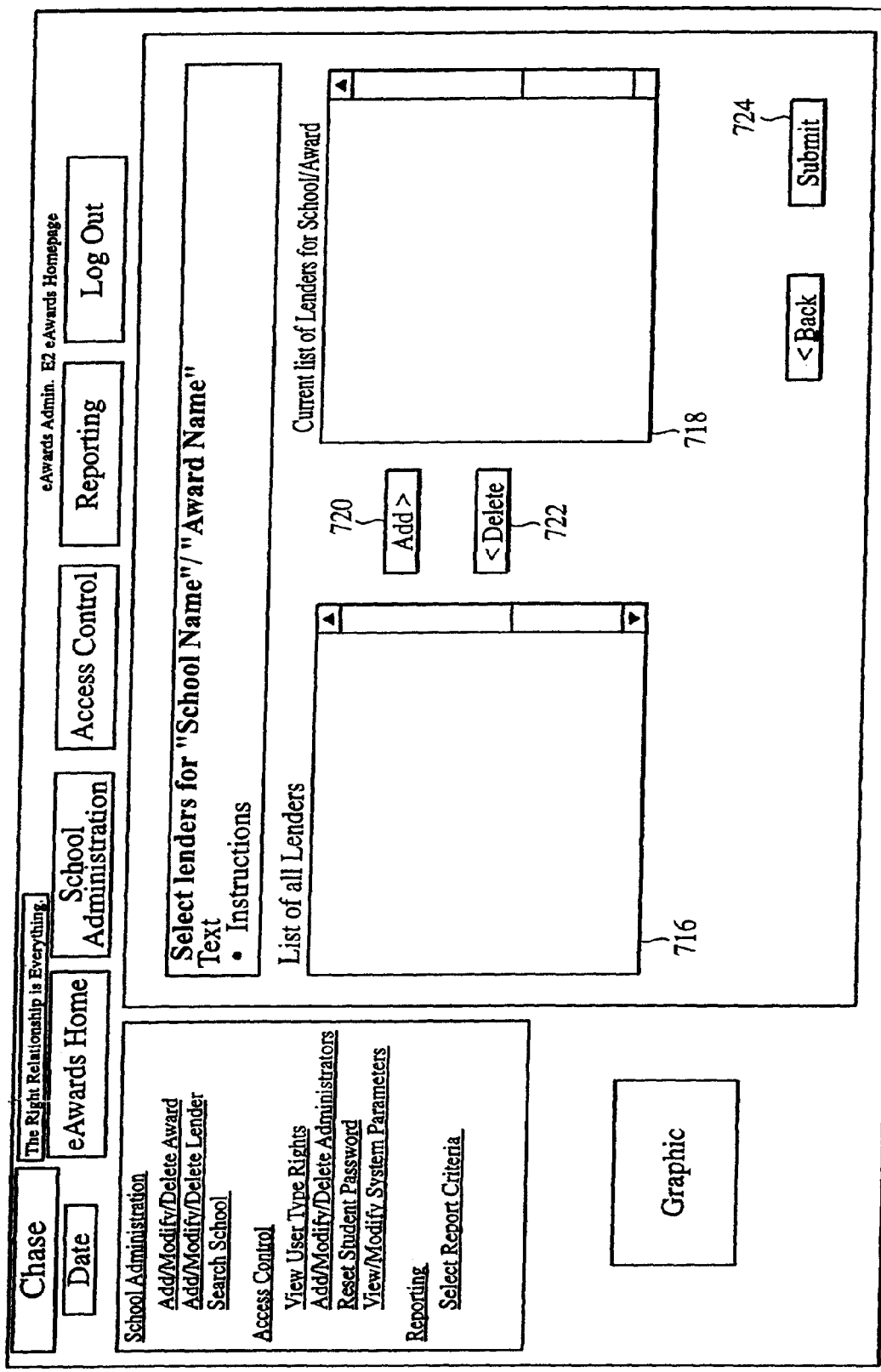

When the system administrator 70 selects the "associate school with award" icon of FIG. 7C, the process flow preferably proceeds to step 616 (FIG. 6C) which causes data to be transmitted to the system administrator 70 for presenting an electronic screen which contains information which is schematically illustrated in FIG. 7D. Preferably, the electronic screen includes a list of potential awards 708 which may be included in a financial aid award package and a list of awards offered by a particular school 710. Using icons 712 and 713, the system administrator 70 may advantageously add (step 617) or delete (step 618), respectively, awards to and from the list of awards offered by a particular school in the list. When the list of awards offered by the school has been modified, the system administrator 70 may submit (step 619) the revised list by activating icon 714.

Thereafter, the database 14 is updated with the new information and the process control returns to step 605 (FIG. 6A).

When the system administrator 70 selects the "associate school/award with lender" icon (FIG. 7C), the process flow preferably proceeds to step 622 (FIG. 6C). Step 622 causes the screen of FIG. 7E to be presented where the lender is associated with the school/award. Preferably, the electronic screen of FIG. 7E includes a list of potential lenders 716 which may be associated with a particular school listed at area 718. The system administrator 70 may advantageously add or delete a particular lender to or from the list of lenders for a particular school by activating an add icon 720 or a delete icon 722, respectively. These steps coincide with steps 623 and 625 of FIG. 6C. When the system administrator 70 has finished adding or deleting lenders from the list 718, he or she may submit the new information by activating the submit icon 724 (step 624, FIG. 6C).

Thereafter, the database 14 is updated with the new information and the process control returns to step 605 (FIG. 6A).

Figure 6D:
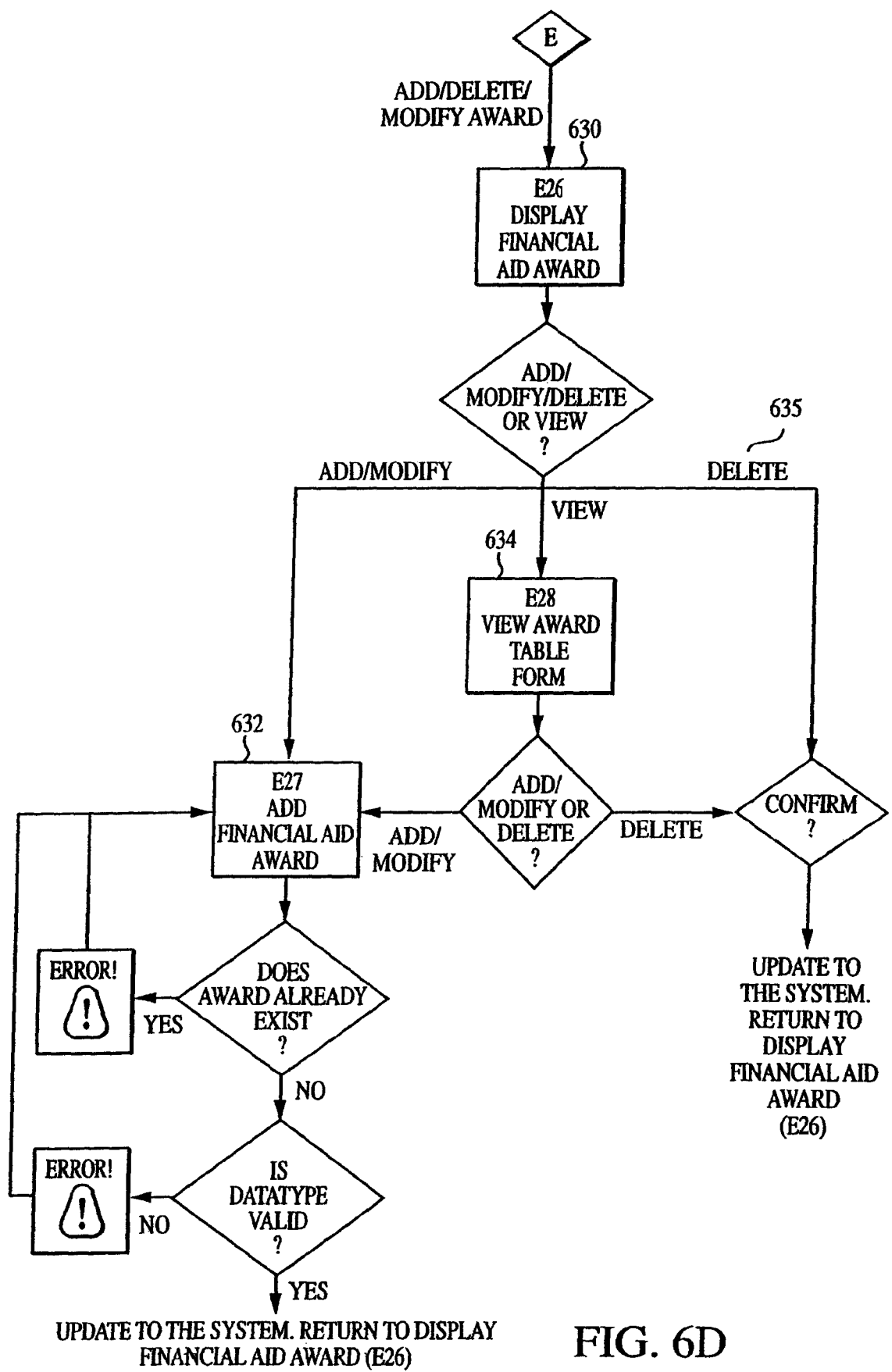
Figure 6E:
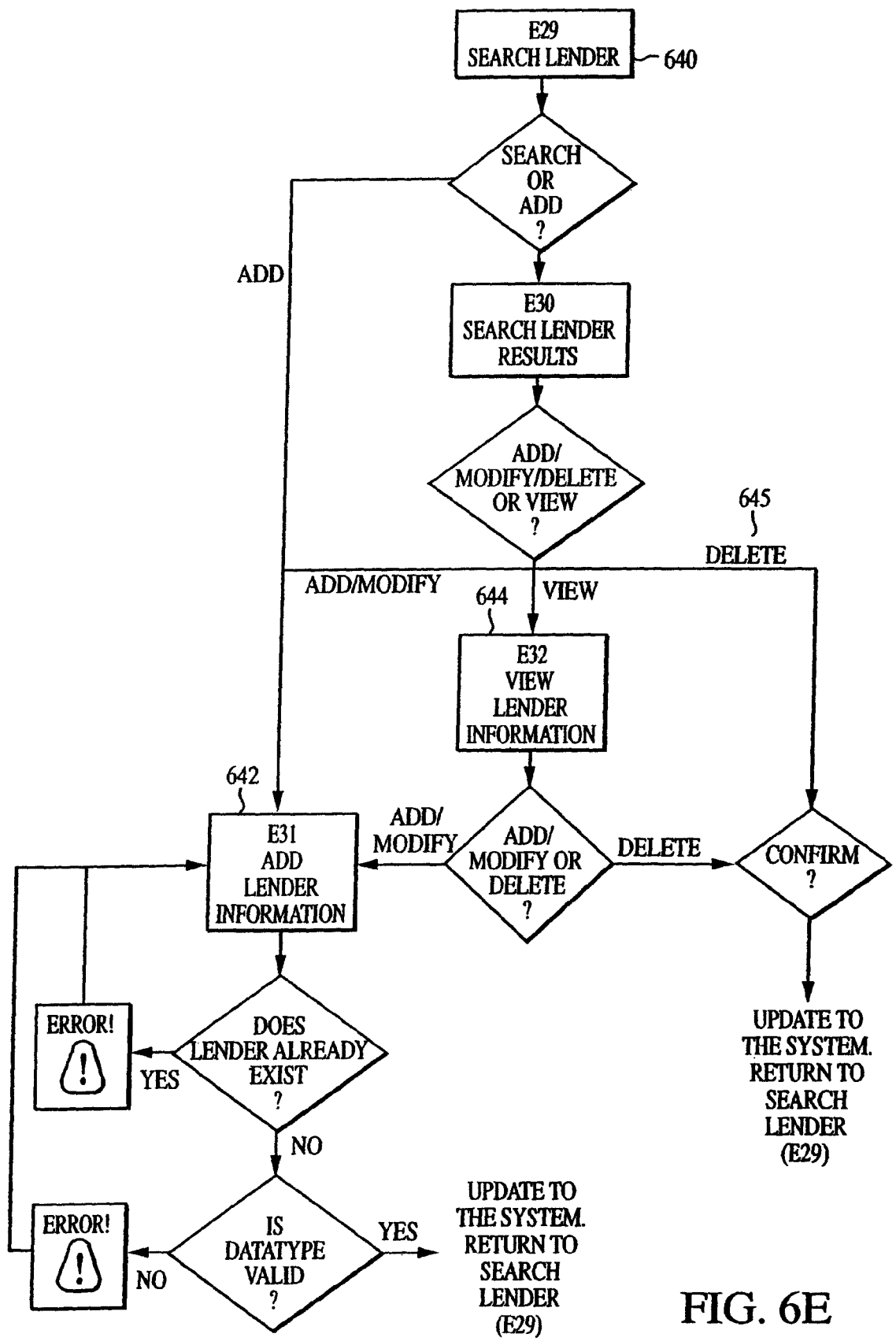

With reference to FIG. 7A, when the system administrator 70 selects the "add/modify/delete award" icon, the process flow preferably proceeds to step 630 (FIG. 6D) which causes data to be transmitted to the system administrator 70 for presenting an electronic screen (not shown) which contains information, input fields, and/or activatable icons suitable for permitting the system administrator to add/modify/delete or view information regarding the profile of a school that is a user of the system. In particular, a financial aid award may be added at step 632, viewed at step 634 and or deleted at step 635 (FIG. 6D). Those skilled in the art will appreciate from the description herein above that these functions may be carried out using suitable electronic screens. Preferably, the system administrator does not have access to student award packages.

When the system administrator 70 selects the "add/modify/delete lender" icon (FIG. 7A), the process flow preferably proceeds to step 640 (FIG. 6E) which causes data to be sent to the system administrator 70 for presenting an electronic screen (not shown) containing information, input fields, and/or executable icons suitable for permitting the system administrator 70 to add/modify/delete or view a lender. A lender may be added at step 642, viewed at step 644 and/or deleted at step 645.

Figure 6F:
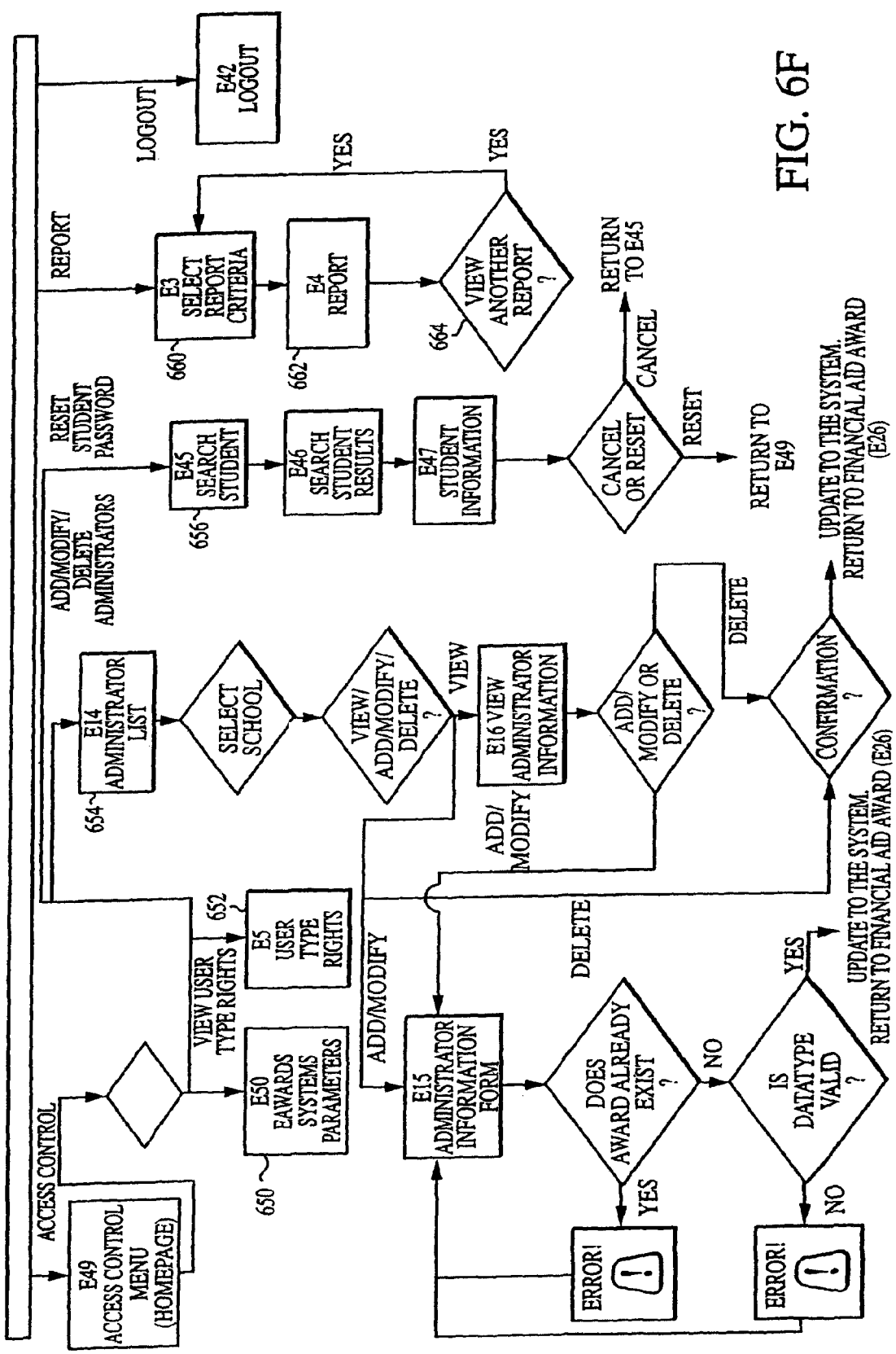

With reference to FIG. 6F, those skilled in the art will appreciate that additional data may be transmitted to the system administrator 70 which contains information, input fields, and/or executable icons, etc., suitable for presenting additional electronic screens for providing the following functions: (i) viewing/modifying system parameters, step 650; (ii) viewing user type rights, step 652; (iii) adding/modifying/deleting system and school administrators, steps 654; and (iv) resetting student passwords, step 656.

When the system administrator 70 selects the "reporting" icon (FIG. 7A), the process flow preferably proceeds to step 660 (FIG. 6F) which causes data to be provided to the system administrator 70 for presenting an electronic screen containing information which is schematically illustrated in FIG. 7F. Preferably, the electronic screen includes a plurality of input fields suitable for receiving search criteria from the system administrator 70. The criteria are used to search the database 14 to produce a report of interest to the administrator 70. In particular, the administrator 70 may input at least one of the following criteria: (i) the particular school 730; (ii) the student status 732 (i.e., all students, those students who have accepted, those students who have declined, those students who have not decided, and those student who have not visited the website); (iii) a particular lender 734; (iv) a range of dates 736; and (v) a sorting protocol, such as the order in which the criteria are searched, for example first the school, next the student, and lastly the lender.

When the search criteria is submitted, the process flow preferably proceeds to step 662 (FIG. 6F) and a report is provided to the system administrator 70 as part of an electronic screen (not shown). If the system administrator 70 wishes to view another report, at step 664 the process control preferably returns to step 660 where the administrator 70 is requested to select additional criteria.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A computer system for student financial aid, the system comprising:
   at least one server in communication with a computer network, the server comprising at least one processor;
   at least one product access web site accessible over the computer network, the web site maintained by the at least one server including the at least one processor, the web site providing a user interface through which a first user selects from among a plurality of student financial aid products, the student financial aid products comprising at least an electronic financial aid award package product awarded to the first user;
   a login module that interacts with the web site and is provided by the network server, wherein the login module is executed by the at least one processor and controls access to the student financial aid products and provides access to any of the plurality of student financial aid products after receiving valid login information and wherein the login module comprises at least one database storing data associated with the first user; and
   an administrator module provided by the network server, wherein the administrator module is executed by the at least one processor and provides a user interface through which a second user creates, modifies, and updates the product access web site and through which the second user selects a desired financial aid product from among a plurality of preset financial aid products, wherein the user interface receives input for selecting the financial aid products.

2. The system of claim 1, wherein the login module is configured to provide data associated with the first user to a web site containing a product accessed by the user.

3. The system of claim 2, wherein the login module is configured to update the data associated with the first user and to store the updated data in the database.

4. The system of claim 2, wherein the data comprises one or more of the following user information: name, student ID or social security number, address, and telephone number.

5. The system of claim 1, wherein the user interface through which a first user selects from among the plurality of student financial aid products provides access for the first user to process applications for receiving a student financial aid package.

6. The system of claim 1, wherein the administrator module further provides a user interface through which a second user selectively activates or deactivates one or more web site features for access by the first user at the product access web site.

7. The system of claim 6, wherein the administrator module further provides a user interface through which the second user selectively activates or deactivates one or more of the following administrator features: upload student award batch, batch processing status, view user type rights, student search, and reporting.

8. The system of claim 1, wherein the administrator module is located on a system server in communication with the computer network.

9. The system of claim 6, wherein the user interface provided by the administrator module comprises input fields corresponding to at least one web site feature.

10. The system of claim 9, wherein the at least one web site feature comprises a student financial aid product selection, a logo change, a text modifier for messages sent to the first user, a student financial aid policies reporter, and a student financial aid eligibility reporter.

11. The system of claim 1, wherein the plurality of preset financial aid products comprises at least one of a student financial aid application, a student loan eligibility product, a student loan application product, a student loan rules and policies product, an electronic financial aid award package product, and a student loan additional information product.

12. The system of claim 1, wherein the administrator module collects data related to the usage of the product access web site by the first user and provides a user interface through which the second user views the usage data.

13. The system of claim 12, wherein the user interface through which the second user views the usage data comprises an input search function.

14. The system of claim 12, wherein the usage data comprises one or more actions taken by the first user.

15. A computer-readable medium having a computer software program for student financial aid, the computer-readable medium comprising:
   at least one application that runs on a processor of a server in communication with a computer network that provides a user interface through which a first user selects from among a plurality of student financial aid products, the plurality of student financial aid products including an electronic financial aid award package product awarded to the first user; and
   a login application executed by the processor of the server that interacts with the web site and controls access to the financial aid products, wherein the login application provides access to any of the plurality of student financial aid products after receiving valid login information and wherein the login application communicates with at least one database storing data associated with the first user; and
   an administrator application executed by the processor of the server, the administrator application providing an interface through which a second user creates, modifies, and updates the product access web site and through which the second user selects a desired financial aid product from among a plurality of preset financial aid products.

16. The computer-readable medium of claim 15, wherein the administrator application enables a second user to create, modify, and update the web site for access by the first user.

17. A computer-implemented method of providing for educational financial aid service, the method comprising:
   providing at least one server in communication with a computer network, the at least one server comprising at least one processor;
   providing at least one student financial aid product access web site accessible over the computer network, the web site maintained by the at least one server including the at least one processor, the web site providing a user interface through which a first user selects from among a plurality of student financial aid products, the plurality of student financial aid products including an electronic financial aid award package product awarded to the first user;
   providing a login module through the network server that interacts with the web site, wherein the login module is executed by the at least one processor and controls access to the student financial aid products and provides access to any of the plurality of student financial aid products after receiving valid login information and wherein the login module comprises at least one database storing data associated with the first user; and providing an administrator module through the network server, wherein the administrator module is executed by the at least one processor for enabling a second user to create, modify, and update the web site for access by the first user and enabling the second user to select a desired financial aid product from among a plurality of preset financial aid.

* * * * *